US011936619B2

United States Patent
Bolte et al.

(10) Patent No.: US 11,936,619 B2
(45) Date of Patent: Mar. 19, 2024

(54) COMBINED SECURITY AND QOS COORDINATION AMONG DEVICES

(71) Applicant: Sophos Limited, Abingdon (GB)

(72) Inventors: Dirk Bolte, Birkenfeld (DE); Sven Schnelle, Kraichtal-Oberöwisheim (DE); Emanuel Taube, Walzbachtal (DE); Jonas Bernd Freiherr von Andrian-Werburg, Karlsruhe (DE)

(73) Assignee: Sophos Limited, Abingdon (GB)

( * ) Notice: Subject to any disclaimer, the term of this patent is extended or adjusted under 35 U.S.C. 154(b) by 0 days.

(21) Appl. No.: 17/526,360

(22) Filed: Nov. 15, 2021

(65) Prior Publication Data

US 2022/0174040 A1 Jun. 2, 2022

Related U.S. Application Data

(63) Continuation of application No. 16/561,199, filed on Sep. 5, 2019, now Pat. No. 11,178,103, which is a
(Continued)

(30) Foreign Application Priority Data

Jun. 10, 2016 (GB) .................................... 1610171

(51) Int. Cl.
*H04L 29/06* (2006.01)
*H04L 9/40* (2022.01)
(Continued)

(52) U.S. Cl.
CPC .......... *H04L 63/02* (2013.01); *H04L 63/0218* (2013.01); *H04L 63/18* (2013.01);
(Continued)

(58) Field of Classification Search
CPC ..... H04L 63/02; H04L 63/0218; H04L 63/18; H04L 63/20; H04L 9/3247;
(Continued)

(56) References Cited

U.S. PATENT DOCUMENTS

| | | | | |
|---|---|---|---|---|
| 6,704,873 B1 * | 3/2004 | Underwood | ............ | H04L 67/10 |
| | | | | 709/249 |
| 7,843,938 B1 * | 11/2010 | Sutter | ...................... | H04L 47/10 |
| | | | | 370/433 |

(Continued)

FOREIGN PATENT DOCUMENTS

DE 102004045426 6/2006

OTHER PUBLICATIONS

USPTO, "U.S. Appl. No. 15/619,028 Non-Final Office Action dated Mar. 29, 2019", 21 pages.
(Continued)

*Primary Examiner* — Ka Shan Choy
(74) *Attorney, Agent, or Firm* — Strategic Patents, P.C.

(57) ABSTRACT

A method includes establishing a wireless link between a wireless interface of an endpoint and a WAP; exchanging, through the wireless link, network traffic associated with execution of an application at the endpoint; executing, at the endpoint, a security routine to monitor a security status of the endpoint; establishing, through the wireless link, a secure channel that shares the wireless link with the network traffic of the application, the secure channel to extend from the security routine to a supervisor through the wireless link and the WAP; conveying, from the security routine and through the secure channel, an indication of the security status; receiving, at the security routine and through the secure channel, a command to change a setting of the wireless interface associated with a characteristic of the wireless link; and accessing, from the security routine, the
(Continued)

wireless interface to effect the change in response to receiving the command.

26 Claims, 25 Drawing Sheets

Related U.S. Application Data continuation of application No. 15/619,102, filed on Jun. 9, 2017, now Pat. No. 10,728,759, and a continuation of application No. 15/619,028, filed on Jun. 9, 2017, now Pat. No. 10,667,130.

(51) Int. Cl.
| | | |
|---|---|---|
| *H04W 12/037* | (2021.01) | |
| *H04W 12/06* | (2021.01) | |
| *H04W 12/08* | (2021.01) | |
| *H04W 12/088* | (2021.01) | |
| *H04W 24/08* | (2009.01) | |
| *H04W 28/02* | (2009.01) | |
| *H04L 9/32* | (2006.01) | |
| *H04W 76/10* | (2018.01) | |
| *H04W 88/08* | (2009.01) | |

(52) U.S. Cl.
CPC ........... *H04L 63/20* (2013.01); *H04W 12/037* (2021.01); *H04W 12/06* (2013.01); *H04W 12/068* (2021.01); *H04W 12/08* (2013.01); *H04W 12/088* (2021.01); *H04W 24/08* (2013.01); *H04W 28/0252* (2013.01); *H04L 9/3247* (2013.01); *H04L 63/0272* (2013.01); *H04W 76/10* (2018.02); *H04W 88/08* (2013.01)

(58) Field of Classification Search
CPC ............ H04L 63/0272; H04W 12/037; H04W 12/06; H04W 12/068; H04W 12/08; H04W 12/088; H04W 24/08; H04W 28/0252; H04W 76/10; H04W 88/08; H04W 76/20; H04W 76/25; H04W 12/10; H04W 24/00
See application file for complete search history.

(56) References Cited

U.S. PATENT DOCUMENTS

| | | |
|---|---|---|
| 8,683,598 B1 | 3/2014 | Cashin |
| 9,172,766 B2 | 10/2015 | Narasimhan et al. |
| 9,642,167 B1 | 5/2017 | Snyder et al. |
| 10,142,290 B1 | 11/2018 | Brandwine et al. |
| 2004/0215957 A1 | 10/2004 | Moineau et al. |
| 2007/0297609 A1 | 12/2007 | Adams et al. |
| 2008/0305747 A1* | 12/2008 | Aaron ................... H04W 24/08 709/219 |
| 2012/0317224 A1* | 12/2012 | Caldwell ............. H04W 72/542 709/217 |
| 2013/0322265 A1* | 12/2013 | Kozisek .............. H04L 43/0894 370/251 |
| 2014/0109190 A1* | 4/2014 | Cam-Winget ...... G06F 21/6218 726/4 |
| 2015/0052578 A1 | 2/2015 | Yau et al. |
| 2015/0172204 A1 | 6/2015 | Anderson et al. |
| 2015/0172959 A1* | 6/2015 | Cucala Garcia ...... H04W 48/18 455/436 |
| 2016/0294875 A1 | 10/2016 | Lian et al. |
| 2016/0295410 A1 | 10/2016 | Gupta et al. |
| 2017/0195895 A1 | 7/2017 | Ponnuswamy |
| 2017/0201460 A1 | 7/2017 | Hall et al. |
| 2017/0288955 A1* | 10/2017 | Yin ..................... H04L 43/0817 |
| 2017/0359309 A1 | 12/2017 | Bolte et al. |
| 2017/0359725 A1 | 12/2017 | Bolte et al. |
| 2018/0054356 A1* | 2/2018 | Narasimhan ........ H04L 67/1014 |
| 2018/0295558 A1* | 10/2018 | Kang ................... H04B 17/309 |
| 2018/0367383 A1* | 12/2018 | Hardison ............ H04L 41/0813 |
| 2019/0394646 A1 | 12/2019 | Bolte et al. |

OTHER PUBLICATIONS

USPTO, "U.S. Appl. No. 15/619,028 Notice of Allowance dated Jan. 29, 2020", 9 pages.
USPTO, "U.S. Appl. No. 15/619,028 Notice of Allowance dated Aug. 15, 2019", 8 pages.
USPTO, "U.S. Appl. No. 15/619,102 Non-Final Office Action dated Feb. 5, 2019", 22 pages.
USPTO, "U.S. Appl. No. 15/619,102 Notice of Allowance dated Jan. 14, 2020", 10 pages.
USPTO, "U.S. Appl. No. 15/619,102 Notice of Allowance dated Mar. 18, 2020", 8 pages.
USPTO, "U.S. Appl. No. 15/619,102 Notice of Allowance dated Jun. 21, 2019", 10 pages.
USPTO, "U.S. Appl. No. 16/561,199 Final Office Action dated Mar. 10, 2021", 18 pages.
USPTO, "U.S. Appl. No. 16/561,199 Non-Final Office Action dated Nov. 17, 2020", 18 pages.
USPTO, "U.S. Appl. No. 16/561,199 Notice of Allowance dated Jul. 26, 2021", 11 pages.
UKIPO, "UK Application No. 1610171.9 Combined Search and Examination Report dated Nov. 28, 2016", 8 pages.
IPO, "UK Application No. 1610171.9 Examination Report dated May 31, 2019", 3 pages.
IPO, "UK Application No. 1909582.7 Combined Search and Examination Report dated Sep. 26, 2019", 4 pages.
IPO, "UK Application No. 1911368.7 Combined Search and Examination Report dated Sep. 27, 2019", 4 pages.

* cited by examiner

2400

2800

COMBINED SECURITY AND QOS COORDINATION AMONG DEVICES

CROSS-REFERENCE TO RELATED APPLICATIONS

This application is a continuation of U.S. patent application Ser. No. 16/561,199, filed Sep. 5, 2019 (now U.S. Pat. No. 11,178,103), which is a continuation of U.S. patent application Ser. No. 15/619,028, filed Jun. 9, 2017 (now U.S. Pat. No. 10,667,130), and of U.S. patent application Ser. No. 15/619,102, filed Jun. 9, 2017 (now U.S. Pat. No. 10,728,759), each of which claims priority to United Kingdom Pat. App. No. 1610171.9 filed on Jun. 10, 2016, with the entirety of each of these applications hereby incorporated herein by reference.

BACKGROUND

Wireless networks have supplanted wired networks in many home and workplace settings. In many places, such networks are deemed to be "internal" networks that provide access to devices and/or other resources that are deemed to be private or even sensitive in nature. This arises from the efficiency and convenience of wireless networks, and a growing trend of installing one or more wireless access points (WAPs) in a home, office, building, open spaces, outside spaces adjacent to buildings, throughout campuses, etc.

Such increased usage of wireless networking technology brings the challenge of security for the network and the challenge of maintaining quality of service (QOS) in the wireless network access provided to each endpoint from each WAP. Individual WAPs may incorporate technology to monitor the QOS of a portion of a wireless network, but are often limited in their ability to improve QOS.

SUMMARY

A computer-implemented method to provide security and wireless network service may include: establishing a wireless link between a wireless interface of an endpoint and a wireless access point (WAP); exchanging, through the wireless link, network traffic associated with execution of an application by a processor of the endpoint; executing, by the processor of the endpoint, a security routine to monitor a security status of the endpoint; establishing, through the wireless link, a secure channel that shares the wireless link with the network traffic of the application, the secure channel to extend from the security routine to a supervisor through the wireless link and the WAP; conveying, from the security routine and through the secure channel, an indication of the security status; receiving, at the security routine and through the secure channel, a command to change a setting of the wireless interface associated with a characteristic of the wireless link; and accessing, from the security routine, the wireless interface to effect the change of the setting in the wireless interface in response to receiving the command.

A computer-implemented method to provide security and wireless network service, the method may include: establishing a wireless link between a wireless interface of an endpoint and a wireless access point (WAP); exchanging, through the wireless link, network traffic associated with execution of an application by a processor of the endpoint; establishing, through the wireless link, a secure channel that shares the wireless link with the network traffic of the application; transmitting, through the secure channel, an indication of a security status of the endpoint; and receiving, through the secure channel, a command to change a setting of the wireless interface associated with a characteristic of the wireless link.

The computer-implemented method may include extending the secure channel from the security routine to a firewall or a supervisor through the wireless link and the WAP.

The computer-implemented method may include executing, by the processor of the endpoint, a security routine to monitor the security status of the endpoint.

The computer-implemented method may include designating a portion of a storage of the endpoint in which the security routine is stored during execution as restricted from access by at least the application.

The computer-implemented method may include generating, by the execution of the security routine, the indication of the security status, wherein the indication of the security status may include at least one of an indication of security health of the endpoint, an indication of suspicious activity by the application, an indication of compromise of the application, an indication of compromise of the endpoint, an indication of commencement of execution of the application, an indication of cessation of execution of the application, an indication of an observed data rate of the network traffic associated with execution of the application, and an indication of an observed pattern of a time of execution of the application.

The computer-implemented method may include accessing, from the security routine, the wireless interface to effect the change of the setting in the wireless interface in response to receiving the command.

The computer-implemented method may include isolating the access to the wireless interface by the security routine from a network device driver associated with the wireless interface.

The setting may include at least one of a frequency of the wireless link, an encoding of the network traffic, a signal strength of transmission of the network traffic by the wireless interface, a data transmission rate through the wireless link, and a protocol timing of the wireless link.

A non-transitory machine-readable medium with instructions stored thereon that, when executed by a processor, may cause the processor to: establish a wireless link between a wireless interface of an endpoint and a wireless access point (WAP); exchange, through the wireless link, network traffic associated with execution of an application of the endpoint; establish, through the wireless link, a secure channel that shares the wireless link with the network traffic of the application; transmit, through the secure channel, an indication of a security status of the endpoint; and receive, through the secure channel, a command to change a setting of the wireless interface associated with a characteristic of the wireless link.

The instructions may further cause the processor to extend the secure channel from the security routine to a firewall or a supervisor through the wireless link and the WAP.

The instructions may further cause the processor to execute a security routine to monitor the security status of the endpoint.

The instructions may further cause the processor to designate a portion of a storage of the endpoint in which the security routine is stored during execution as restricted from access by at least the application.

The indication of the security status may include at least one of an indication of security health of the endpoint, an indication of suspicious activity by the application, an indication of compromise of the application, an indication of compromise of the endpoint, an indication of commencement of execution of the application detected by the security routine, an indication of cessation of execution of the application detected by the security routine, an indication of an observed data rate of the network traffic associated with execution of the application, and an indication of an observed pattern of a time of execution of the application.

The instructions may further cause the processor to access the wireless interface to effect the change of the setting in the wireless interface in response to receiving the command.

The instructions may further cause the processor to isolate the access to the wireless interface from a network device driver associated with the wireless interface and executed by the processor.

The setting may further include at least one of a frequency of the wireless link, an encoding of the network traffic, a signal strength of transmission of the network traffic by the wireless interface, and a protocol timing of the wireless link.

An apparatus to provide security and wireless network service may include a processor of an endpoint; a wireless interface of the endpoint coupled to the processor; and a storage of the endpoint coupled to the processor to store instructions, that when executed by the processor cause the processor to: establish a wireless link between the wireless interface and a wireless access point (WAP); exchange, through the wireless link, network traffic associated with execution of an application by the processor; establish, through the wireless link, a secure channel that shares the wireless link with the network traffic of the application; transmit, through the secure channel, an indication of a security status of the endpoint; and receive, through the secure channel, a command to change a setting of the wireless interface associated with a characteristic of the wireless link.

The processor may be further caused to extend the secure channel from the security routine to a firewall or a supervisor through the wireless link and the WAP.

The processor may be further caused to execute a security routine to monitor the security status of the endpoint.

The processor may be further caused to designate a portion of the storage in which the security routine is stored during execution as restricted from access by at least the application.

The processor may be further caused to generate, by the execution of the security routine, the indication of the security status, wherein the indication of the security status may include at least one of an indication of security health of the endpoint, an indication of suspicious activity by the application, an indication of compromise of the application, an indication of compromise of the endpoint, an indication of commencement of execution of the application by the processor, an indication of cessation of execution of the application by the processor, an indication of an observed data rate of the network traffic associated with execution of the application, and an indication of an observed pattern of a time of execution of the application.

The processor may be further caused to access, by execution of the security routine, the wireless interface to effect the change of the setting in the wireless interface in response to receiving the command.

The processor may be further caused to isolate the access to the wireless interface by the security routine from a network device driver associated with the wireless interface.

The setting may include at least one of a frequency of the wireless link, an encoding of the network traffic, a signal strength of transmission of the network traffic by the wireless interface, a data transmission rate through the wireless link, and a protocol timing of the wireless link.

A computer-implemented method to provide security and wireless network service may include: establishing a wireless link between a wireless interface of a wireless access point (WAP) and an endpoint; exchanging network traffic with the endpoint through the wireless link; authenticating a security routine executed by a processor of the endpoint; establishing, through the wireless link and the WAP, and in response to authentication of the security routine, a secure channel that shares the wireless link with the network traffic; recurringly receiving an indication of a security status the endpoint through at least the secure channel; monitoring performance of the wireless link; deriving a change to a setting associated with a characteristic of the wireless link based on the performance of the wireless link; and transmitting a command to the endpoint to change the setting through at least the secure channel.

A computer-implemented method to provide security and wireless network service may include establishing a first wireless link between a wireless interface of a first wireless access point (WAP) and a first endpoint; exchanging network traffic with the first endpoint through the first wireless link; exchanging, through the first wireless link, messages associated with a first secure channel that shares the first wireless link with the network traffic; recurringly receiving indications of a security status of the first endpoint through at least the first secure channel; and transmitting a first command to the first endpoint to change a first setting associated with a characteristic of the first wireless link through at least the first secure channel.

The computer-implemented method may include routing the network traffic through the first WAP between the first wireless link and a firewall, wherein the firewall is incorporated into or is coupled to the first WAP; and exchanging the messages associated with the first secure channel between a security routine of the endpoint and the firewall.

The computer-implemented method may include authenticating, at the firewall, the security routine of the first endpoint; and conditioning establishment of the first secure channel on the authentication of the security routine.

The indication of the security status may include at least one of an indication of commencement of execution of an application by a processor of the first endpoint and an indication of cessation of execution of the application by the processor of the first endpoint, and the method may further include deriving the first command based on the security status, wherein the first command may include at least one of a change to the first setting to increase a data transfer rate of the first wireless link in response to commencement of execution of the application and a change to the first setting to decrease the data transfer rate of the first wireless link in response to cessation of execution of the application.

The computer-implemented method may include monitoring performance of the first wireless link; and deriving the change of the first setting based on the performance of the first wireless link.

The computer-implemented method may include deriving, at the first WAP, a change to a second setting associated with a characteristic of a second wireless link established between the first WAP and a second endpoint, wherein the change to the second setting is based on the change to the first setting; and transmitting a second command to the second endpoint to change the second setting through at least a second secure channel established through the second wireless link.

The computer-implemented method may include deriving a change to a second setting associated with a characteristic of a second wireless link established between a second WAP and a second endpoint, wherein the change to the second setting is based on the change to the first setting; and transmitting a second command to the second endpoint to change the second setting through a second secure channel established through the second WAP and the second wireless link.

The computer-implemented method may include deriving a pattern of use of the first wireless link by an application of the first endpoint, wherein the pattern of use recurs on at least one of a time of day and a day of a week; and transmitting the first command to the first endpoint in response to reaching the at least one of the time of day and the day of a week.

A non-transitory machine-readable medium with instructions stored thereon that, when executed by a processor, may cause the processor to: establish a first wireless link between a wireless interface of a first wireless access point (WAP) and a first endpoint; exchange network traffic with the first endpoint through the first wireless link; exchange, through the first wireless link, messages associated with a first secure channel that shares the first wireless link with the network traffic; recurringly receive indications of a security status of the first endpoint through at least the first secure channel; and transmit a first command to the first endpoint to change a first setting associated with a characteristic of the first wireless link through at least the first secure channel.

The instructions may further cause the processor to: route the network traffic through the first WAP between the first wireless link and a firewall, wherein the firewall is incorporated into or is coupled to the first WAP; and exchange the messages associated with the first secure channel between a security routine of the endpoint and the firewall.

The instructions may further cause the processor to authenticate, at the firewall, the security routine of the first endpoint; and condition establishment of the first secure channel on the authentication of the security routine.

The indication of the security status may include at least one of an indication of commencement of execution of an application by a processor of the first endpoint and an indication of cessation of execution of the application by the processor of the first endpoint; and the processor may be further caused to derive the first command based on the security status, wherein the first command may include at least one of a change to the first setting to increase a data transfer rate of the first wireless link in response to commencement of execution of the application and a change to the first setting to decrease the data transfer rate of the first wireless link in response to cessation of execution of the application.

The instructions may further cause the processor to monitor performance of the first wireless link and derive the change of the first setting based on the performance of the first wireless link.

The instructions may further cause the processor to: derive a change to a second setting associated with a characteristic of a second wireless link established between the first WAP and a second endpoint, wherein the change to the second setting is based on the change to the first setting; and transmit a second command to the second endpoint to change the second setting through a secure channel established through the second wireless link.

The instructions may further cause the processor to: derive a change to a second setting associated with a characteristic of a second wireless link established between a second WAP and a second endpoint, wherein the change to the second setting is based on the change to the first setting; and transmit a second command to the second endpoint to change the second setting through a second secure channel established through the second WAP and the second wireless link.

The instructions may further cause the processor to: derive a pattern of use of the first wireless link by an application of the first endpoint, wherein the pattern of use recurs on at least one of a time of day and a day of a week; and transmit the first command to the first endpoint in response to reaching the at least one of the time of day and the day of a week.

An apparatus to provide security and wireless network service may include: a processor of a first wireless access point (WAP); a wireless interface of the first WAP coupled to the processor; and a storage of the first WAP coupled to the processor to store instructions, that when executed by the processor cause the processor to: establish a first wireless link between the wireless interface and a first endpoint; exchange network traffic with the first endpoint through the first wireless link; exchange, through the first wireless link, messages associated with a first secure channel that shares the first wireless link with the network traffic; recurringly receive indications of a security status of the first endpoint through at least the first secure channel; and transmit a first command to the first endpoint to change a first setting associated with a characteristic of the first wireless link through at least the first secure channel.

The processor may be further caused to: route the network traffic through the first WAP between the first wireless link and a firewall, wherein the firewall is incorporated into or is coupled to the first WAP; and exchanging the messages associated with first secure channel between a security routine of the endpoint and the firewall.

The processor may be further caused to: authenticate, at the firewall, the security routine of the first endpoint; and condition establishment of the first secure channel on the authentication of the security routine.

The indication of the security status may include at least one of an indication of commencement of execution of an application by a processor of the first endpoint and an indication of cessation of execution of the application by the processor of the first endpoint; and the processor may be further caused to derive the first command based on the security status, wherein the first command may include at least one of a change to the first setting to increase a data transfer rate of the first wireless link in response to commencement of execution of the application and a change to the first setting to decrease the data transfer rate of the first wireless link in response to cessation of execution of the application.

The processor may be further caused to monitor performance of the first wireless link and derive the change of the first setting based on the performance of the first wireless link.

The processor may be further caused to: derive a change to a second setting associated with a characteristic of a second wireless link established between the first WAP and a second endpoint, wherein the change to the second setting is based on the change to the first setting; and transmit a second command to the second endpoint to change the second setting through a secure channel established through the second wireless link.

The processor may be further caused to: derive a change to a second setting associated with a characteristic of a second wireless link established between a second WAP and a second endpoint, wherein the change to the second setting is based on the change to the first setting; and transmit a second command to the second endpoint to change the second setting through a second secure channel established through the second WAP and the second wireless link.

The processor may be further caused to derive a pattern of use of the first wireless link by an application of the first endpoint, wherein the pattern of use recurs on at least one of a time of day and a day of a week; and transmit the first command to the first endpoint in response to reaching the at least one of the time of day and the day of a week.

A system to maintain security and wireless network service in a facility may include: a first wireless access point (WAP) in communication with a first endpoint via a first wireless link; a second WAP in communication with a second endpoint via a second wireless link; and a firewall, that may include a processor and a non-transitory machine-readable medium with instructions stored thereon. When executed by the processor, the instructions may cause the processor to perform operations including: establish a first secure channel with the first WAP; establish a second secure channel with the second WAP; establish a third secure channel with the first endpoint via the first wireless link; establish a fourth secure channel with the second endpoint via the second wireless link; receive a first report from the first WAP, the first report including first WAP security status information and first WAP wireless network status information; receive a second report from the second WAP, the second report including second WAP security status information and second WAP wireless network status information; receive a third report from the first endpoint, the third report including first endpoint security status information and wireless network status information; determine network configuration changes based on the first report, the second report, and the third report, the network configuration changes intended to improve quality of service (QOS); and transmit a command to implement the network configuration changes to the first endpoint over the third secure channel, wherein the command directs the first endpoint to end communication with the first WAP and to establish communication with the second WAP.

A computer implemented method to maintain security and wireless network service may include: establishing, by a firewall, respective secure channels with each of a plurality of wireless access points (WAPs) and each of a plurality of endpoints; receiving, by the firewall, a plurality of reports communicated over the respective secure channels from the plurality of WAPs and the plurality of endpoints, each of the plurality of reports including security status information and wireless network status information; deriving network configuration changes based on one or more of the reports; and transmitting commands to at least a subset of the plurality of endpoints, the commands to direct implementation of the network configuration changes.

The network configuration changes may be derived based on the security status information.

The network configuration changes may be derived based on an occurrence of a security event.

The security event may have occurred on one of the endpoints of the plurality of endpoints.

The security event may have occurred on one of the WAPs.

The network configuration changes may be derived to improve network performance.

The network configuration changes may be derived based on wireless network status information.

The network configuration changes may be derived in response to network congestion detected in wireless network status information.

The network configuration changes may include switching a coupling of one endpoint of the plurality of endpoints from a coupling through a first wireless link with a first WAP of the plurality of WAPs to a coupling through a second wireless link to a second WAP of the plurality of WAPs.

The network configuration changes may include changing a wireless network channel or data transmission rate.

The network configuration changes may include balancing assignment of the endpoints to the WAPs.

The balancing may be based on availability of the WAPs to the endpoints.

A network device may include: a processor; and a non-transitory machine-readable medium with instructions stored thereon that, when executed by the processor, cause the processor to perform operations including: establish secure channels with each of a plurality of wireless access points (WAPs) and each of a plurality of endpoints; receive a plurality of reports communicated over the respective secure channels from the plurality of WAPs and the plurality of endpoints, each of the plurality of reports including security status information and wireless network status information; derive network configuration changes based on one or more of the reports; and transmit commands to at least a subset of the endpoints, the commands to direct implementation of the network configuration changes.

The network configuration changes may be derived based on the security status information.

The network configuration changes may be derived based on an occurrence of a security event.

The network configuration changes may be derived to improve network performance.

The network configuration changes may be derived based on wireless network status information.

The network configuration changes may include switching a coupling of one endpoint of the plurality of endpoints from a coupling through a first wireless link with a first WAP of the plurality of WAPs to a coupling through a second wireless link to a second WAP of the plurality of WAPs.

The network configuration changes may include changing a wireless network channel or data transmission rate.

A computer-implemented method to maintain security and wireless network service in a facility may include: establishing, by a firewall, a first secure channel with a first wireless access point (WAP) and a second secure channel with a second WAP; establishing, by the firewall, a third secure channel with an endpoint through a wireless link between the endpoint and the first WAP; receiving a first report from the first WAP, the first report including first WAP security status information and first WAP wireless network status information; receiving a second report from the second WAP, the second report including second WAP security status information and second WAP wireless network status information; receiving a third report from the endpoint, the third report including endpoint security status information and wireless network status information; deriving network configuration changes based on the first report, the second report, and the third report, the network configuration changes intended to improve quality of service (QOS); and transmitting a commands to the first WAP over the first secure channel, to the second WAP over the second secure channel, and to the endpoint over the third secure channel, wherein the commands direct implementation of the network configuration changes.

A network device may include a processor; and a non-transitory machine-readable medium with instructions stored thereon. When executed by the processor, the instructions may cause the processor to perform operations including: establish a first secure channel with a first wireless access point (WAP) and a second secure channel with a second WAP; establish a third secure channel with an endpoint through a wireless link between the endpoint and the first WAP; receive a first report from the first WAP, the first report including first WAP security status information and first WAP network status information; receive a second report from the second WAP, the second report including second WAP security status information and second WAP wireless network status information; receive a third report from the endpoint, the third report including endpoint security status information and wireless network status information; derive network configuration changes based on the first report, the second report, and the third report, the network configuration changes intended to improve quality of service (QOS); and transmit commands to the first WAP over the first secure channel, to the second WAP over the second secure channel, and to the endpoint over the third secure channel, wherein the commands direct implementation of the network configuration changes.

BRIEF DESCRIPTION OF THE DRAWINGS

This disclosure is illustrated by way of example, and not by way of limitation, in the accompanying figures in which like reference numerals are used to refer to similar elements.

DETAILED DESCRIPTION

Figure 1:
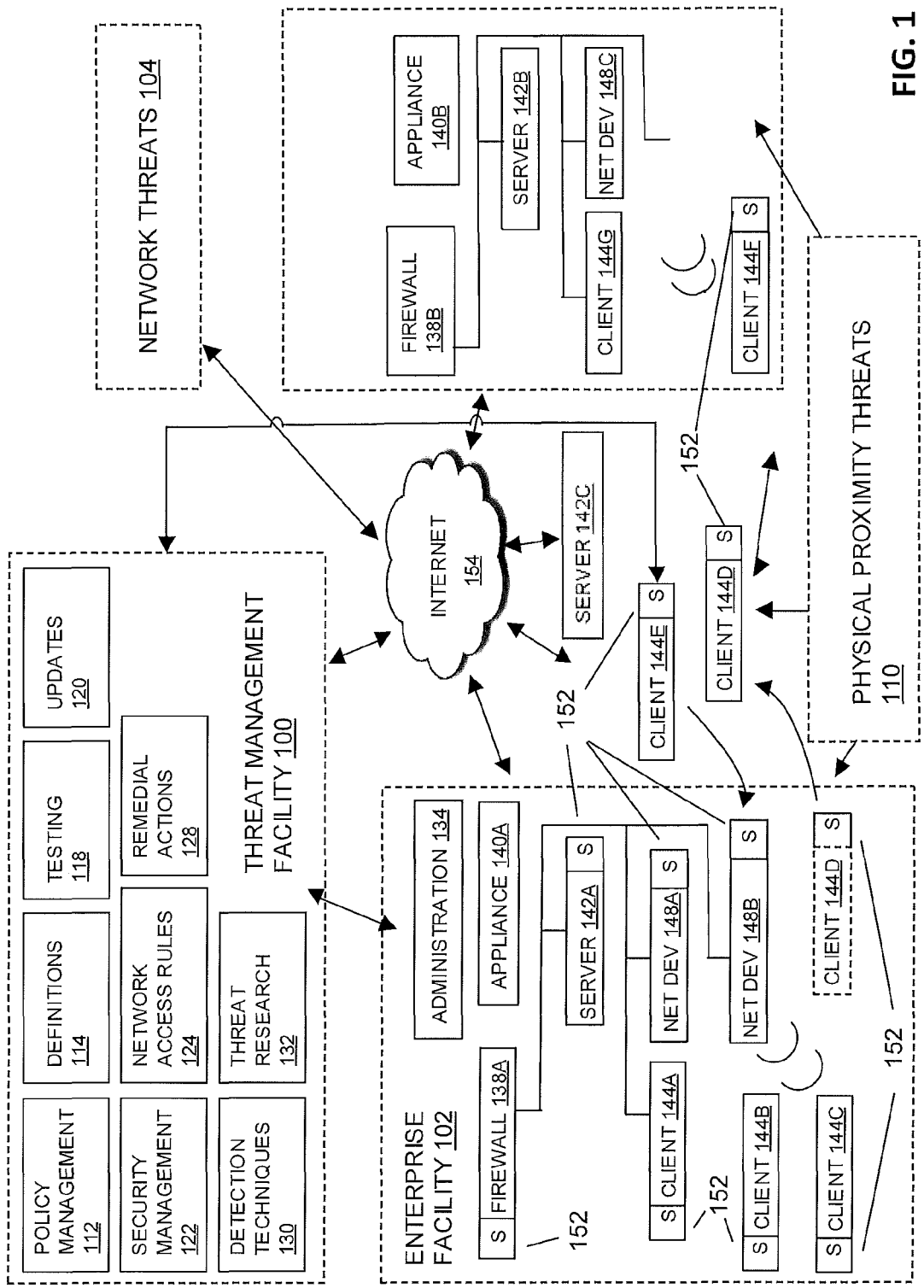
FIG. 1 illustrates an example implementation of a threat management environment according to at least some implementations.

Implementations will now be described with reference to the accompanying figures. The implementations may, however, be embodied in many different forms and should not be construed as limited to the illustrated examples set forth herein.

Various implementations of a method include exchanging security information, such as indications of a security status of an endpoint, and networking information, such as commands to improve quality of service (QOS) of a wireless link, through a secure channel established through the wireless link. The wireless link may extend between the endpoint and a wireless access point (WAP), and the secure channel shares the wireless link with other network traffic exchanged between the endpoint and WAP. The secure channel may extend beyond one end of the wireless link and to a security routine executed within the endpoint in a manner secured from access or interference by other routines that are also executed within the endpoint. The secure channel may extend beyond the other end of the wireless link and through the WAP to at least a firewall or a server that serves as a supervisor. Implementations of the method may include monitoring one or more characteristics of the wireless link, deriving at least one change to at least one characteristic of the wireless link, and transmitting a command to make the at least one change through the secure channel to the security routine in response to at least one characteristic falling outside of a threshold. Such implementations may include the security routine operating a wireless interface of the endpoint to affect the at least one change to the wireless link specified in the command. Implementations of the method may include monitoring the security status of the endpoint and recurringly transmitting the indications thereof to at least the firewall through the secure channel for analysis. In various implementations, an endpoint, a WAP, a firewall, a supervisor, and/or a networking system may each perform at least a portion of the method.

Various implementations of a networking system establish secure channels within wireless links established with endpoints to enable coordination with security routines executed by the endpoints to maintain security and to enable coordination of the network, for example to improve at least one characteristic of the wireless links. The networking system may include at least one WAP to provide the wireless links to the endpoints and at least one firewall to establish the secure channels within at least a subset of the wireless links. In some implementations, the at least one firewall may serve as a gateway for the endpoints to another network, such as the Internet. The endpoints may access such another network through the wireless links established with the at least one WAP, and the at least one firewall. At least in implementations that include numerous WAPs and/or firewalls, the networking system may include at least one server, which may be a WAP, a firewall, or a cloud server, for example, that serves as a supervisor. The supervisor may be accessible to the at least one firewall through such another network as the Internet.

Within each endpoint, a processor may execute a security routine to monitor the security status of the endpoint. At least a portion of the security routine may be maintained within a secure zone during its execution to prevent access thereto and/or interference therewith by other routines that may also be executed within the endpoint, including one or more of an operating system (OS), device drivers, applications and/or malware. The security routine may, for example, monitor resource requests and resources used by applications. The security routine may scan portions of other routines for patterns of instructions and/or sequences of bits that match known pieces of malware and/or may monitor the execution of other routines for patterns of behavior that may be associated with malware. Alternatively or additionally, the security routine may employ any of a variety of techniques to detect and/or mitigate the behavior of malware.

One or more other routines executed within the endpoint, such as an OS and/or a network driver may interact with a wireless communication device such as a radio incorporated into, coupled to or otherwise associated with the endpoint, to communicate with a WAP of the networking system to establish a wireless link between the endpoint and the WAP to enable network communications therewith. With the wireless link established, the one or more other routines may engage in exchanges of network traffic therethrough for any of a variety of purposes, including exchanges of application data such as emails and/or instant messages, downloads of media files and/or program data, such as applications, etc. The security routine may exchange security credentials and/or otherwise cooperate with a firewall of the networking system to be authenticated therewith through the wireless link and the WAP. Following such authentication, the firewall may establish a secure channel with the security routine through the wireless link and the WAP. Thus, the secure channel may share the wireless link with the network traffic engaged in by the one or more other routines executed within the endpoint. In some implementations, authentication of the security routine may be entirely separate from any authentication that may be a prerequisite to earlier establishment of the wireless link between the endpoint and the WAP. In this way, the secure channel may be secured from interference by the one or more other routines executed within the endpoint.

Through the secure channel, the security routine may recurringly transmit indications of the security status of the endpoint. Such recurring transmissions may be made on a recurring interval of time and/or may be triggered by events detected by the security routine within the endpoint, including instances of having detected a potential or actual threat, such as a compromising of security of the endpoint, a policy violation, malware and/or having taken action against a piece of malware. Such recurring transmissions may provide a form of security "heartbeat" signal for another device, such as a firewall to recurringly analyze in connection with monitoring the security status of the endpoint.

Also through the secure channel, the security routine may send or receive networking information, such as a command to change a setting within the wireless interface of the endpoint by which the endpoint established and maintains the wireless link. Such a command to change a setting may include a change to a radio frequency, an encoding of data, a selection of protocols, a protocol timing, etc. In response to the command, the security routine may access the wireless interface to effect the change specified in the command, and may do so by communicating with or in a manner that bypasses a network driver or other routine that may otherwise normally access and control the wireless interface.

A WAP of the networking system may establish wireless links with endpoints that may come within range of thereof. Such a WAP may serve as a router to route network traffic engaged in by one or more routines of an endpoint between the wireless link established with the endpoint and a firewall, which in turn, may serve as a gateway to another network such as the Internet. Where a security routine of the endpoint and the firewall establish a secure channel through the wireless link and the WAP, the WAP may also route the secure channel between the wireless link and the firewall alongside other network traffic.

In some implementations, the WAP may also monitor the QOS of the wireless link to identify instances in which an aspect of the QOS falls outside a QOS threshold. Such a threshold may include a minimum rate of data throughput to be maintained, a maximum delay in performing a portion of a protocol not to be exceeded, a number of devices connected to or attempting to connect to the WAP, a configuration of wireless devices connected to or attempting to connect to the WAP, etc. In response to an aspect of the QOS of the wireless link having fallen outside a QOS threshold and/or in response to a predicted or anticipated possibility of an aspect of the QOS of the wireless link falling outside a QOS threshold, a processor of the WAP may derive a change in a characteristic of the wireless link to improve the QOS of the wireless link. However, beyond improving and/or maintaining the QOS to the extent of preventing aspects of the QOS from falling outside one or more QOS thresholds, further improvement in the QOS may be defined by further refinement of various aspects to enable the data throughput of the wireless link to be further increased.

In some implementations, a WAP may also monitor one or more characteristics of a wireless link to identify instances in which one of those characteristics falls outside a threshold that may specify a minimum, a maximum and/or some other limitation of a characteristic. Such a characteristic may include, for example, a carrier frequency, an amplitude, a signal-to-noise ratio, an aspect of a shape of a waveform, a bandwidth, a separation between frequencies employed by different channels, a frequency shift, a shift in a waveform, a malformed transition in a waveform, a synchronization characteristic, a dropped portion of a protocol, a data error rate, a dropped packet rate, etc. Such characteristics may be associated with one or more aspects of QOS of the wireless link, and accordingly, an instance of such a characteristic falling outside a threshold may be associated with an aspect of QOS falling outside a QOS threshold such as a minimum rate of data throughput to be maintained, a maximum delay in performing a portion of a protocol not to be exceeded, etc. In response to one or more characteristics of the link falling outside a threshold and/or in response to an anticipated or predicted possibility of one or more characteristics of the link falling outside a threshold, a processor of the WAP may derive a change to make in one or more characteristics of the wireless link to improve the QOS of the wireless link. It should be noted that the one or more characteristics that are found to have fallen outside a threshold and/or are predict to fall outside a threshold may not coincide with the one or more characteristics to which a change is derived to be effected. Instead the various physical properties of a wireless link, whether based on radio frequency (RF) technology, or not, may be relied upon to provide a relationship among two or more characteristics of the wireless link that may be exploited.

Where a change is able to be effected by a WAP without cooperation with another device, the WAP may proceed with effecting the change. Where at least a portion of the change may be effected by the endpoint (e.g., where the change involves coordination on both ends of the wireless link), the WAP may, for example, transmit a request for a firewall or supervisor to transmit a command to the endpoint (e.g., the security routine of the endpoint) to make the change. The request may be made to effect the change immediately, or for example, at a particular time, or upon the occurrence of a specified event, such as when there has been no outgoing network traffic from the endpoint for a defined period of time. The request may be made to the endpoint to facilitate the change and minimize user disruption. Upon receiving the request, the firewall or supervisor may transmit the command to the security routine executed within the endpoint through the secure channel, and the security routine may then effect the change specified in the command. In some implementations, requests to change a characteristic may be directed to multiple endpoints. In some implementations, changes also may be coordinated with one or more WAPs, one or more firewalls, one or more routers, gateways, and/or other networking infrastructure devices as well as one or more endpoints.

A firewall may serve as a gateway to another network, such as the Internet. In so doing, the firewall may impose various limits on the access it provides to such another network in accordance with one or more rules. Alternatively or additionally, the firewall may analyze various characteristics of the network traffic that passes through it between such another network and one or more WAPs to identify portions of the network traffic that should not be allowed to pass through the firewall. For example, a firewall may analyze the contents of packets exchanged in the network traffic for data patterns indicative of malware. For example, a firewall may evaluate the history or reputation of one or more network addresses with which network traffic is exchanged.

The firewall may authenticate a security routine executed within an endpoint. In response to a successful authentication, the firewall may establish a secure channel with the security routine that extends through the WAP and the wireless link that are between the firewall and the endpoint. The firewall may receive indications of the security status of the endpoint through the secure channel. The firewall and the security routine may exchange security related information as part of cooperating in any of a variety of ways to maintain security against compromise. The firewall and the security routine also may exchange network-related information, such as information about the status of a wireless link or the network, signal quality, noise/interference levels, statistics, etc., as well as commands to configure or adjust the access or use of the network. For example, the firewall may receive a request to transmit a command to the security routine of an endpoint to configure or adjust network-related parameters, such as to make a change in a setting that affects a characteristic of the wireless link established between the WAP and the endpoint in which the security routine is executed, such as interface configurations, connection speeds, parameter settings, etc., to direct the endpoint to use a different protocol or channel, or to direct the endpoint to connect to a different WAP. In response, the firewall may transmit that command to the security routine via the secure channel such that the secure channel is employed to convey information and/or commands related to both security and network QOS.

In some implementations, a change to be made in a network parameter, such as a characteristic of a wireless link may require coordination with another WAP, instead of or in addition to coordination with a security routine executed within an endpoint. By way of example, improving the QOS of a wireless link may require a change in such a characteristic as frequency that may interfere with one or more other wireless links associated with another nearby WAP. In some implementations, the WAP may exchange communications with the other WAP and/or devices connected to that other WAP through the firewall to coordinate changes to be made in wireless links by both WAPs. Alternatively or additionally, each WAP may recurringly transmit characteristics of wireless links established with endpoints to the firewall along with indications of the level of QOS observed in those wireless links. In such implementations, the firewall may derive changes that are to be made to multiple wireless links in a coordinated manner, and may transmit commands to multiple WAPs and/or security routines executed within endpoints to effect those changes in a coordinated manner. As another example, if an endpoint is directed to connect to a different WAP, the different WAP may be provided with connection and routing information relevant to the endpoint.

As previously discussed, some implementations of a networking system may additionally include one or more servers that serve as a supervisor. The supervisor may be included in a WAP, a firewall, and/or another device. The supervisor may establish secure channels with firewalls through another network (e.g., the Internet) to which each of those firewalls may serve as a gateway. Each of the firewalls may recurringly exchange security related information with the supervisor through the secure channel that is established between each and the supervisor. In particular, the supervisor may distribute security related updates to the firewalls through those secure channels. The firewalls may, in turn, distribute appropriate ones of those updates to WAPs and/or the security routines executed within the endpoints. In at least situations in which a change in a characteristic of a wireless link associated with one WAP coupled to one firewall requires coordination with at least one other WAP coupled to a different firewall, communications with those WAPs and/or those firewalls may be routed through the supervisor and/or otherwise coordinated by the supervisor. In some implementations, requests described here as made to a firewall may be passed on by a firewall to a supervisor. The supervisor may respond to the requests and communicate via the firewall as appropriate FIG. 1 illustrates an environment for threat management. Specifically, FIG. 1 depicts a block diagram of a threat management system providing protection to an enterprise against a plurality of threats—a context in which the following techniques may usefully be deployed. One aspect relates to corporate policy management and implementation through a unified threat management facility 100. As will be explained in more detail below, a threat management facility 100 may be used to protect computer assets from many threats, both computer-generated threats and user-generated threats. The threat management facility 100 may be multi-dimensional in that it may be designed to protect corporate assets from a variety of threats and it may be adapted to learn about threats in one dimension (e.g. worm detection) and apply the knowledge in another dimension (e.g. spam detection). Policy management is one of the dimensions for which the threat management facility can provide a control capability. A corporation or other entity may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

It should be understood that the threat management facility 100 may provide multiple services, and policy management may be offered as one of the services. We will now turn to a description of certain capabilities and components of the threat management system 100.

Over recent years, malware has become a problem across the Internet 154. From both a technical perspective and a user perspective, the categorization of a specific threat type, whether as virus, worm, spam, phishing exploration, spyware, adware, or the like, is becoming reduced in significance. The threat, no matter how it is categorized, may need to be stopped at various points of a networked computing environment, such as one of an enterprise facility 102, including at one or more laptops, desktops, servers, gateways, communication ports, handheld or mobile devices, firewalls, and the like. Similarly, there may be less and less benefit to the user in having different solutions for known and unknown threats. As such, a consolidated threat management facility 100 may need to apply a similar set of technologies and capabilities for all threats. In certain implementations, the threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have led to a rapid increase in the speed at which threats may move. Today, an unprotected PC connected to the Internet 154 may be infected quickly (perhaps within 10 minutes) which may require acceleration for the delivery of threat protection. Where once monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an implementation, FIG. 1 may depict a block diagram of the threat management facility 100 providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations, and may include administration 134, a firewall 138A, an appliance 140A, server 142A, network devices 148A-B, clients 144A-D, such as protected by computer security facilities 152, and the like. It will be understood that any reference herein to client facilities may include the clients 144A-D shown in FIG. 1 and vice-versa. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In implementations, the threat protection provided by the threat management facility 100 may extend beyond the network boundaries of the enterprise facility 102 to include clients 144D (or client facilities) that have moved into network connectivity not directly associated or controlled by the enterprise facility 102. Threats to client facilities may come from a plurality of sources, such as from network threats 104, physical proximity threats 110, secondary location threats 108, and the like. Clients 144A-D may be protected from threats even when the client 144A-D is not located in association with the enterprise 102, such as when a client 144E-F moves in and out of the enterprise facility 102, for example when interfacing with an unprotected server 142C through the Internet 154, when a client 144F is moving into a secondary location threat 108 such as interfacing with components 140B, 142B, 148C, 148D that are not protected, and the like. In implementations, the threat management facility 100 may provide an enterprise facility 102 protection from a plurality of threats to multiplatform computer resources in a plurality of locations and network configurations, with an integrated system approach.

In implementations, the threat management facility 100 may be provided as a stand-alone solution. In other implementations, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, reputation-based filtering, control of unauthorized users, control of guest and non-compliant computers, and the like. The security management facility 122 may be a software application that may provide malicious code and malicious application protection to a client facility computing resource. The security management facility 122 may have the ability to scan the client facility files for malicious code, remove or quarantine certain applications and files, prevent certain actions, perform remedial actions and perform other security measures. In implementations, scanning the client facility may include scanning some or all of the files stored to the client facility on a periodic basis, scanning an application when the application is executed, scanning files as the files are transmitted to or from the client facility, or the like. The scanning of the applications and files may be performed to detect known malicious code or known unwanted applications. In an implementation, new malicious code and unwanted applications may be continually developed and distributed, and updates to the known code database may be provided on a periodic basis, on a demand basis, on an alert basis, or the like.

The security management facility 122 may provide email security and control, where security management may help to eliminate spam, viruses, spyware and phishing, control of email content, and the like. The security management facility's 122 email security and control may protect against inbound and outbound threats, protect email infrastructure, prevent data leakage, provide spam filtering, and the like. In an implementation, security management facility 122 may provide for web security and control, where security management may help to detect or block viruses, spyware, malware, unwanted applications, help control web browsing, and the like, which may provide comprehensive web access control enabling safe, productive web browsing. Web security and control may provide Internet use policies, reporting on suspect devices, security and content filtering, active monitoring of network traffic, URI filtering, and the like. In an implementation, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In implementations, a VPN may be treated in the same manner as a physical network.

The security management facility 122 may provide host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running. Whereas runtime protection may only interrupt code that has already partly executed, behavioral protection can identify malicious code at the gateway or on the file servers and delete the code before it can reach endpoint computers and the like.

The security management facility 122 may provide reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In implementations, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In implementations, this type of information feedback may enable the evaluation or profiling of client actions that are violations of policy that may provide a predictive model for the improvement of enterprise policies.

The security management facility 122 may support overall security of the enterprise facility 102 network or set of enterprise facility 102 networks, e.g., by providing updates of malicious code information to the enterprise facility 102 network and associated client facilities. The updates may include a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or otherwise distributed. The security management facility 122 may manage the receipt of malicious code descriptions from a provider, distribution of the malicious code descriptions to enterprise facility 102 networks, distribution of the malicious code descriptions to client facilities, and so forth.

The threat management facility 100 may provide a policy management facility 112 that may be able to block non-malicious applications, such as VoIP, instant messaging, peer-to-peer file-sharing, and the like, that may undermine productivity and network performance within the enterprise facility 102. The policy management facility 112 may be a set of rules or policies that may indicate enterprise facility 102 access permissions for the client facility, such as access permissions associated with the network, applications, external computer devices, and the like. The policy management facility 112 may include a database, a text file, a combination of databases and text files, or the like. In an implementation, a policy database may be a block list, a black list, an allowed list, a white list, or the like that may provide a list of enterprise facility 102 external network locations/applications that may or may not be accessed by the client facility. The policy management facility 112 may include rules that may be interpreted with respect to an enterprise facility 102 network access request to determine if the request should be allowed. The rules may provide a generic rule for the type of access that may be granted. The rules may be related to the policies of an enterprise facility 102 for access rights for the enterprise facility's 102 client facility. For example, there may be a rule that does not permit access to sporting websites. When a website is requested by the client facility, a security facility may access the rules within a policy facility to determine if the requested access is related to a sporting website. In an implementation, the security facility may analyze the requested website to determine if the website matches with any of the policy facility rules.

The policy management facility 112 may be similar to the security management facility 122 but with the addition of enterprise facility 102 wide access rules and policies that may be distributed to maintain control of client facility access to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict IM activity to only support personnel for communicating with customers. This may allow communication for departments requiring access, but may maintain the network bandwidth for other activities by restricting the use of IM to only the personnel that need access to instant messaging (IM) in support of the enterprise facility 102. In an implementation, the policy management facility 112 may be a stand-alone application, may be part of the network server facility 142, may be part of the enterprise facility 102 network, may be part of the client facility, or the like.

The threat management facility 100 may provide configuration management, which may be similar to policy management, but may specifically examine the configuration set of applications, operating systems, hardware, and the like, and manage changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

The threat management facility 100 may also provide for the removal of applications that potentially interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a quickly evolving malware environment may require timely updates, and thus an update management facility 120 may be provided by the threat management facility 100. In addition, a policy management facility 112 may also require update management (e.g., as provided by the update facility 120 herein described). The update management for the security facility 122 and policy management facility 112 may be provided directly by the threat management facility 100, such as by a hosted system or in conjunction with the administration facility 134. In implementations, the threat management facility 100 may provide for patch management, where a patch may be an update to an operating system, an application, a system tool, or the like, where one of the reasons for the patch is to reduce vulnerability to threats.

The security facility 122 and policy management facility 112 may push information to the enterprise facility 102 network and/or client facility. The enterprise facility 102 network and/or client facility may also or instead pull information from the security facility 122 and policy management facility 112 network server facilities 142, or there may be a combination of pushing and pulling of information between the security facility 122 and the policy management facility 112 network servers 142, enterprise facility 102 network, and client facilities, or the like. For example, the enterprise facility 102 network and/or client facility may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility by providing notification that there are updates available for download and then transmitting the information. The combination of the security management 122 network server facility 142 and security update module may function substantially the same as the policy management facility 112 network server and policy update module by providing information to the enterprise facility 102 network and the client facility in a push or pull method. In an implementation, the policy management facility 112 and the security facility 122 management update modules may work in concert to provide information to the enterprise facility's 102 network and/or client facility for control of application execution. In an implementation, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The virus identity (IDE) definition files may provide information that may identify malicious code within files, applications, or the like. The definition files may be accessed by security management facility 122 when scanning files or applications within the client facility for the determination of malicious code that may be within the file or application. The definition files may contain a number of commands, definitions, or instructions, to be parsed and acted upon, or the like. In implementations, the client facility may be updated with new definition files periodically to provide the client facility with the most recent malicious code definitions; the updating may be performed on a set time period, may be updated on demand from the client facility, may be updated on demand from the network, may be updated on a received malicious code alert, or the like. In an implementation, the client facility may request an update to the definition files from an update facility 120 within the network, may request updated definition files from a computing facility external to the network, updated definition files may be provided to the client facility 114 from within the network, definition files may be provided to the client facility from an external computing facility from an external network, or the like.

A definition management facility 114 may provide timely updates of definition files information to the network, client facilities, and the like. New and altered malicious code and malicious applications may be continually created and distributed to networks worldwide. The definition files that maintain the definitions of the malicious code and malicious application information for the protection of the networks and client facilities may need continual updating to provide continual defense of the network and client facility from the malicious code and malicious applications. The definition files management may provide for automatic and manual methods of updating the definition files. In implementations, the network may receive definition files and distribute the definition files to the network client facilities, the client facilities may receive the definition files directly, or the network and client facilities may both receive the definition files, or the like. In an implementation, the definition files may be updated on a fixed periodic basis, on demand by the network and/or the client facility, as a result of an alert of a new malicious code or malicious application, or the like. In an implementation, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide controlled access to the enterprise facility 102 networks. For instance, a manager of the enterprise facility 102 may want to restrict access to certain applications, networks, files, printers, servers, databases, or the like. In addition, the manager of the enterprise facility 102 may want to restrict user access based on certain criteria, such as the user's location, usage history, need to know, job position, connection type, time of day, method of authentication, client-system configuration, or the like. Network access rules may be developed for the enterprise facility 102, or pre-packaged by a supplier, and managed by the threat management facility 100 in conjunction with the administration facility 134.

A network access rules facility 124 may be responsible for determining if a client facility application should be granted access to a requested network location. The network location may be on the same network as the facility or may be on another network. In an implementation, the network access rules facility 124 may verify access rights for client facilities from within the network or may verify access rights of computer facilities from external networks. When network access for a client facility is denied, the network access rules facility 124 may send an information file to the client facility containing. For example, the information sent by the network access rules facility 124 may be a data file. The data file may contain a number of commands, definitions, instructions, or the like to be parsed and acted upon through the remedial action facility 128, or the like. The information sent by the network access facility rules facility 124 may be a command or command file that the remedial action facility 128 may access and take action upon.

The network access rules facility 124 may include databases such as a block list, a black list, an allowed list, a white list, an unacceptable network site database, an acceptable network site database, a network site reputation database, or the like of network access locations that may or may not be accessed by the client facility. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites, controlling instant messenger accesses, or the like. Rule evaluation may include regular expression rule evaluation, or other rule evaluation method for interpreting the network access request and comparing the interpretation to the established rules for network access. In an implementation, the network access rules facility 124 may receive a rules evaluation request from the network access control and may return the rules evaluation to the network access control.

Similar to the threat definitions facility 114, the network access rule facility 124 may provide updated rules and policies to the enterprise facility 102. The network access rules facility 124 may be maintained by the network administration facility 134, using network access rules facility 124 management. In an implementation, the network administration facility 134 may be able to maintain a set of access rules manually by adding rules, changing rules, deleting rules, or the like. Additionally, the administration facility 134 may retrieve predefined rule sets from a remote provider of a set of rules to be applied to an entire enterprise facility 102. The network administration facility 134 may be able to modify the predefined rules as needed for a particular enterprise facility 102 using the network access rules management facility 124.

When a threat or policy violation is detected by the threat management facility 100, the threat management facility 100 may perform or initiate a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility network access request has been denied. In an implementation, when the data file is received, remedial action may parse the data file, interpret the various aspects of the data file, and act on the parsed data file information to determine actions to be taken on an application requesting access to a denied network location. In an implementation, when the data file is received, remedial action may access the threat definitions to parse the data file and determine an action to be taken on an application requesting access to a denied network location. In an implementation, the information received from the facility may be a command or a command file. The remedial action facility may carry out any commands that are received or parsed from a data file from the facility without performing any interpretation of the commands. In an implementation, the remedial action facility may interact with the received information and may perform various actions on a client requesting access to a denied network location. The action may be one or more of continuing to block all requests to a denied network location, a malicious code scan on the application, a malicious code scan on the client facility, quarantine of the application, terminating the application, isolation of the application, isolation of the client facility to a location within the network that restricts network access, blocking a network access port from a client facility, reporting the application to an administration facility 134, or the like.

Remedial action may be provided as a result of a detection of a threat or violation. The detection techniques facility 130 may include monitoring the enterprise facility 102 network or endpoint devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility, and the like. This may provide the capability of not allowing a streaming file or portions of the streaming file containing malicious code from entering the client facility, gateway facility, or network. In an implementation, the streaming file may be broken into blocks of information, and a plurality of virus identities may be used to check each of the blocks of information for malicious code. In an implementation, any blocks that are not determined to be clear of malicious code may not be delivered to the client facility, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility computing facilities on a network. The administration facility 134 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 134. The administration facility 134 may be able to determine the level of preparedness of the client facility computing facilities by the reported information. Remedial action may be taken for any of the client facility computing facilities as determined by the administration facility 134; remedial action may be taken by the administration facility 134 or by the user of the client facility.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In implementations, through threat research, the threat management facility 100 may be able to provide swift, global responses to the latest threats.

The threat management facility 100 may provide threat protection to the enterprise facility 102, where the enterprise facility 102 may include a plurality of networked components, such as client facility, server facility 142, administration facility 134, firewall 138, gateway, hubs and routers 148, threat management appliance 140, desktop users, mobile users, and the like. In implementations, it may be the endpoint computer security facility 152, located on a computer's desktop, which may provide threat protection to a user, and associated enterprise facility 102. In implementations, the term endpoint may refer to a computer system that may source data, receive data, evaluate data, buffer data, or the like (such as a user's desktop computer as an endpoint computer), a firewall as a data evaluation endpoint computer system, a laptop as a mobile endpoint computer, a personal digital assistant or tablet as a hand-held endpoint computer, a mobile phone as an endpoint computer, or the like. In implementations, endpoint may refer to a source or destination for data, including such components where the destination is characterized by an evaluation point for data, and where the data may be sent to a subsequent destination after evaluation. The endpoint computer security facility 152 may be an application loaded onto the computer platform or computer support component, where the application may accommodate the plurality of computer platforms and/or functional requirements of the component. For instance, a client facility computer may be one of a plurality of computer platforms, such as Windows, Macintosh, Linux, and the like, where the endpoint computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs and routers 148, server facility 142, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility computing platforms on which the endpoint computer security facility 152 is adapted. A client facility computing platform may be a computer system that is able to access a service on another computer, such as a server facility 142, via a network. This client facility server facility 142 model may apply to a plurality of networked applications, such as a client facility connecting to an enterprise facility 102 application server facility 142, a web browser client facility connecting to a web server facility 142, an e-mail client facility retrieving e-mail from an Internet 154 service provider's mail storage servers 142, and the like. In implementations, traditional large client facility applications may be switched to websites, which may increase the browser's role as a client facility. Clients 144 may be classified as a function of the extent to which they perform their own processing. For instance, client facilities are sometimes classified as a fat client facility or thin client facility. The fat client facility, also known as a thick client facility or rich client facility, may be a client facility that performs the bulk of data processing operations itself, and does not necessarily rely on the server facility 142. The fat client facility may be most common in the form of a personal computer, where the personal computer may operate independent of any server facility 142. Programming environments for fat clients 144 may include CURT, Delphi, Droplets, Java, win32, X11, and the like. Thin clients 144 may offer minimal processing capabilities, for instance, the thin client facility may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility may also be a mix of the two, such as processing data locally, but relying on a server facility 142 for data storage. As a result, this hybrid client facility may provide benefits from both the fat client facility type, such as multimedia support and high performance, and the thin client facility type, such as high manageability and flexibility. In implementations, the threat management facility 100, and associated endpoint computer security facility 152, may provide seamless threat protection to the plurality of clients 144, and client facility types, across the enterprise facility 102.

The enterprise facility 102 may include a plurality of server facilities 142, such as application servers, communications servers, file servers, database servers, proxy servers, mail servers, fax servers, game servers, web servers, and the like. A server facility 142, which may also be referred to as a server facility 142 application, server facility 142 operating system, server facility 142 computer, or the like, may be an application program or operating system that accepts client facility connections in order to service requests from clients 144. The server facility 142 application may run on the same computer as the client facility using it, or the server facility 142 and the client facility may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In implementations, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an implementation, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In an alternate implementation, the enterprise facility 102 may be managed remotely from a third party, vendor, or the like, without an appliance facility 140 located within the enterprise facility 102. In this instance, the appliance functionality may be a shared hardware product between pluralities of enterprises 102. In implementations, the appliance facility 140 may be located at the enterprise facility 102, where the enterprise facility 102 maintains a degree of control. In implementations, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs and routers, gateways, print servers, net modems, and the like. These simple server facility appliances may not require configuration by the enterprise facility 102, but may require protection from threats via an endpoint computer security facility 152. These appliances may provide interconnection services within the enterprise facility 102 network, and therefore may advance the spread of a threat if not properly protected.

A client facility may be protected from threats from within the enterprise facility 102 network using a personal firewall, which may be a hardware firewall, software firewall, or combination of these, that controls network traffic to and from a client. The personal firewall may permit or deny communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In implementations, the personal firewall may be provided by the threat management facility 100.

Another important component that may be protected by an endpoint computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network." Since firewall facilities 138 represent boundaries between threat levels, the endpoint computer security facility 152 associated with the firewall facility 138 may provide resources that may control the flow of threats at this enterprise facility 102 network entry point. Firewall facilities 138, and associated endpoint computer security facility 152, may also be associated with a network node that may be equipped for interfacing between networks that use different protocols. In implementations, the endpoint computer security facility 152 may provide threat protection in a plurality of network infrastructure locations, such as at the enterprise facility 102 network entry point, i.e. the firewall facility 138 or gateway; at the server facility 142; at distribution points within the network, i.e. the hubs and routers 148; at the desktop of client facility computers; and the like. In implementations, the most effective location for threat detection may be at the user's computer desktop endpoint computer security facility 152.

The interface between the threat management facility 100 and the enterprise facility 102, and through the appliance facility 140 to embedded endpoint computer security facilities, may include a set of tools that may be the same for all enterprise implementations, but allow each enterprise to implement different controls. In implementations, these controls may include both automatic actions and managed actions. Automatic actions may include downloads of the endpoint computer security facility 152 to components of the enterprise facility 102, downloads of updates to existing endpoint computer security facilities of the enterprise facility 102, uploaded network interaction requests from enterprise facility 102 components to the threat management facility 100, and the like. In implementations, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM and VoIP; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In implementations, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities within the enterprise facility 102 may be connected to the enterprise facility 102 network by way of wired network facilities 148A or wireless network facilities 148B. Client facilities connected to the enterprise facility 102 network via a wired facility 148A or wireless facility 148B may receive similar protection, as both connection types are ultimately connected to the same enterprise facility 102 network, with the same endpoint computer security facility 152, and the same threat protected enterprise facility 102 environment. Mobile wireless facility clients 144B-F, because of their ability to connect to any wireless 148B,D network access point, may connect to the Internet 154 outside the enterprise facility 102, and therefore outside the threat-protected environment of the enterprise facility 102. In this instance the mobile client facility (e.g., the clients 144B-F), if not for the presence of the endpoint computer security facility 152 may experience a malware attack or perform actions counter to enterprise facility 102 established policies. In addition, there may be a plurality of ways for the threat management facility 100 to protect the out-of-enterprise facility 102 mobile client facility (e.g., the clients 144D-F) that has an embedded endpoint computer security facility 152, such as by providing URI filtering in personal routers, using a web appliance as a DNS proxy, or the like. Mobile client facilities that are components of the enterprise facility 102 but temporarily outside connectivity with the enterprise facility 102 network may be provided with the same threat protection and policy control as client facilities inside the enterprise facility 102. In addition, mobile the client facilities may receive the same interactions to and from the threat management facility 100 as client facilities inside the enterprise facility 102, where the mobile client facilities may be considered a virtual extension of the enterprise facility 102, receiving all the same services via their embedded endpoint computer security facility 152.

Interactions between the threat management facility 100 and the components of the enterprise facility 102, including mobile client facility extensions of the enterprise facility 102, may ultimately be connected through the Internet 154. Threat management facility 100 downloads and upgrades to the enterprise facility 102 may be passed from the firewalled networks of the threat management facility 100 through to the endpoint computer security facility 152 equipped components of the enterprise facility 102. In turn the endpoint computer security facility 152 components of the enterprise facility 102 may upload policy and access requests back across the Internet 154 and through to the threat management facility 100. The Internet 154 however, is also the path through which threats may be transmitted from their source. These network threats 104 may include threats from a plurality of sources, including without limitation, websites, e-mail, IM, VoIP, application software, and the like. These threats may attempt to attack a mobile enterprise client facility (e.g., the clients 144B-F) equipped with an endpoint computer security facility 152, but in implementations, as long as the mobile client facility is embedded with an endpoint computer security facility 152, as described above, threats may have no better success than if the mobile client facility were inside the enterprise facility 102.

However, if the mobile client facility were to attempt to connect into an unprotected connection point, such as at a secondary location 108 that is not a part of the enterprise facility 102, the mobile client facility may be required to request network interactions through the threat management facility 100, where contacting the threat management facility 100 may be performed prior to any other network action. In implementations, the client facility's 144 endpoint computer security facility 152 may manage actions in unprotected network environments such as when the client facility (e.g., client 144F) is in a secondary location 108 or connecting wirelessly to a non-enterprise facility 102 wireless Internet connection, where the endpoint computer security facility 152 may dictate what actions are allowed, blocked, modified, or the like. For instance, if the client facility's 144 endpoint computer security facility 152 is unable to establish a secured connection to the threat management facility 100, the endpoint computer security facility 152 may inform the user of such, and recommend that the connection not be made. In the instance when the user chooses to connect despite the recommendation, the endpoint computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning, restricting access to network and local resources, or the like. In implementations, the endpoint computer security facility 152 may perform specific actions to remediate possible threat incursions or policy violations during or after the unprotected connection.

The secondary location 108 may have no endpoint computer security facilities 152 as a part of its computer components, such as its firewalls 138B, servers 142B, clients 144G, hubs and routers 148C-D, and the like. As a result, the computer components of the secondary location 108 may be open to threat attacks, and become potential sources of threats, as well as any mobile enterprise facility clients 144B-F that may be connected to the secondary location's 108 network. In this instance, these computer components may now unknowingly spread a threat to other components connected to the network.

Some threats may not come directly from the Internet 154, such as from non-enterprise facility controlled mobile devices that are physically brought into the enterprise facility 102 and connected to the enterprise facility 102 client facilities. The connection may be made from direct connection with the enterprise facility's 102 client facility, such as through a USB port, or in physical proximity with the enterprise facility's 102 client facility such that a wireless facility connection can be established, such as through a Bluetooth connection. These physical proximity threats 110 may be another mobile computing device, a portable memory storage device, a mobile communications device, or the like, such as CDs and DVDs, memory sticks, flash drives, external hard drives, cell phones, PDAs, MP3 players, digital cameras, point-to-point devices, digital picture frames, digital pens, navigation devices, tablets, appliances, and the like. A physical proximity threat 110 may have been previously infiltrated by network threats while connected to an unprotected network connection outside the enterprise facility 102, and when connected to the enterprise facility 102 client facility, pose a threat. Because of their mobile nature, physical proximity threats 110 may infiltrate computing resources in any location, such as being physically brought into the enterprise facility 102 site, connected to an enterprise facility 102 client facility while that client facility is mobile, plugged into an unprotected client facility at a secondary location 108, and the like. A mobile device, once connected to an unprotected computer resource, may become a physical proximity threat 110. In implementations, the endpoint computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

Having provided an overall context for threat detection, the description now turns to a brief discussion of an example of a computer system that may be used for any of the entities and facilities described above.

Figure 2:
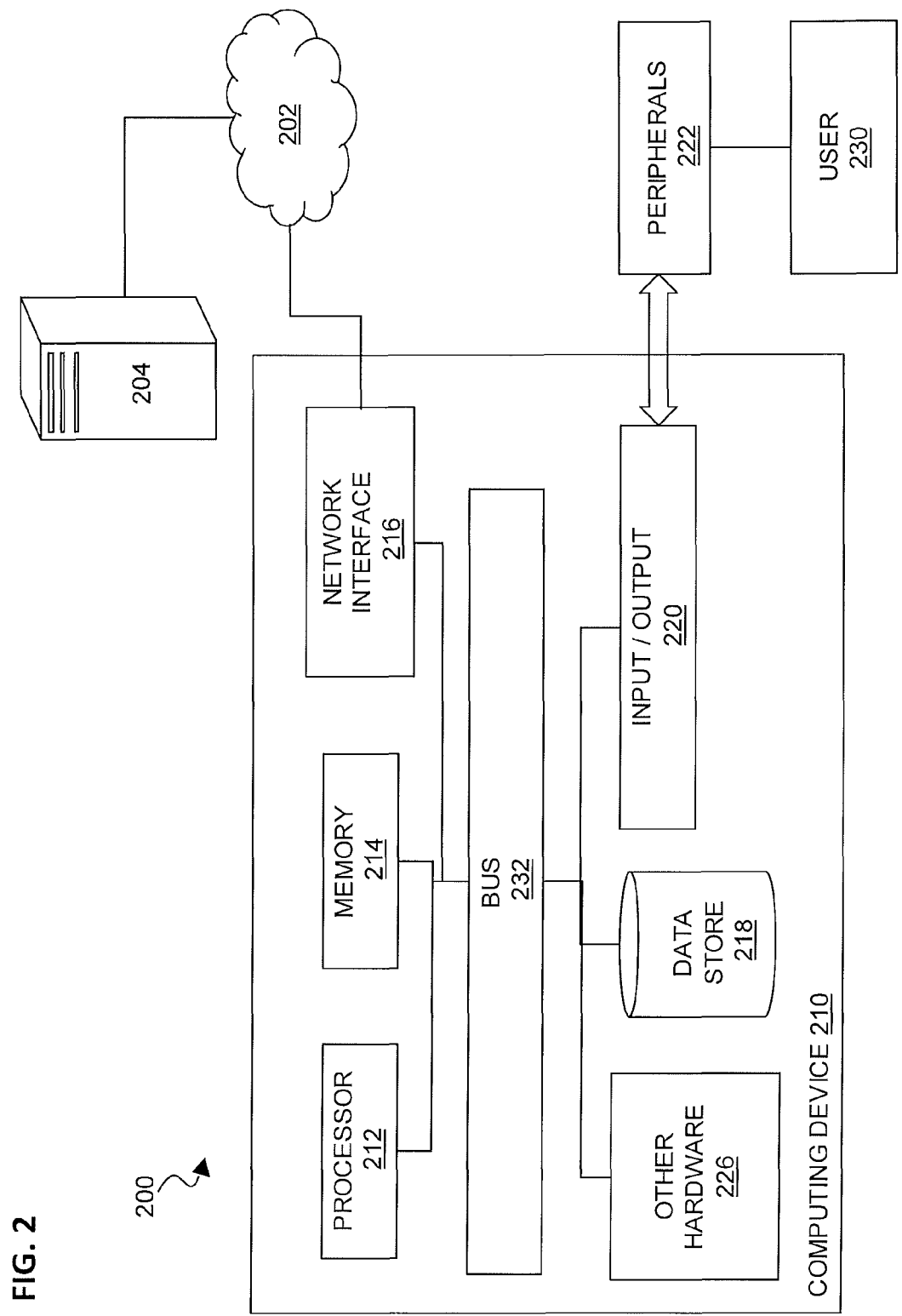
FIG. 2 illustrates an example implementation of computer system according to at least some implementations.

FIG. 2 illustrates a computer system. In general, the computer system 200 may include a computing device 210 connected to a network 202, e.g., through an external device 204. The computing device 210 may be or include any type of network endpoint or endpoints as described herein, e.g., with reference to FIG. 1 above. For example, the computing device 210 may include a desktop computer workstation. The computing device 210 may also or instead be any suitable device that has processes and communicates over a network 202, including without limitation a laptop computer, a desktop computer, a personal digital assistant, a tablet, a mobile phone, a television, a set top box, a wearable computer (e.g., watch, jewelry, or clothing), a home device (e.g., a thermostat or a home appliance controller), just as some examples. The computing device 210 may also or instead include a server, or it may be disposed on a server.

The computing device 210 may be used for any of the entities described in the threat management environment described above with reference to FIG. 1. For example, the computing device 210 may be a server, a client an enterprise facility, a threat management facility, or any of the other facilities or computing devices described therein. In certain aspects, the computing device 210 may be implemented using hardware or a combination of software and hardware, and the computing device 210 may be a standalone device, a device integrated into another entity or device, a platform distributed across multiple entities, or a virtualized device executing in a virtualization environment.

The network 202 may include any network described above, e.g., data network(s) or internetwork(s) suitable for communicating data and control information among participants in the computer system 200. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.) or WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the computer system 200. The network 202 may also include a combination of data networks, and need not be limited to a strictly public or private network.

The external device 204 may be any computer or other remote resource that connects to the computing device 210 through the network 202. This may include threat management resources such as any of those contemplated above, gateways or other network devices, remote servers or the like containing content requested by the computing device 210, a network storage device or resource, a device hosting malicious content, or any other resource or device that might connect to the computing device 210 through the network 202.

The computing device 210 may include a processor 212, a memory 214, a network interface 216, a data store 218, and one or more input/output devices 220. The computing device 210 may further include or be in communication with peripherals 222 and other external input/output devices 224.

The processor 212 may be any as described herein, and in general be capable of processing instructions for execution within the computing device 210 or computer system 200. The processor 212 may include a single-threaded processor or a multi-threaded processor. The processor 212 may be capable of processing instructions stored in the memory 214 or on the data store 218.

The memory 214 may store information within the computing device 210 or computer system 200. The memory 214 may include any volatile or non-volatile memory or other computer-readable medium, including without limitation a Random Access Memory (RAM), a flash memory, a Read Only Memory (ROM), a Programmable Read-only Memory (PROM), an Erasable PROM (EPROM), registers, and so forth. The memory 214 may store program instructions, program data, executables, and other software and data useful for controlling operation of the computing device 200 and configuring the computing device 200 to perform functions for a user. The memory 214 may include a number of different stages and types for different aspects of operation of the computing device 210. For example, a processor may include on-board memory and/or cache for faster access to certain data or instructions, and a separate, main memory or the like may be included to expand memory capacity as desired.

The memory 214 may, in general, include a non-volatile computer readable medium containing computer code that, when executed by the computing device 200 creates an execution environment for a computer program in question, e.g., code that constitutes processor firmware, a protocol stack, a database management system, an operating system, or a combination of the foregoing, and that performs some or all of the steps set forth in the various flow charts and other algorithmic descriptions set forth herein. While a single memory 214 is depicted, it will be understood that any number of memories may be usefully incorporated into the computing device 210. For example, a first memory may provide non-volatile storage such as a disk drive for permanent or long-term storage of files and code even when the computing device 210 is powered down. A second memory such as a random access memory may provide volatile (but higher speed) memory for storing instructions and data for executing processes. A third memory may be used to improve performance by providing even higher speed memory physically adjacent to the processor 212 for registers, caching and so forth.

The network interface 216 may include any hardware and/or software for connecting the computing device 210 in a communicating relationship with other resources through the network 202. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or other media that might be used to carry data between the computing device 210 and other devices. The network interface 216 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 216 may include any combination of hardware and software suitable for coupling the components of the computing device 210 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 202 such as the Internet. This may also or instead include hardware/software for a WiMax connection or a cellular network connection (using, e.g., CDMA, GSM, LTE, or any other suitable protocol or combination of protocols). The network interface 216 may be included as part of the input/output devices 220 or vice-versa.

The data store 218 may be any internal memory store providing a computer-readable medium such as a disk drive, an optical drive, a magnetic drive, a flash drive, or other device capable of providing mass storage for the computing device 210. The data store 218 may store computer readable instructions, data structures, program modules, and other data for the computing device 210 or computer system 200 in a non-volatile form for subsequent retrieval and use. For example, the data store 218 may store without limitation one or more of the operating system, application programs, program data, databases, files, and other program modules or other software objects and the like.

The input/output interface 220 may support input from and output to other devices that might couple to the computing device 210. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 216 for network communications is described separately from the input/output interface 220 for local device communications, these two interfaces may be the same, or may share functionality, such as where a USB port is used to attach to a WiFi accessory, or where an Ethernet connection is used to couple to a local network attached storage.

A peripheral 222 may include any device used to provide information to or receive information from the computing device 200. This may include human input/output (I/O) devices such as a keyboard, a mouse, a mouse pad, a track ball, a joystick, a microphone, a foot pedal, a camera, a touch screen, a scanner, or other device that might be employed by the user 230 to provide input to the computing device 210. This may also or instead include a display, a speaker, a printer, a projector, a headset or any other audiovisual device for presenting information to a user. The peripheral 222 may also or instead include a digital signal processing device, an actuator, or other device to support control or communication to other devices or components. Other I/O devices suitable for use as a peripheral 222 include haptic devices, three-dimensional rendering systems, augmented-reality displays, and so forth. In one aspect, the peripheral 222 may serve as the network interface 216, such as with a USB device configured to provide communications via short range (e.g., Bluetooth, WiFi, Infrared, RF, or the like) or long range (e.g., cellular data or WiMax) communications protocols. In another aspect, the peripheral 222 may provide a device to augment operation of the computing device 210, such as a global positioning system (GPS) device, a security dongle, or the like. In another aspect, the peripheral may be a storage device such as a flash card, USB drive, or other solid state device, or an optical drive, a magnetic drive, a disk drive, or other device or combination of devices suitable for bulk storage. More generally, any device or combination of devices suitable for use with the computing device 200 may be used as a peripheral 222 as contemplated herein.

Other hardware 226 may be incorporated into the computing device 200 such as a co-processor, a digital signal processing system, a math co-processor, a graphics engine, a video driver, and so forth. The other hardware 226 may also or instead include expanded input/output ports, extra memory, additional drives (e.g., a DVD drive or other accessory), and so forth.

A bus 232 or combination of busses may serve as an electromechanical platform for interconnecting components of the computing device 200 such as the processor 212, memory 214, network interface 216, other hardware 226, data store 218, and input/output interface. As shown in FIG. 2, each of the components of the computing device 210 may be interconnected using a system bus 232 or other communication mechanism for communicating information.

Methods and systems described herein can be realized using the processor 212 of the computer system 200 to execute one or more sequences of instructions contained in the memory 214 to perform predetermined tasks. In implementations, the computing device 200 may be deployed as a number of parallel processors synchronized to execute code together for improved performance, or the computing device 200 may be realized in a virtualized environment where software on a hypervisor or other virtualization management facility emulates components of the computing device 200 as appropriate to reproduce some or all of the functions of a hardware instantiation of the computing device 200.

Figure 3:
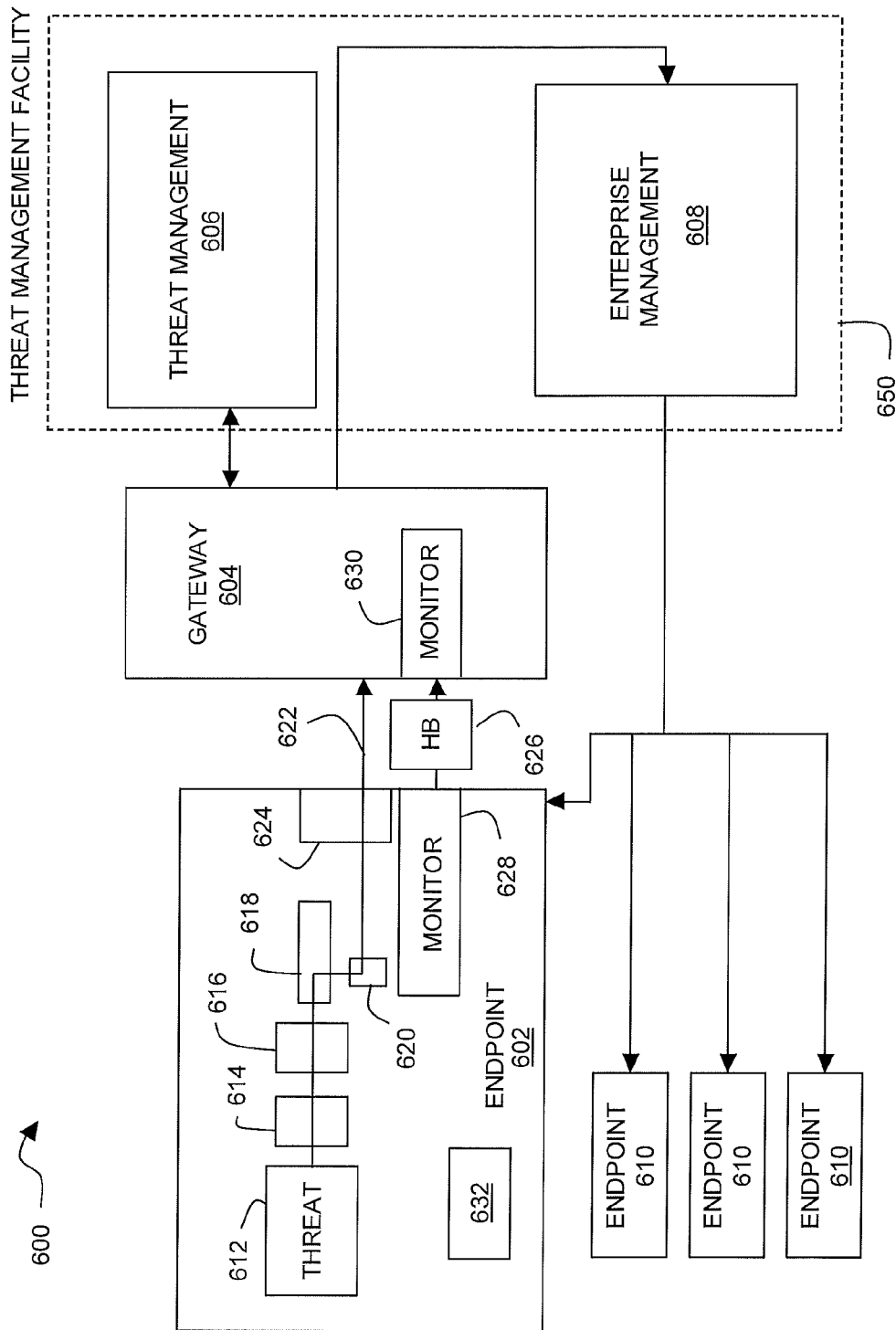
FIG. 3 illustrates an example implementation of a threat management system according to at least some implementations.

FIG. 3 illustrates a threat management system using heartbeats. In general, a system 600 may include an endpoint 602, a gateway 604, a threat management system 606, and a management system 608 that manages other elements including the endpoint 602, the gateway 604, and one or more additional endpoints 610. Each of these components may be configured with suitable programming to participate in the detection and remediation of an advanced persistent threat (APT) or other malware threat as contemplated herein.

The endpoint 602 may be any of the endpoints described herein, or any other device or network asset that might join or participate in an enterprise network. The endpoint 602 may contain a threat 612 such as an advanced persistent threat, virus, or similar malware that resides on the endpoint 602. The threat 612 may have reached the endpoint 602 in a variety of ways, and may have been placed manually or automatically on the endpoint 602 by a malicious source. It will be understood that the threat 612 may take any number of forms and have any number of components. For example, the threat 612 may include an executable file that can execute independently, or the threat 612 may be a macro, plug-in, or the like that executes within another application. Similarly, the threat 612 may manifest as one or more processes or threads executing on the endpoint 602. The threat 612 may install from a file on the endpoint 602 or a file remote from the endpoint 602, and the threat 612 may create one or more other files such as data files or the like while executing. Advanced persistent threats can be particularly difficult to detect and remediate, and the systems and methods contemplated herein can advantageously provide improved sensitivity to such threats, as well as enabling improved remediation strategies. However, the systems and methods contemplated herein may also or instead be used to detect and remediate other types of malware threats. As such, in this context references to a particular type of threat (e.g., an advanced persistent threat) should be understood to generally include any type of malware or other threat to an endpoint or network unless a more specific threat or threat type is explicitly provided or otherwise clear from the context.

The threat 612 may be analyzed by one or more threat countermeasures on the endpoint 602 such as a whitelisting filter 614 that approves each item of code before executing on the endpoint 602 and prevents execution of non-whitelisted code. The endpoint 602 may also include an antivirus engine 616 or other malware detection software that uses any of a variety of techniques to identify malicious code by reputation or other characteristics. A runtime detection engine 618 may also monitor executing code to identify possible threats. More generally, any of a variety of threat detection techniques may be applied to the threat 612 before and during execution. In general, a threat 612 may evade these and other security measures and begin executing as a process 620 on the endpoint 602.

Network traffic 622 from the process 620 may be monitored and logged by a traffic monitor 624 on the endpoint 602. The traffic monitor 624 may, for example, log a time and a source of each network request from the endpoint 602. Where the endpoint 602 is within an enterprise network, the network traffic 622 may pass through the gateway 604 in transit to a data network such as the Internet. While the gateway 604 may be logically or physically positioned between the endpoint 602 and an external data network, it will be understood that other configurations are possible. For example, where the endpoint 602 is associated with an enterprise network but operating remotely, the endpoint 602 may form a VPN or other secure tunnel or the like to the gateway 604 for use of a threat management system 606, enterprise management system 608, and any other enterprise resources.

The endpoint 602 may use a heartbeat 626 to periodically and securely communicate status to the gateway 604. The heartbeat 626 may be created by a security routine, which may be or may include health monitor 628 within the endpoint 602, and may be transmitted to a remote health monitor 630 at the gateway 604. The health monitor 628 may monitor system health in a variety of ways, such as by checking the status of individual software items executing on the endpoint 602, checking that antivirus and other security software is up to date (e.g., with current virus definition files and so forth) and running correctly, checking the integrity of cryptographic key stores, checking for compliance with enterprise security policies, and checking any other hardware or software components of the endpoint 602 as necessary or helpful for health monitoring. The health monitor 628 may thus condition the issuance of a heartbeat 626 on a satisfactory status of the endpoint 602 according to any suitable criteria, enterprise polices, and other evaluation techniques.

The heartbeat 626 may be communicated in any suitable manner of secure channel so that the health monitor 630 can reliably confirm the source of the heartbeat 626 and the status of the endpoint 602. To this end, the heartbeat 626 may be communicated in a secure channel, such as a channel that is cryptographically signed or secured using a private key or a symmetric key shared using a private key, so that the monitor 630 can authenticate the origin of the heartbeat 626 using a corresponding public key. In one aspect, the heartbeat 626 may include a combination of plaintext information and encrypted information, such as where the status information for the endpoint is provided in plaintext while a digital signature for authentication is cryptographically secured. In another aspect, all of the information in the heartbeat 626 may be encrypted.

In one aspect, a key vault 632 may be provided on the endpoint to support cryptographic functions associated with a secure heartbeat. An obfuscated key vault 632 may support numerous useful functions, including without limitation, private key decryption, asymmetric signing, and validation with a chain of trust to a specific root validation certificate. A variety of suitable key management and cryptographic systems are known in the art and may be usefully employed to a support the use of a secure heartbeat as contemplated herein. The system may support a secure heartbeat in numerous ways. For example, the system may ensure that signing and decryption keys can only be used in authorized ways and inside an intended Access Control mechanism. The system may use "anti-lifting" techniques to ensure that a signing key can only be used when the endpoint is healthy. The system may ensure that attacking software cannot, without first reverse-engineering the key vault 632, extract the original key material. The system may also usefully ensure that an attacker cannot undetectably replace the public keys in a root certificate store, either directly or indirectly, such as in an attack that tries to cause the code to validate against a different set of root keys without directly replacing any keys in the root store.

A robust heartbeat 626 may usefully provide defensive mechanisms against reverse engineering of obfuscated content (e.g., the private key material stored in key vault 632, the code used to validate the correct running of the remainder of the systems as part of the heartbeat 626 code itself) and any anti-lifting protections to prevent malware from directly using the endpoint 602 (or the health monitor 628 on the endpoint 602) to continue to send out signed heartbeat packets (e.g. stating that "all is well" with the endpoint) after security mechanisms have been impaired, disabled, or otherwise compromised in any way. Lifting in this manner by malicious code can be materially mitigated by providing statistical validation (e.g., with checksums of code) of call stacks, calling processes, and core processes. Likewise, statistical checks as well as checksum integrations into the cryptographic calculations may protect against code changes in the heartbeat 626 code itself.

A variety of useful techniques may be employed to improve security of the key vault 632 and the heartbeat 626. For example, the system may use domain shifting so that original key material is inferred based on hardware and software properties readily available to the key vault 632, and to ensure that key material uses non-standard algorithms. Software properties may, for example, include readily determined system values such as hashes of nearby code. In another aspect, the keys may be domain shifted in a manner unique to the endpoint 602 so that the manner of statistical validation of call stacks and core software is unique to the endpoint 602. Further the key vault may be provisioned so that a public key stored in the key vault 632 is signed with a certificate (or into a certificate chain) that can be externally validated by a network appliance or other trusted third party or directly by the health monitor 628 or remote health monitor 630.

The heartbeat 626 may encode any useful status information, and may be transmitted from the endpoint 602 on any desired schedule including any periodic, aperiodic, random, deterministic, or other schedule. Configured in this manner, the heartbeat 626 can provide secure, tamper-resistant instrumentation for status of the endpoint 602, and in particular an indication that the endpoint 602 is online and uncompromised. A delay or disappearance of the heartbeat 626 from the endpoint 602 may indicate that the endpoint 602 has been compromised; however this may also simply indicate that the endpoint 602 has been powered off or intentionally disconnected from the network. Thus, other criteria may be used in addition to the disappearance or interruption of the heartbeat 626 to more accurately detect malicious software. Some such techniques are described below, but it will be understood that this may include any supplemental information that might tend to make an attack on the endpoint 602 more or less likely. For example, if the heartbeat 626 is interrupted but the endpoint 602 is still sourcing network traffic, then an inference might suitably be made that the endpoint 602 is compromised.

The threat management system 606 may, in general, be any of the threat management systems described herein. The enterprise management system 608 generally provides tools and interfaces for administration of the enterprise and various endpoints 610 and other resources or assets attached thereto. It will be understood that, the functions of the threat management system 606 and the enterprise management system 608 may vary, and general threat management and administration functions may be distributed in a variety of ways between and among these and other components. This is generally indicated in FIG. 3 as a threat management facility 650 that includes the threat management system 606 and the enterprise management system 608. It will be understood that either or both of these systems may be administered by third parties on behalf of the enterprise, or managed completely within the enterprise, or some combination of these, all without departing from the scope of this disclosure. It will similarly be understood that a reference herein to a threat management facility 650 is not intended to imply any particular combination of functions or components, and shall only be understood to include such functions or components as explicitly stated in a particular context, or as necessary to provide countermeasures for malware (e.g., advanced persistent threats) as contemplated herein.

FIGS. 4A-D each illustrate a block diagram of an example of a networking system 1000 according to various implementations. These examples show some ways in which the functionality of different ones of the endpoints 1100, WAPs 1300, firewalls 1500 and supervisor 1700 may be configured relative to each other. It should be understood that these configurations were selected to be demonstrative and relatively simple examples, and that many other implementations are possible that include more or less endpoints 1100, WAPs 1300, firewalls 1500, supervisors 1700, and sites 1600. Functionality of the different components 1100, 1300, 1500, and 1700 may be integrated in different ways, and components may be configured in 1, 2, 3, or any number of sites, and may communicate over a variety of network configurations.

Figure 4A:
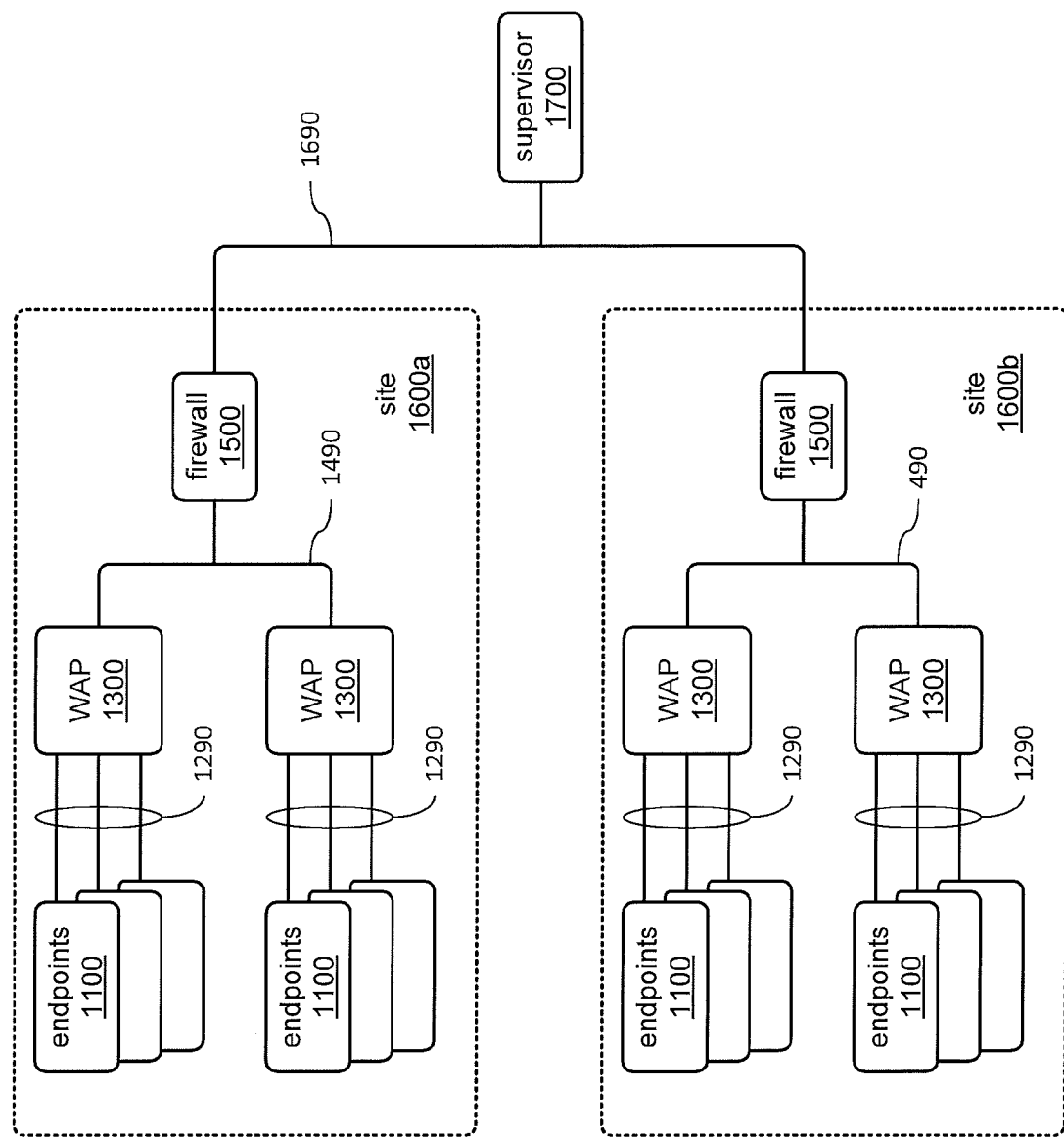
FIGS. 4A, 4B, 4C and 4D each illustrate an example implementation of a networking system according to at least some implementations.

Turning to FIG. 4A, as depicted, the networking system 1000 may incorporate one or more endpoints 1100, one or more wireless access points (WAPs) 1300, one or more firewalls 1500, and/or at least one supervisor 1700. As also depicted, each endpoint 1100 may be coupled to a WAP 1300 via a wireless link 1290. In turn, one or more WAPs 1300 may be coupled to a firewall 1500 by an intermediate network 1490, for example, a local area network (LAN). Further, each of the one or more firewalls 1500 may be coupled to an external network 1690, such as the Internet, through which each of the one or more firewalls may communicate with the at least one supervisor 1700.

Various factors may determine how many of the WAPs 1300 and/or firewalls 1500 are included in the networking system 1000, such as the geographic area covered by the networking system 1000, the quantity and/or type of buildings and/or other structures in the covered area, and/or the quantity of endpoints 1100 to be supported. In the specific example of FIG. 4A, the networking system 1000 may cover two sites 1600a and 1600b that may be separated by a geographic distance, physical barrier, etc. As depicted, such a circumstance may encourage the use of at least one firewall 1500 at each of the two sites 1600a and 1600b to serve as separate gateways for each of the two sites 1600a and 1600b to the external network 1690. Also, the supervisor 1700 may be situated at a location that may be geographically distant from or beyond a physical or other barrier from each of the two sites 1600a and 1600b. Further, and though not specifically depicted, at least one backup WAP 1300 and/or backup firewall 1500 may be co-located with one or more of the depicted WAPs 1300 and/or firewalls, respectively.

The use of wireless links 1290 established between each of the endpoints 1100 and an associated one of the WAPs 1300 may afford a degree of portability of the endpoints 1100 throughout the depicted sites 1600a and 1600b by eliminating the need to physically couple each of the endpoints 1100 to a cable-based network. For reasons of data throughput, as well as security, the intermediate network(s) 1490 coupling each of the WAPs 1300 to an associated firewall 1500 may employ electrically and/or optically conductive cabling. In turn, each of the firewalls 1500 may be also be coupled to the external network 1690 by electrically and/or optically conductive cabling as well as intermediate devices, such as routers and modems.

Each of the firewalls 1500 may serve as a gateway by which each of the endpoints 1100 may access the external network 1690 with the benefit of some degree of security provided by an associated one of the firewalls 1500. Additionally, various ones of the endpoints 1100 may engage in network communications with each other that may remain entirely among the endpoints 1100 wirelessly coupled to a single WAP 1300. In some implementations, network communications among two or more of the endpoints 1100 may extend between WAPs 1300 that are coupled to a single one of the intermediate networks 1490 such that the external network 1690 is not employed. In some implementations, network communications among two or more of the endpoints 1100 may extend across multiple ones of the intermediate networks 1490 that are each associated with a different firewall 1500 and may be separated by the external network 1690. In some implementations, one or more associated firewalls 1500 may cooperate to establish a secure channel therebetween through the external network 1690 to provide some degree of security for network communications. Other scenarios for the manner in which the networking system 1000 may be utilized by the endpoints 1100 are possible.

Figure 4B:
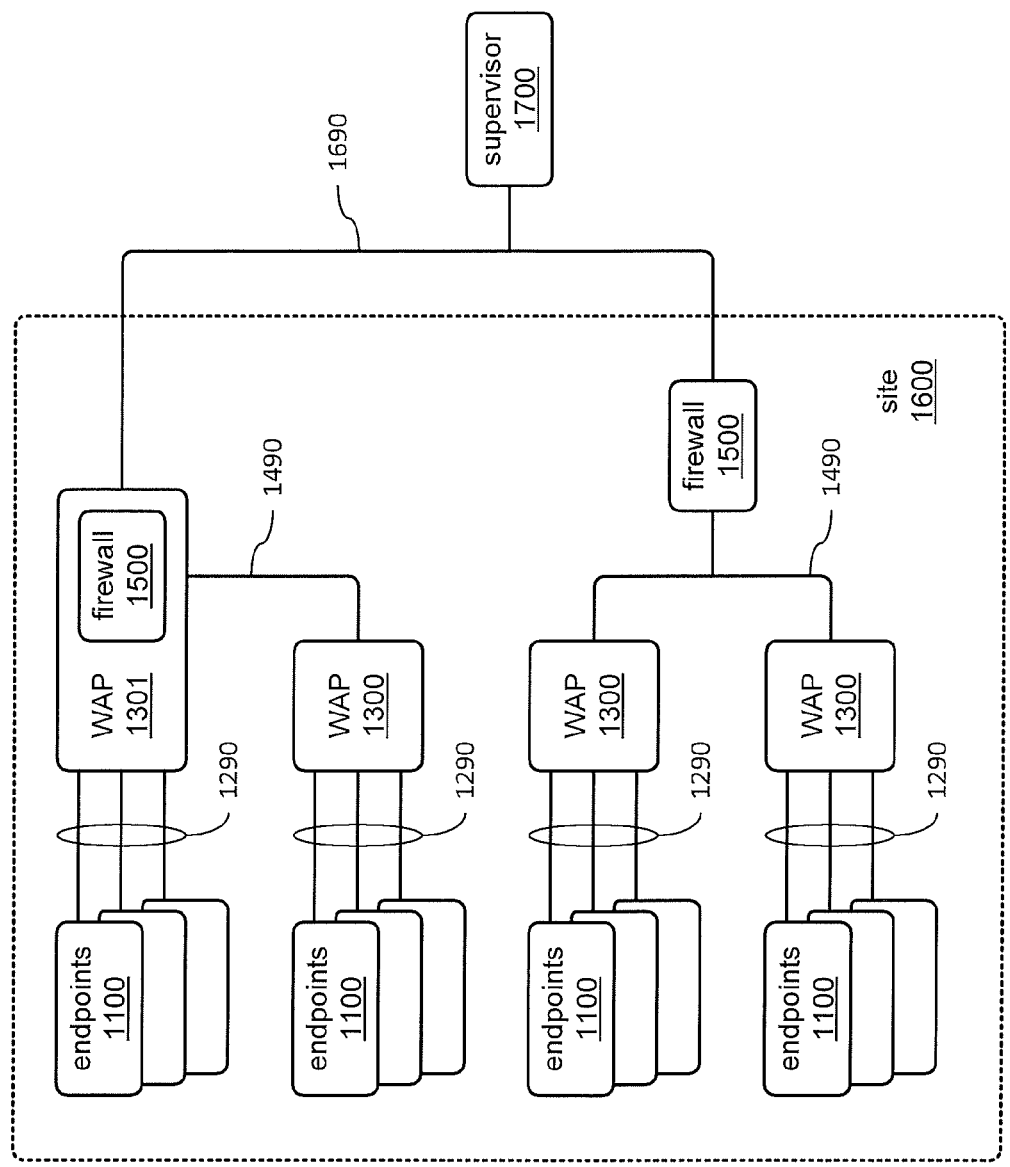

FIG. 4B depicts an example of a networking system 1000 in which there is a single site 1600, but in which there is a physical barrier or other circumstance that leads to separation of a single intermediate network 1490, such that two firewalls 1500 are used. To enable the networking system 1000 to extend throughout the site 1600, the two depicted firewalls 1500 may cooperate to establish a secure channel therebetween through the external network 1690, as the external network may not be subject to the circumstance that prevented the extending of the intermediate network 1490 throughout the site 1600. Also depicted in FIG. 4B is an alternate implementation of a WAP, identified as a WAP 1301, that serves as an example of the integration of the functionality of one of the firewalls 1500 with one of the WAPs 1300. In various implementations, the WAP 1301 may be part of the firewall 1500 or the firewall and WAP may be integrated as one device as with a firewall 1500 that has wireless networking capability. In some implementations, the site 1600 may be divided into more than one site, as with sites 1600*a* and 1600*b* of FIG. 4A. In some implementations, the WAP 1301 may communicate with the other WAPs 1300 over the intermediate network 1490. In some implementations, the intermediate networks 1490 may be bridged over the external network 1690.

Figure 4C:
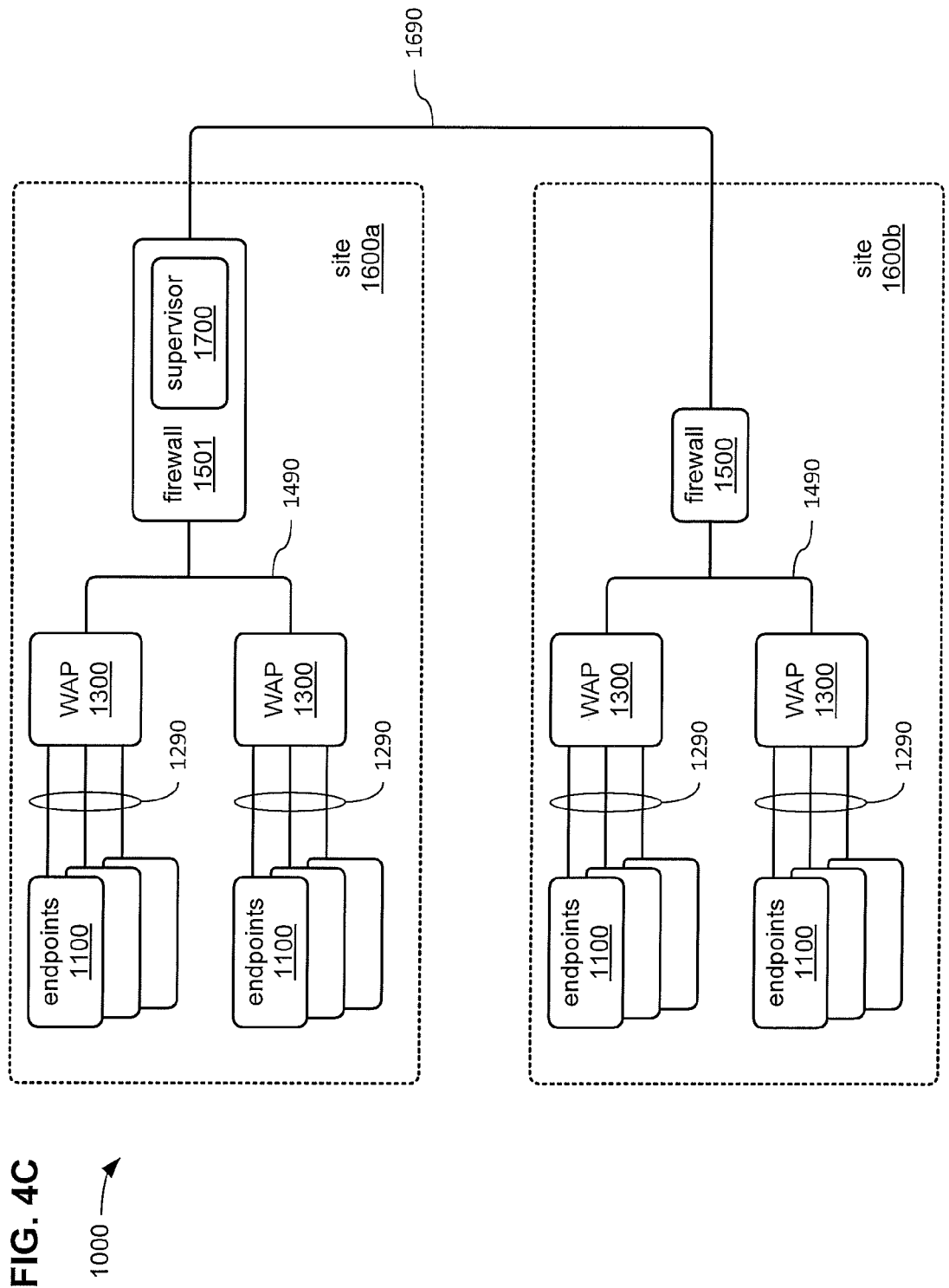

FIG. 4C depicts an example networking system 1000 in which firewall 1501 includes the functionality of a firewall 1500 and a supervisor 1700. This example networking system 1000 covers two separated sites 1600*a* and 1600*b*, and the firewall 1500 may communicate with the supervisor 1700 through the external network 1690. Again, such communication may be implemented through a secure channel formed through the external network 1690 between the two firewalls 1500.

Figure 4D:
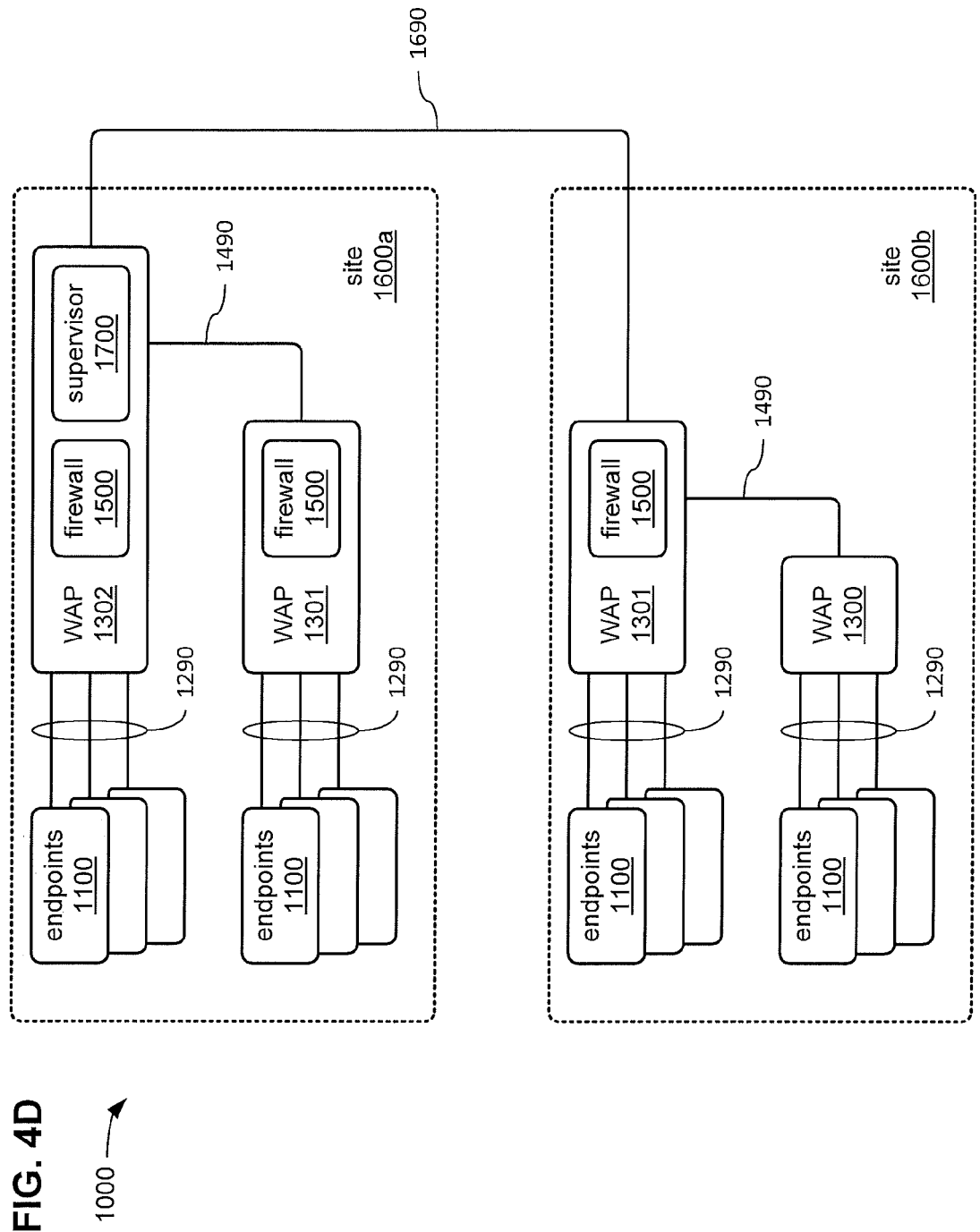

FIG. 4D depicts a system 1000 that includes an example implementation of a combined device, identified as a WAP 1302, which includes the functionality of a supervisor 1700, a firewall 1500 and a WAP 1300. Again, two sites 1600*a* and 1600*b* are shown, although these sites may be combined, and there may be 1, 2, or any number of sites. A firewall 1500 associated with the other of the two sites 1600*a* and 1600*b* may communicate with the supervisor 1700 through the external network 1690, or through the intermediate network 1490 if the intermediate network 1490 is connected through the external network 1690 or otherwise. As also depicted in FIG. 4D, the integrated device 1302 may be further coupled to another device into which the functionality of a WAP 1300 and a firewall 1500 are integrated via an intermediate network 1490 such that two firewalls 1500 are in use within the site 1600*a*. Such use of two firewalls 1500 within the site 1600*a* may be appropriate in a variety of circumstances such as a need to provide a level of throughput that could not be accommodated by either one of the firewalls 1500, alone, in which case WAP/firewall 1301 may have another connection (not shown) to the external network 1690.

Figure 5A:
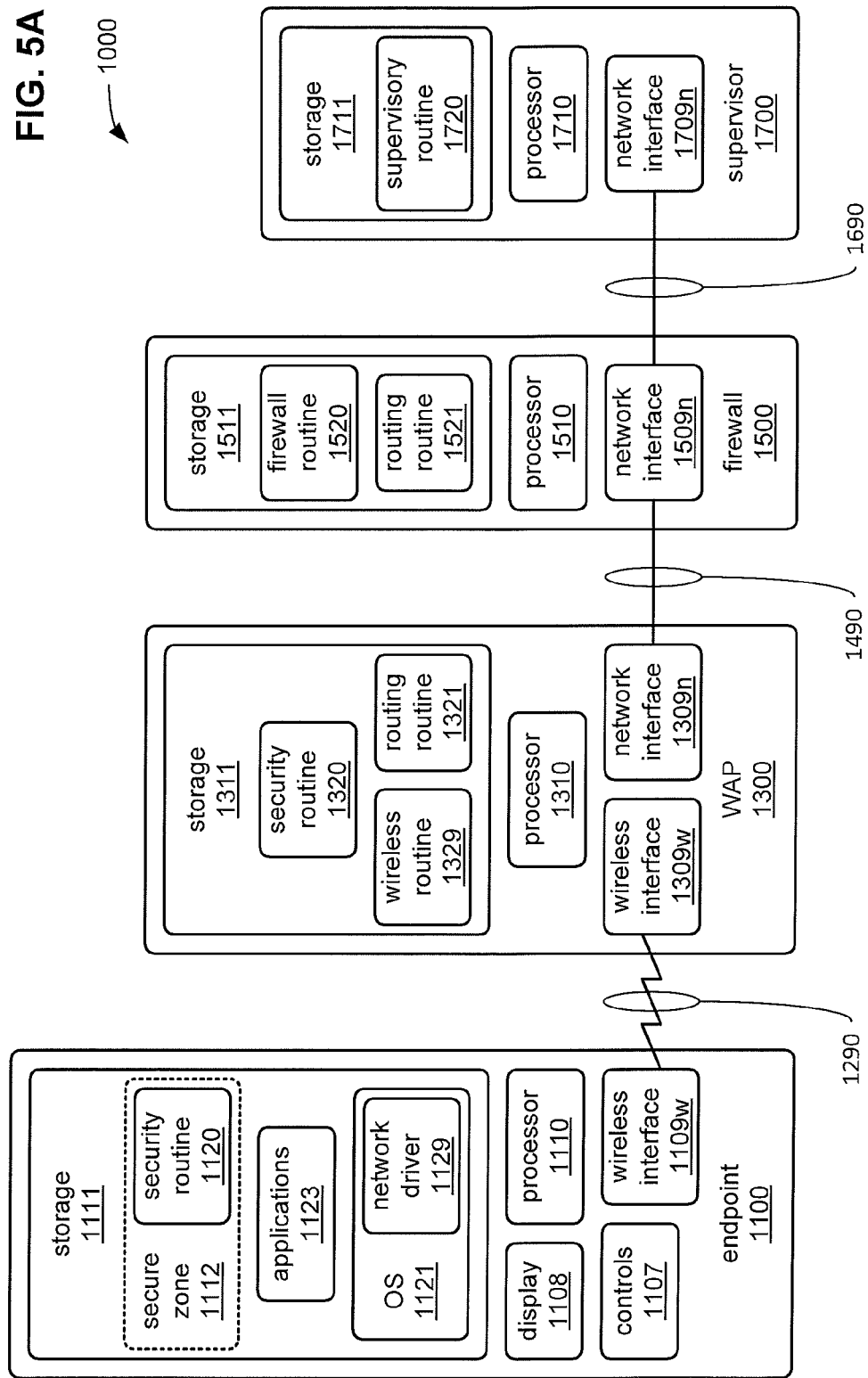
FIGS. 5A, 5B and 5C each illustrate an example implementation of devices of a networking system according to at least some implementations.
Figure 5B:
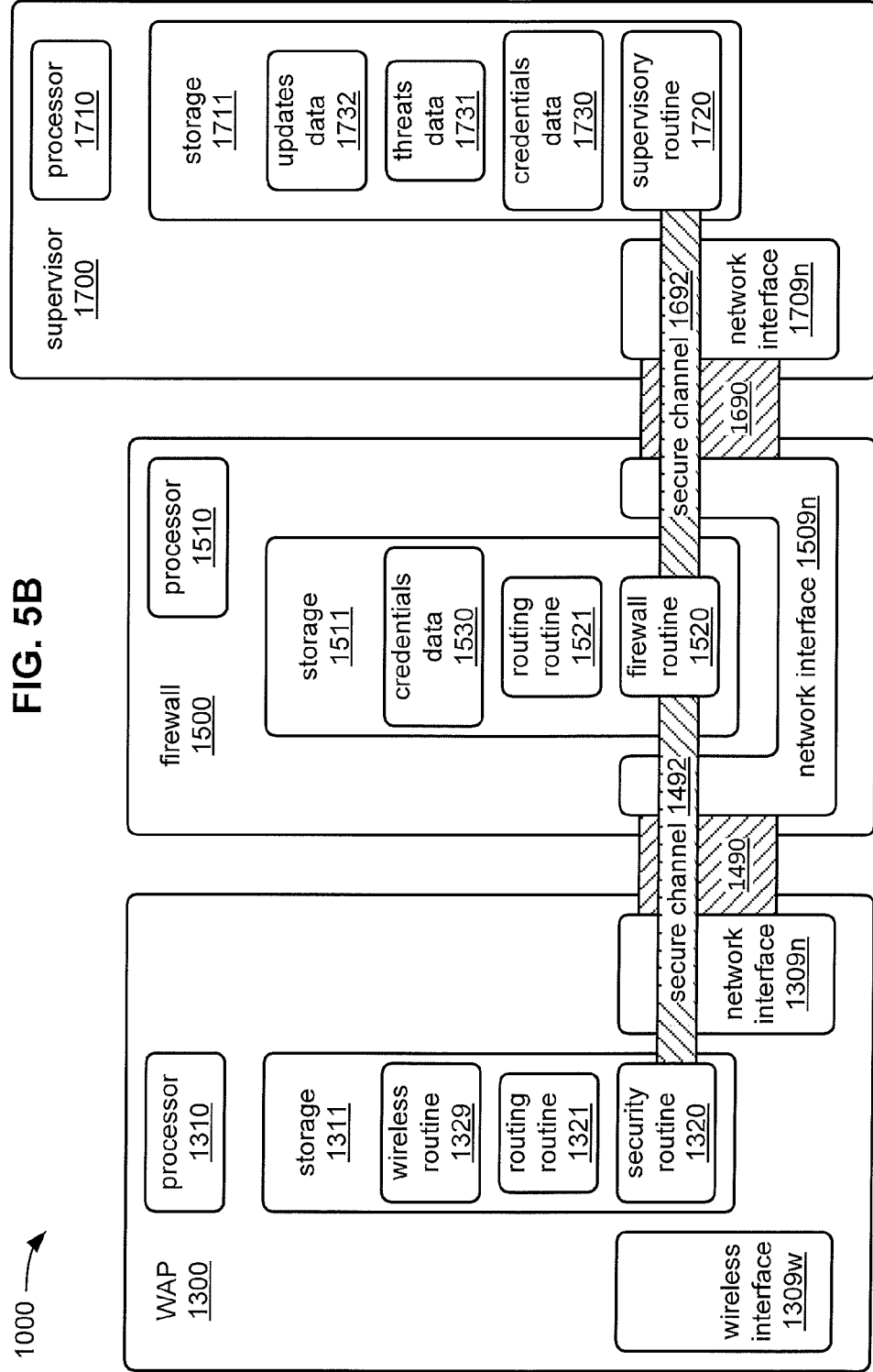
Figure 5C:
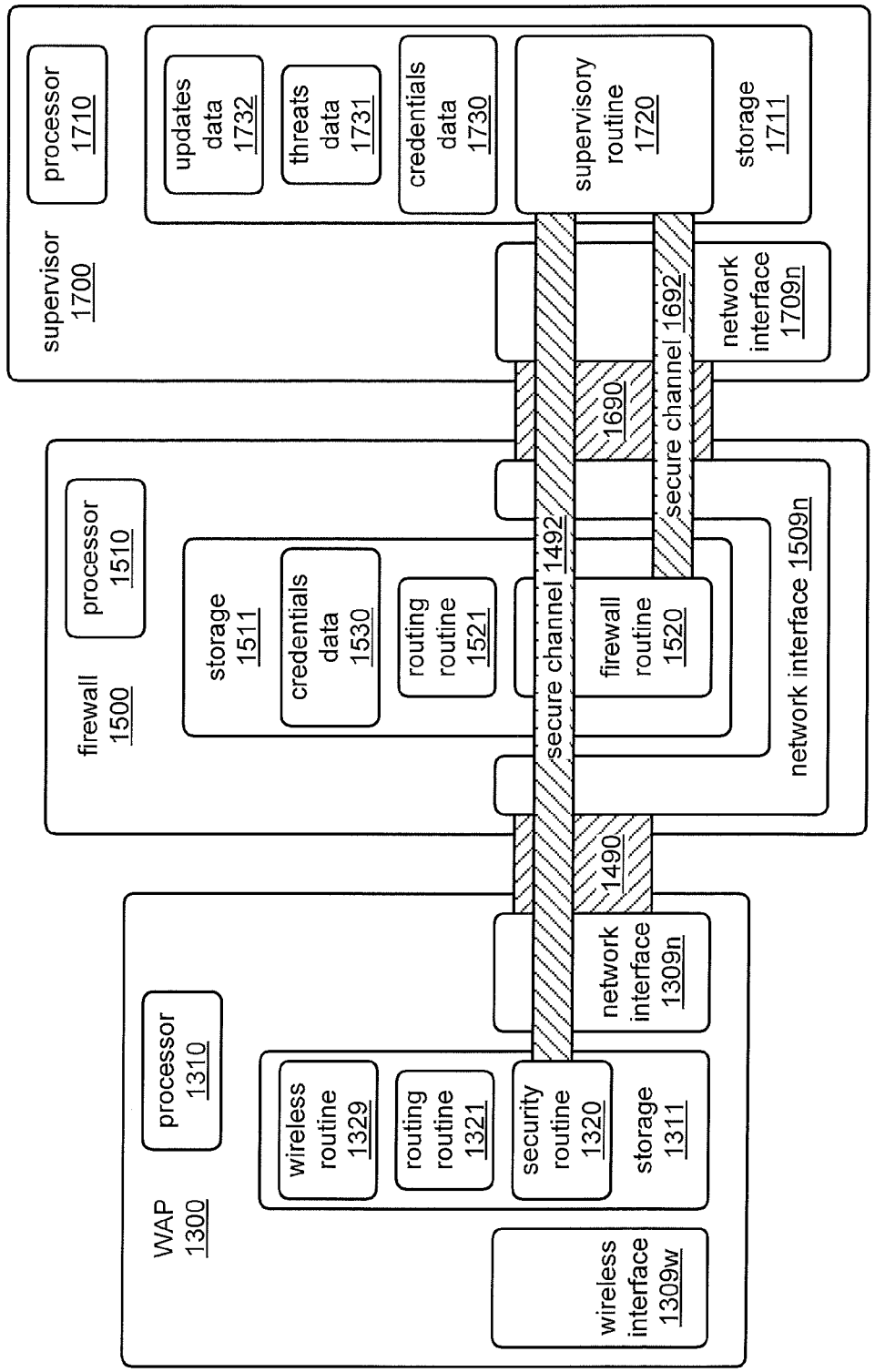

FIGS. 5A, 5B and 5C depict further aspects of network communications in an example of the networking system 1000. As depicted, each endpoint 1100 may incorporate one or more of a processor 1110, a storage 1111, controls 1107, a display 1108, and a wireless interface 1109*w* to establish a wireless link 1290 with a WAP 1300. The storage 1111 may store one or more of a security routine 1120, an OS 1121, one or more applications 1123, and a network driver 1129. It should be noted that although the network driver 1129 is depicted as a component of the OS 1121, implementations are possible in which the OS 1121 and the network driver 1129 are separate routines, for example, communicating through defined interfaces. The security routine 1120, the OS 1121, the one or more applications 1123, and/or the network driver 1129 may each incorporate instructions executable by the processor 1110 to implement logic to perform various functions as disclosed herein. As will be described in greater detail, a portion of the storage 1111 may be allocated or otherwise defined as a secure zone 1112 in which at least a portion of the security routine 1120 may be executed by the processor 1110 while protected from interference by any of the other routines 1121, 1123 or 1129. It should also be understood that a given endpoint may include a portion of the functionality described or additional functionality. For example, the endpoint may include an additional wired or wireless network interface (not shown), and additional controls and displays, or no controls and displays.

As depicted, each WAP 1300 may incorporate one or more of a processor 1310, a storage 1311, a wireless interface 1309*w* to establish a wireless link 1290 with one or more endpoints 1100, and a network interface 1309*n* to couple the WAP 1300 to an intermediate network 1490. It should be noted that although the network interface 1309*n* and the wireless interface 1309*w* are depicted as separate interfaces, implementations are possible in which these interfaces 1309*n* and 1309*w* are implemented as a single interface. The storage 1311 may store one or more of a security routine 1320, a routing routine 1321, and a wireless routine 1329. The security routine 1320, the routing routine 1321, and/or the wireless routine 1329 may each incorporate instructions executable by the processor 1310 to implement logic to perform various functions as disclosed herein.

As depicted, each firewall 1500 may incorporate one or more of a processor 1510, a storage 1511, and one or more network interfaces 1509*n* to couple the firewall 1500 to an intermediate network 1490 and to the external network 1690. Although shown as one network interface 1509*n*, there may be any number of network interfaces 1509*n* and networks. The storage 1511 may store one or more of a firewall routine 1520, and a routing routine 1521 as well as other routines. The firewall routine 1520, and/or the routing routine 1521 may each incorporate instructions executable by the processor 1510 to implement logic to perform various functions as disclosed herein. In implementations in which the firewall routine is integrated with another device, the integrated devices may share a common processor 1510, storage 1511, or network interface 1509n, and the firewall routine may be included in the storage of the integrated device.

In implementations of the networking system 1000 that include a supervisor 1700, as depicted, the supervisor 1700 may incorporate one or more of a processor 1710, a storage 1711, and a network interface 1709n to couple the supervisor 1700 to the external network 1690. The storage 1711 may store a supervisory routine 1720. The supervisory routine 1720 may incorporate instructions executable by the processor 1710 to implement logic to perform various functions as disclosed herein. In implementations in which the supervisor is integrated with another device, the integrated devices may share a processor 1710, common storage 1711, or network interface 1709n, and the supervisor routine, may be included in the storage of the integrated device.

Referring more specifically to FIG. 5B, in executing the supervisory routine 1720, the processor 1710 of the supervisor 1700 may operate the network interface 1709n to cooperate with at least the one depicted firewall 1500 to establish a secure channel 1692 therebetween through the external network 1690. Correspondingly, in executing the firewall routine 1520, the processor 1510 of the firewall 1500 may operate the network interface 1509n to so cooperate with the supervisor 1700 to establish the secure channel 1692. In some implementations, such establishment of the secure channel 1692 may be conditioned on the successful authentication of at least the firewall 1500 by the supervisor 1700. In some implementations, such authentication may be based on a verification of security credentials exchanged therebetween. Such exchanged security credentials may include, but are not limited to, one or more cryptographic keys (e.g., public and/or private keys), a hash value, a pseudo-randomly generated value, digitally signed data, etc. In performing such authentication of the firewall 1500, the processor 1710 may be caused by the supervisory routine 1720 to refer to a credentials data 1730 that may be stored within the storage 1711. The credentials data 1730 may include security credentials and/or information required to generate security credentials associated with many firewalls 1500 and/or different versions of the firewall 1500. In implementations in which the firewall 1500 also performs such authentication of the supervisor 1700, the processor 1510 may be similarly caused to refer to a credentials data 1530 that may be stored within the storage 1511.

Additionally, in executing the firewall routine 1520, the processor 1510 of the firewall 1500 may further operate the network interface 1509n to cooperate with at least the one depicted WAP 1300 to establish a secure channel 1492 therebetween through the depicted intermediate network 1490. Correspondingly, in executing the security routine 1320, the processor 1310 of the WAP 1300 may operate the network interface 1309n to so cooperate with the firewall 1500 to establish the secure channel 1492. Not unlike the establishment of the secure channel 1692, such establishment of the secure channel 1492 may be conditioned on the successful authentication of at least the WAP 1300 by the firewall 1500. In performing such authentication of the WAP 1300, the processor 1510 may be caused by the firewall routine 1520 to again refer to the credentials data 1530. The credentials data 1530 may include security credentials and/or information required to generate security credentials associated with many WAPs 1300 and/or different versions of the WAP 1300. Additionally, there may also be implementations in which the processor 1310 is caused by the security routine 1320 to similarly perform such authentication of the firewall 1500.

Referring briefly to FIG. 5C, in some implementations, in executing the supervisory routine 1720, the processor 1710 of the supervisor 1700 may operate the network interface 1709n to cooperate with at least the one depicted firewall 1500 to establish the secure channel 1692 therebetween, and to cooperate with at least the one depicted WAP 1300 through the firewall 1500 to establish the secure channel 1492 therebetween through the firewall 1500. Thus, there may be a secure channel 1692 that includes traffic from the WAP 1300 and the firewall 1500 as depicted in FIG. 5B, or as depicted in FIG. 5C, the secure channel 1492 may be established through both the depicted intermediate network 1490 and the external network 1690, as well as through the firewall 1500, and the secure channel 1692 may be established through the external network 1690. More broadly, FIG. 5C depicts a secure channel 1492 that extends all the way to the supervisor 1700 such that data that is securely transmitted therethrough and is not included in other secure channels 1492 and 1692 by the firewall 1500. For example, as depicted in FIG. 5C, the WAP 1300 may communicate securely with the supervisor 1700 with less dependence on the security status of the firewall 1500. This may be deemed desirable to provide some degree of security in those communications in the event that the security of the firewall 1500 may be compromised.

Still referring to FIG. 5C, in some implementations, the establishment of both of the secure channels 1492 and 1692 may be conditioned on the successful authentication of at least the firewall 1500 by the supervisor 1700. In such implementations, the supervisor 1700 may condition the establishment of the secure channel 1492 on the establishment of the secure channel 1692, since the establishment of the secure channel 1692 may be conditioned on the authentication of the firewall 1500. Presuming the firewall 1500 is authenticated, the supervisor 1700 may then permit authentication of the WAP 1300 through the firewall 1500, and may then establish the secure channel 1492, presuming authentication of the WAP 1300 is successful. Again, such authentications may be based on the verification of exchanged security credentials. The credentials data 1730 may include security credentials and/or information required to generate security credentials associated with may WAPs 1300 and/or different versions of the WAP 1300, as well as security credentials associated with many firewalls 1500 and/or different versions of the firewall 1500. Referring more broadly to FIGS. 5A-C, with the secure channels 1492, 1692 established, various pieces of information related to security may be securely exchanged among the WAP 1300, the firewall 1500 and/or the supervisor 1700 through corresponding ones of the secure channels 1492 and/or 1692. By way of example, the processor 1710 of the supervisor 1700 may be caused by further execution of the supervisory routine 1720 to recurringly provide updated versions of a threats data 1731 to one or more of the firewalls 1500. The threats data 1731 may include patterns (which may include signatures or other data) that may be used by the processor 1510 of the firewall 1500 to identify malware or indicia of compromise based, for example, on network traffic passing through the firewall 1500. In some implementations, threats data 1731 may include information about network addresses such as historical information, reputation information, etc. In some implementations, threats data 1731 may include indications of patterns of behavior that are indicative of potential or actual compromise. The processor 1510 of the firewall 1500 may employ such information in the threats data 1731 to identify potential or actual compromise, and to take remedial action, such as notification of administrators, conducting scans, isolation of compromised devices, and restricting network traffic flows.

In another example of an exchange of information related to security through the secure channels 1492 and/or 1692, the processor 1710 of the supervisor 1700 may be caused by execution of the supervisory routine 1720 to transmit updated versions of one or more routines and/or data related to security to the firewall 1500 and/or to the WAP 1300. For example, the processor 1710 may be caused to transmit an updated version of the firewall routine 1520, the routing routine 1521 and/or the credentials data 1530 to the firewall 1500 via the secure channel 1692 to replace an older version thereof. In some implementations, the processor 1710 may be caused to transmit an updated version of the security routine 1320, the routing routine 1321 and/or the wireless routine 1329 to the firewall 1500 via the secure channel 1692 to be relayed to the WAP 1300 by the firewall 1500 through the secure channel 1492.

In another example of an exchange of pieces of information related to security through the secure channels 1492 and/or 1692, the processor 1310 of the WAP 1300 may be caused by execution of the security routine 1320 to recurringly transmit indications of the security status of the WAP 1300 to the firewall 1500 through the secure channel 1492. In some implementations, the processor 1510 of the firewall may be caused by execution of the firewall routine 1520 to analyze such indications to identify a potential or actual security threat that may compromise the security status of the WAP 1300. In some implementations, the processor 1510 of the firewall 1500 may be caused by the firewall routine 1520 and/or the routing routine 1521 to route the indications of security status received from the WAP 1300 onward to the supervisor 1700 through the secure channel 1692 for such analysis. In some implementations, the processor 1510 of the firewall 1500 may be caused to recurringly transmit indications of the security status of the firewall 1500 to the supervisor 1700 through the secure channel 1692 for similar analysis.

In some implementations, the secure channels 1492, 1692 also may be used to communicate network-related information, for example, information related to the performance or configuration, for example of the wireless interface 1309$w$, with respect to one or more endpoints 1100. The network information may include without limitation interface configurations, connection information, routing information, connection speeds, parameter settings, signal quality metrics, noise/interference levels and performance statistics.

Figure 6A:
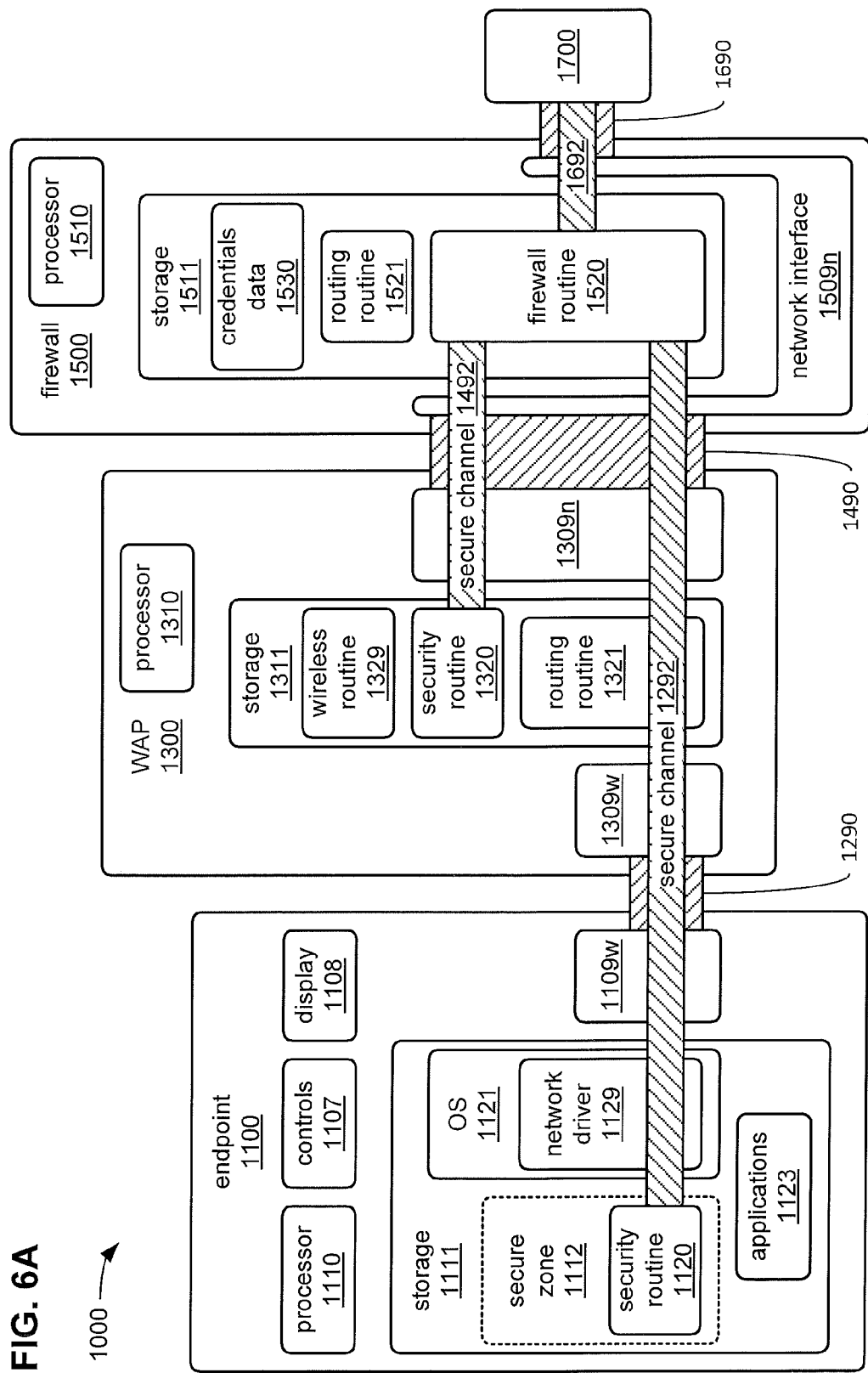
FIGS. 6A, 6B and 6C each illustrate an example implementation of wireless communications according to at least some implementations.
Figure 6B:
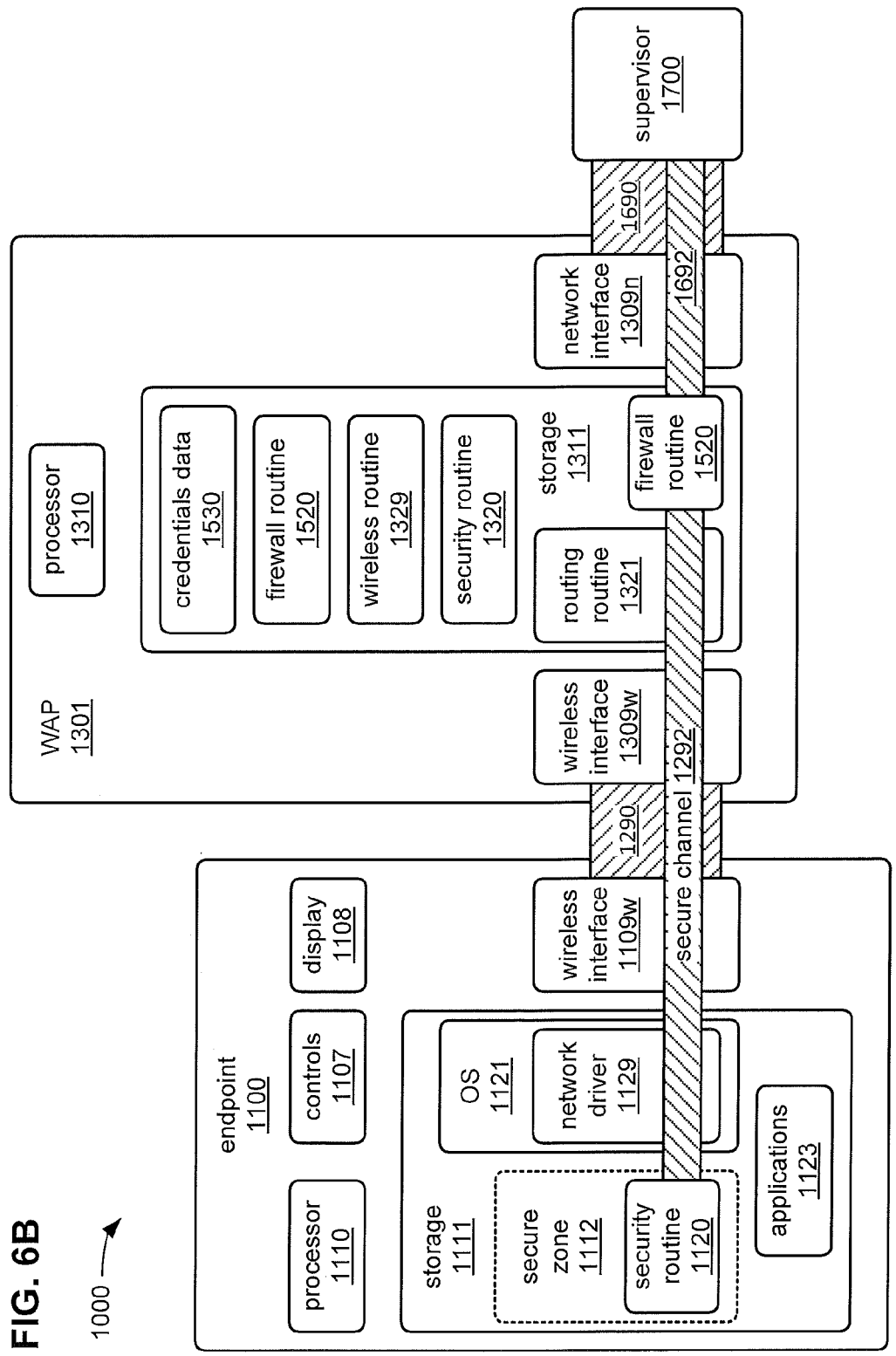
Figure 6C:
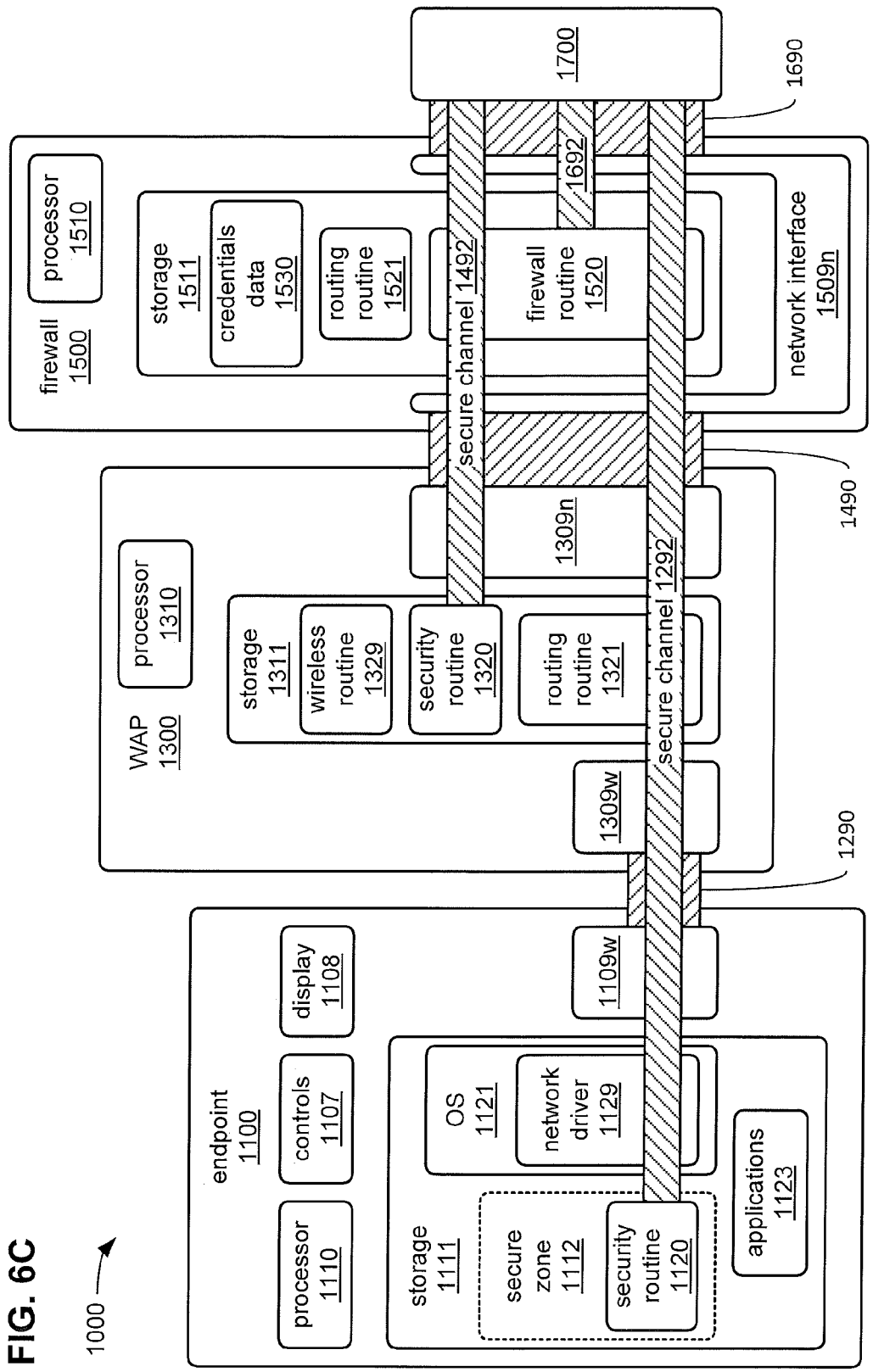

FIGS. 6A, 6B and 6C each illustrate enabling network communications with an implementation of an endpoint 1100. FIG. 6A depicts an implementation in which the WAP 1300 and the firewall 1500 are implemented as separate devices, and the firewall 1500 authenticates the endpoint 1100. FIG. 6B depicts an implementation in which the functionality of the WAP 1300 and the firewall 1500 are integrated into a single device. FIG. 6C depicts an implementation in which the WAP 1300 and the firewall 1500 are implemented as separate devices, and the supervisor authenticates the endpoint 1100. It should be understood that these configurations are examples, and that other configurations may be used in various implementations.

Turning to FIG. 6A, in executing the OS 1121 and/or the network driver 1129, the processor 1110 may operate the wireless interface 1109$w$ to cooperate with the depicted WAP 1300 to establish a wireless link 1290 therebetween. Correspondingly, in executing the wireless routine 1329, the processor 1310 of the WAP 1300 may operate the wireless interface 1309$w$ to cooperate with the endpoint 1100 to establish the wireless link 1290. In some implementations, establishment of the wireless link 1290 may be conditioned on the successful authentication of the endpoint 1100 to permit the endpoint 1100 to exchange network traffic with the WAP 1300, at all. Authentication may include a verification of the endpoint 1100 as one of a limited number of endpoints 1100 permitted to exchange network traffic with the WAP 1300. In some implementations, authentication may include the processor 1110 being caused by execution of the OS 1121 and/or the network driver 1129 to receive input at the controls 1107 and/or operate the display 1108 to provide a user interface by which an operator of the endpoint 1100 may use the controls 1107 to enter a password, provide a fingerprint, etc.

Upon establishment of the wireless link 1290, the endpoint 1100 may be able to communicate with the firewall 1500 through the wireless link 1290, the WAP 1300 and the intermediate network 1490. In executing the firewall routine 1520, the processor 1510 of the firewall 1500 may operate the network interface 1509$n$ to cooperate with the security routine 1120 within the endpoint 1100 to establish a secure channel 1292 between the security routine 1120 and the firewall 1500. Correspondingly, in executing the security routine 1120, the processor 1110 of the endpoint 1100 may operate the wireless interface 1109$w$ to so cooperate with the firewall 1500 to establish the secure channel 1292. Such establishment of the secure channel 1292 may be conditioned on the successful authentication of at least the security routine 1120 by the firewall 1500. In some implementations, such authentication may be based on a verification of security credentials exchanged therebetween. Such exchanged security credentials may include, but are not limited to, one or more cryptographic keys (e.g., public and/or private keys), a hash value, a pseudo-randomly generated value, digitally signed data, etc. In performing such authentication of the security routine 1120, the processor 1510 of the firewall 1500 may be caused by the firewall routine 1520 to refer to the credentials data 1530. The credentials data 1530 may include security credentials and/or information required to generate security credentials associated with the security routines 1120 within many endpoints 1100 and/or different versions of the security routine 1120. Additionally, there may also be implementations in which the processor 1110 is caused by the security routine 1120 to similarly perform such authentication of the firewall 1500.

With the authentication of the security routine 1120 within the endpoint 1100, further security credentials may be exchanged with the security routine 1120 to enable encryption and/or other protective measures to be taken to enable secure exchanges of information such as security information with the security routine 1120. In some implementations, this is accomplished in a manner that is intended to minimize interference from and/or compromise by other routines executed within the endpoint 1100. In this way, the secure channel 1292 may effectively be extended from the wireless interface 1109$w$ to the security routine 1120. Also, with authentication carried out between the security routine 1120 and the firewall routine 1520 through the WAP 1300, the secure channel 1292 may extend through the WAP 1300 and/or through the intermediate network 1490 to the firewall 1500. The processor 1310 of the WAP 1300 may be caused by the routing routine 1321 and/or the security routine 1320 to effectively route the secure channel 1292 through the WAP 1300 in a manner that may be akin to other exchanges of network traffic through the WAP 1300. As a result of these measures taken to cause the secure channel 1292 to extend between the security routine 1120 and the firewall 1500 in a manner that avoids undetected interference by other routines within each of the endpoint 1100 and the WAP 1300, interference caused by other routines executed within either the endpoint 1100 or the WAP 1300 may be prevented and/or at least detected by the security routine 1120 and/or the firewall 1500.

In some implementations, at least a portion of the security routine 1120 may be stored and/or executed within a portion of the storage 1111 allocated and/or otherwise defined as the secure zone 1112. In various implementations, the secure zone 1112 may be based on any of a variety of mechanisms. In some implementations, the instruction set of the processor 1110 may include a subset of instructions useable only by the security routine 1120 or another related routine to cause instantiation and/or maintenance of the secure zone 1112. Such a subset of instructions may be operable on the processor 1110 and/or a supporting memory controller to define one or more ranges of addresses of storage locations within the storage 1111 to which access by other routines is denied, or at least greatly limited. In other implementations, the processor 1110 may incorporate a processing core reserved for and/or otherwise designated for the execution of a limited variety of routines, such as the security routine 1120, that are rendered inaccessible to routines executed by any other processing core of the processor 1110. In still other implementations, the endpoint 1100 may incorporate a security controller (not shown) that includes a controller processor separate from the processor 1110 and a controller storage separate from the storage 1111 to create an entirely independent processing environment in which the security routine 1120 may be both stored and executed. Still other approaches to establishing and/or maintaining the secure zone 1112, and/or otherwise securing the security routine 1120 may be used.

With the secure channel 1292 established, various pieces of information related to security and pieces of information related to network management may be securely exchanged among the security routine 1120 within the endpoint 1100, the WAP 1300, the firewall 1500 and/or the supervisor 1700 through corresponding ones of the secure channels 1292, 1492 and/or 1692. By way of example, and referring back to FIG. 5B, as well as to FIG. 6A, the processor 1710 of the supervisor 1700 may be caused by further execution of the supervisory routine 1720 to recurringly provide updated versions of the threats data 1731 and/or the security routine 1120 to the security routine 1120 within the endpoint 1100. More specifically, the processor 1710 may be caused to transmit such updates to the firewall 1500 through the secure channel 1692, where they may be routed and retransmitted to the security routine 1120 through the secure channel 1292.

Again, the threats data 1731 may include signatures and/or indications of patterns of behavior that may be used by the security routine 1120 to cause the processor 1110 to identify potential or actual compromise within the endpoint 1100. In some implementations, the threats data 1731 may include historical or reputation information for software, data, and/or network addresses. In some implementations, the security routine 1120 may cause the processor 1110 to employ such information in the threats data 1731 to prevent, undo and/or at least mitigate actual or potential damage caused by actual or potential compromise within the endpoint 1100. Damage may include, and is not limited to, theft and/or destruction of information stored within the endpoint 1100 and/or within other devices to which the endpoint 1100 may be coupled, malicious encryption of information accompanied by extortion demands to pay a ransom to once again be given access to that information (e.g., actions of so-called "ransomware"), takeover of control by a remote device, etc.

In another example of an exchange of pieces of information related to security through at least the secure channel 1292, the processor 1110 of the endpoint 1100 (or the separate controller processor, if there is one) may be caused by execution of the security routine 1120 to recurringly transmit indications of its security status to the firewall 1500 through the secure channel 1292 (e.g., a form of recurring security "heartbeat" transmission). The security status may include whether any policy violations have occurred, indications of potential or actual compromise, exposure of system elements to potential or actual compromise, etc. In some implementations, the processor 1510 of the firewall may be caused by execution of the firewall routine 1520 to analyze such indications to identify a potential or actual security threat that may compromise (or may have already compromised) the security status of the endpoint 1100. The firewall may take remedial action, including without limitation notification of administrators, network isolation of the endpoint, directing the endpoint to delete encryption keys, etc. In some implementations, the processor 1510 of the firewall 1500 may be caused by the firewall routine 1520 and/or the routing routine 1521 to route indications of security status received from the security routine 1120 onward to the supervisor 1700 through the secure channel 1692 for analysis.

Turning to FIG. 6B, the combining and/or integration of the WAP 1300 and the firewall 1500 into a single device or group of devices (e.g., the depicted example WAP 1301 earlier introduced in FIGS. 4B and 4D) may eliminate the need for the establishment of the secure channel 1492 therebetween, and accordingly, eliminate the need for either or both of a separate WAP 1300 and a separate firewall 1500 to authenticate the other and/or to analyze the security status of the other. In some implementations, the firewall routine 1520 is operated as a separate program, and so the secure channel 1492 may be necessary, even if not actually communicated over a network. For example, different processes or applications on the WAP 1301 may communicate using a secure channel between them, or using a secure channel with the supervisor 1700.

Turning to FIG. 6C, in some implementations, following establishment of the wireless link 1290, the endpoint 1100 may be able to communicate with the supervisor 1700 through the wireless link 1290, the WAP 1300, the depicted intermediate network 1490, the depicted firewall 1500, and the external network 1690. The supervisor 1700 may cooperate with the security routine 1120 within the endpoint 1100 to establish a secure channel 1292 between the security routine 1120 and the supervisor 1700. Such establishment of the secure channel 1292 may be conditioned on the successful authentication of at least the security routine 1120 by the supervisor 1700. Again, such authentication may be based on a verification of security credentials exchanged therebetween.

Again, with the authentication of the security routine 1120 within the endpoint 1100, further security credentials may be exchanged with the security routine 1120 to enable encryption and/or other protective measures to be taken to enable exchanges of security related information with the security routine 1120 without undetected interference from any other routine executed within the endpoint 1100, the WAP 1300, and/or the firewall 1500. For example, if a heartbeat from the endpoint is not communicated as expected, the supervisor 1700 will treat that as a potential indication of compromise. For example, if a message is tampered with, use of encryption or signature technology will make that evident.

As a result, the secure channel 1292 may effectively be extended from the wireless interface 1109w to the security routine 1120 in a manner that does not permit undetected interference from such other routines as the network driver 1129 and/or the OS 1121. Also, with such authentication carried out between the security routine 1120 and the supervisor 1700, the secure channel 1292 may extend through the WAP 1300, the intermediate network 1490, the firewall 1500 and/or through the external network 1690 to the supervisor 1700. The processor 1310 of the WAP 1300 may be caused by the routing routine 1321 and/or the security routine 1320 to effectively route the secure channel 1292 through the WAP 1300 in a manner that may be akin to other exchanges of network traffic through the WAP 1300. Similarly, the processor 1510 of the firewall 1500 may be caused by the routing routine 1521 and/or the firewall routine 1520 to effectively route the secure channel 1292 through the firewall 1500 in a manner that may be akin to other exchanges of network traffic through the firewall 1500. As a result of these measures taken to cause the secure channel 1292 to extend between the security routine 1120 and the supervisor 1700 in a manner that avoids undetected interference by other routines within each of the endpoint 1100, the WAP 1300 and the firewall 1500, interference caused by other routines executed within the endpoint 1100, the WAP 1300 and/or the firewall 1500 may be prevented and/or at least detected by the supervisor 1700.

With the secure channel 1292 established, various pieces of information related to security and network configuration may be securely exchanged between the security routine 1120 within the endpoint 1100 and the supervisor 1700 through the secure channel 1692. By way of example, and referring back to FIG. 5C, as well as to FIG. 6C, the processor 1710 of the supervisor 1700 may be caused by further execution of the supervisory routine 1720 to recurringly provide updated versions of the threats data 1731 and/or the security routine 1120 to the security routine 1120 within the endpoint 1100 through the secure channel 1292. Also by way of example, the processor 1110 of the endpoint 1100 (or the separate controller processor, if there is one) may be caused by execution of the security routine 1120 to recurringly transmit indications of its security status to the supervisor 1700 through the secure channel 1292 (e.g., a form of recurring security "heartbeat" transmission). In some implementations, the processor 1710 of the supervisor 1700 may be caused by execution of the supervisory routine 1720 to analyze such indications to identify a security threat that may compromise (or may have already compromised) the security status of the endpoint 1100.

The same secure channel 1292 may then be used for communication of network information, which may include, without limitation: interface configurations, connection information, routing information, connection speeds, parameter settings, signal quality metrics, noise/interference levels and/or performance statistics.

Figure 7:
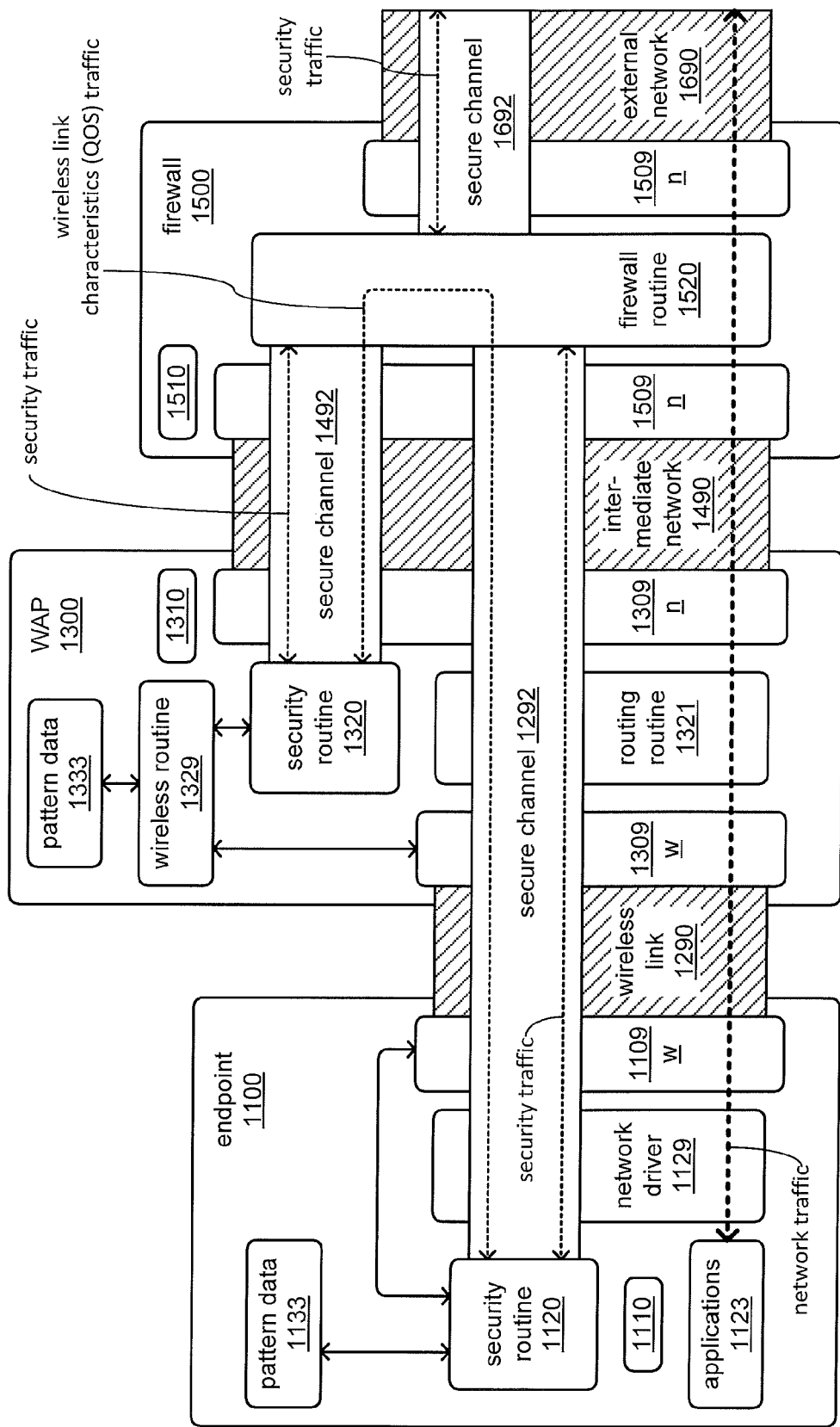
FIG. 7 illustrates an example implementation of coordination within a networking system to change a characteristic of a single wireless link according to at least some implementations.

FIG. 7 illustrates, by example, use of one or more of the secure channels formed within an example of the networking system 1000 to additionally convey communications associated with monitoring and/or controlling one or more characteristics of a wireless link. More specifically, one or more secure channels may be employed to enable coordination between devices to improve network performance (e.g., QOS) and/or effect other changes in characteristics of the network within an example of the network system 1000.

The secure channel 1292 may share the wireless link 1290 established between the wireless interface 1109w of the endpoint 1100 and the wireless interface 1309w of the WAP 1300 with other network traffic. Other network traffic may arise through the execution of the one or more applications 1123 (e.g., web browsers, media streaming applications, network file transfer applications, etc.) by the processor 1110, and from communication involving other devices (e.g., endpoints) that are sharing the wireless link 1290. For example, other routines that may be executed within the endpoint 1100 or other endpoints may engage in exchanges of network traffic through the wireless link 1290. Network communication may be exchanged through the WAP 1300 and/or the firewall 1500 to reach the external network 1690 and any of a variety of other devices that may be coupled to the wireless link 1290, the intermediate network 1490, and/or the external network 1690, such as cameras, printers, scanners, file servers, connected devices, web servers, email servers, media streaming servers, etc. (not shown). Again, such other network traffic may be routed through the WAP 1300 by the processor 1310 under the control of the routing routine 1321, and may be allowed to pass through the firewall 1500 by the processor 1510 under the control of the firewall routine 1520.

As familiar to those skilled in the art, the quality of service of data networks may be determined by network characteristics including without limitation hardware bandwidth, throughput, configuration, protocols, usage patterns, and other factors. In addition, wireless links may be adversely affected by environmental factors, transmission power, range, interference, protocols, and/or other factors. For example, the introduction and/or removal of sizable metal objects such as metal furniture (e.g., desks, filing cabinets, etc.) can affect (e.g., block, reflect, or otherwise alter) the transmission and/or reception of radio frequency (RF) signals on which wireless links may be based. For example, other electronic devices that emit RF signals or other forms of interference at the same or similar frequencies as wireless links, and/or more generally emit electromagnetic signals with sufficient power may affect such wireless links. In addition to entirely blocking RF transmissions such that they are not received, the introduction of such factors may also cause shifts in frequency, or reduce signal strength and/or otherwise degrade the quality of those RF signals. Likewise, lower quality, improperly configured and/or aging components within one endpoint 1100 may not properly generate the RF signals on which one or more of the wireless links 1290 may be based such that its RF transmission to the WAP 1300 may interfere with the RF transmissions between the WAP 1300 and one or more other endpoints 1100. Such improperly generated RF signals may include an inaccurately and/or inconsistently generated carrier frequency, spurious changes in amplitude, improper shifts in waveforms, etc. Any one or combination of these factors can may introduce difficulty in receiving portions of communications, and in some cases, interference with certain information (e.g., handshakes and/or other portions of a protocol) may repeatedly delay communication, and/or introduce errors into portions of transmitted data such that numerous ones of such portions must be retransmitted. Small devices, such as mobile phones, tablets, wearables, and laptops may be moved during transmission which may change the environment during such transmission. The overall effect may be a considerable slowing in the rate at which data is able to be successfully communicated.

Still referring to FIG. 7, following the earlier-described establishment of the depicted wireless link 1290, in part through execution of the wireless routine 1329, further execution of the wireless routine 1329 may cause the processor 1310 of the WAP 1300 to operate the wireless interface 1309w of the WAP 1300 to monitor various characteristics of the wireless link 1290. Again, such a characteristic may include (without limitation) a carrier frequency, an amplitude, a signal-to-noise ratio, an aspect of a shape of a waveform, a bandwidth, a separation between frequencies employed by different channels, a frequency shift, a shift in a waveform, a malformed transition in a waveform, a synchronization characteristic, a dropped portion of a protocol, a data error rate, etc. The processor 1310 may be caused to monitor various characteristics of the wireless link to identify instances in which one of those characteristics falls outside a threshold that may specify a minimum, a maximum and/or some other limitation for that one of those characteristics. Such characteristics may be associated with one or more aspects of QOS of the wireless link, and accordingly, an instance of such a characteristic falling outside a threshold may be associated with an aspect of QOS falling outside a QOS threshold such as a minimum rate of data throughput to be maintained, a maximum delay in performing a portion of a protocol not to be exceeded, etc. In response to one or more characteristics of the link falling outside a threshold and/or in response to a predicted possibility of one or more characteristics of the link falling outside a threshold, including where an aspect of the QOS of the wireless link has fallen is predicted to fall outside a QOS threshold, the processor 1310 of the WAP 1300 may derive a change to make in one or more characteristics of the wireless link to improve the QOS of the wireless link. Again, the one or more characteristics that are found to have fallen outside a threshold and/or are predict to fall outside a threshold may not coincide with the one or more characteristics to which a change is derived to be effected. Instead the various physical properties of a network link, whether based on radio frequency (RF) technology, or not, may be relied upon to provide a relationship among two or more characteristics of the network link that may be exploited.

More specifically regarding wireless QOS, there may be one or more QOS thresholds that define minimum and/or maximum values for each of such characteristics such that an aspect of the QOS of the wireless link 1290 is deemed to have fallen outside a QOS threshold if one of the characteristics of the wireless link 1290 violates one of the minimum or maximum values defined by a QOS threshold. Where one or more of such aspects of the QOS is deemed to have fallen outside a QOS threshold or is determined to be about to fall outside a QOS threshold, then the processor 1310 may be caused by the wireless routine 1329 to derive a change in a setting associated with the wireless link 1290 to bring the associated one or more characteristics of the wireless link 1290 back within the minimum and/or maximum values defined by the QOS thresholds, and thereby improve the QOS of the wireless link 1290. Beyond bringing aspects of the QOS back within one or more QOS thresholds such that the characteristics of the wireless link 1290 are back in a proper state, there may be further improvement possible in the QOS that may be defined how much more the data rate through the wireless link 1290 is able to be increased.

Where a setting change to improve the QOS of the wireless link 1290 is able to be made entirely within the WAP 1300 without cooperation with any other device to make a corresponding setting change thereat, then the processor 1310 may be caused by the wireless routine 1329 to access the wireless interface 1309w to effect such a setting change. There may be no need for the processor 1310 to transmit any information concerning such a change to any other device. For example, the wireless protocol may permit the WAP 1300 to direct the endpoint 1100 to make changes using management features of the wireless protocol. For example, the wireless protocol may permit the WAP 300 to announce changes to participants in the wireless link 1290, or simply to make the changes.

There may be other situations in which it is useful to have a setting change to a characteristic of the wireless link 1290 made at the endpoint 1100. Such a change may or may not be in addition to a corresponding change to be made at the WAP 1300 such that there would be changes made at both ends of the wireless link 1290. For example, it may be possible to minimize or eliminate perceived impact to the user of the endpoint 1100 by coordinating changes. For example, it may be possible to make changes that the protocol would not otherwise permit without disconnecting all endpoints 1100. In such situations, the wireless routine 1329 may cooperate with the security routine 1320 to cause the processor 1310 of the WAP 1300 to transmit a request to the firewall 1500 through the secure channel 1492, where the request is to transmit a command to the security routine 1120 to make the setting change affecting the wireless link 1290 at the endpoint 1100. The transmitted request may communicate the setting change to be specified in the command, or the transmitted request may directly include the command to be transmitted. In response to receiving the request from the WAP 1300, the processor 1510 of the firewall 1500 may be caused by the firewall routine 1520 to transmit the command to the security routine 1120 via the secure channel 1292.

In response to receiving the command, the processor 1110 of the endpoint 1100 may be caused by the security routine 1120 to access the wireless interface 1109w to affect the setting change specified in the command. The wireless interface 1109w may incorporate one or more semiconductor components that incorporate one or more registers that are normally accessed and operated by the processor 1110 under the control of the network driver 1129 and/or another similar routine executed to control various aspects of establishing and/or maintaining the wireless link 1290. However, as depicted, the security routine 1120 may access such components of the wireless interface 1109w in a manner that bypasses the network driver 1129 and/or other similar routine.

Upon completion of effecting such a setting change at the endpoint 1100, the processor 1110 may be further caused by the security routine 1120 to transmit an indication that the change has been made back to the firewall 1500 via the secure channel 1292. Upon receiving the indication, the processor 1510 of the firewall 1500 may be caused by the firewall routine 1520 to retransmit the indication to the WAP 1300 via the secure channel 1492. In situations where setting changes that affect the wireless link 1290 needed to be made at both ends of the wireless link 1290 in a coordinated manner, the processor 1310 of the WAP 1300 may be caused to await the receipt of the indication that the setting change having been made at the endpoint 1100 before accessing the wireless interface 1309w to make the corresponding change at the WAP 1300.

In some implementations, changes may be made to a wireless link 1290 in order to improve the performance of the overall network. For example, an endpoint 1100 may be directed to reduce power, or to change to a slower communication speed, or to switch to a different channel or WAP 1300, even if the QoS for that endpoint 1100 is acceptable, if the change would help other endpoints, and the overall network QoS.

Thus, as depicted in FIG. 7, one or both of the secure channels 1292 and 1492 may be employed in securely exchanging information related to one or more characteristics of the network (e.g., to the QOS of the wireless link 1290), in addition to being employed in securely exchanging information related to security. Correspondingly, the security routine 1120 may serve to effect setting changes to maintain and/or improve the performance of the network (e.g., the QOS of the wireless link 1290), in addition to acting within the endpoint 1100 and/or in cooperation with at least the firewall 1500 to maintain security, at least within the endpoint 1100. Such use of secure channels and/or routines related to the provision of security to additionally maintain and/or improve overall network performance may be deemed desirable to improve overall user experience, as well as to prevent a security breach that may be facilitated by poor network performance or poor network configuration. The use of the security routine 1120 in this context provides a secure channel for managing network configuration beyond what is possible, for example, with current wireless protocols (e.g., protocols of one or more of the 802.11 series of standards promulgated by the Institute of Electrical and Electronics Engineers of Washington, DC, USA).

In some implementations, setting changes are made in response to and/or in anticipation of changes to overall network traffic, for example, volume of traffic exchanged through the network and/or one or more network elements, such as the wireless link 1290. The ongoing monitoring of the security status of the endpoint 1100 by the security routine 1120 may entail monitoring what applications 1123 and/or what other routines are executed within the endpoint 1100 at any given time. The processor 1110 may be caused by the security routine 1120 to recurringly transmit indications of what applications 1123 and/or what other routines are currently being executed, are about to be executed, and/or are about to cease to be executed to the firewall 1500 via the secure channel 1292 as part of the security related information recurringly transmitted to the firewall 1500 (e.g., a recurring security "heartbeat" transmission).

In some implementations, the processor 1110 of the endpoint 1100 may be caused to store indications of patterns of network usage of when various ones of the applications 1123 and/or other routines are executed. The patterns of network usage may be stored, for example, as pattern data 1133 that may be maintained within the storage 1111 of the endpoint 1100. For example, such indications may be of observed daily and/or weekly patterns in of when each of various routines are usually start to be executed and/or cease to be executed. Further, such indications of patterns may be stored along with indications of which routines engage in exchanging network traffic through the wireless link 1290 and/or the volume of such network traffic. For example, the pattern data 1133 may include an observed average amount of data usage by an application and/or an indication of maximum data usage in a predetermined time period. Other data about application network usage may be observed and stored as well.

In some implementations, the processor 1110 of the endpoint 1100 may be caused to store indications of patterns of network usage associated with a user of the endpoint 1100. The patterns of network usage may be stored, for example, as the pattern data 1133 that may be maintained within the storage 1111 of the endpoint 1100. For example, such indications may be of observed daily and/or weekly patterns for that user and/or based on applications 1123 in use or typically used by that user. Further, such indications of patterns may be stored along with indications of which routines engage in exchanging network traffic through the wireless link 1290 and/or the volume of such network traffic. For example, the pattern data 1133 may include an observed average amount of data usage by an application 1123 and/or an indication of maximum data usage in a predetermined time period. Other data about user and or user-specific application network usage may be observed and stored as well.

The processor 1110 may then be further caused to transmit to the firewall 1500 indications of anticipated network usage. For example, the processor 1110 may communicate an anticipated network usage associated with one or more users on the endpoint 1100, and/or aggregate data usage and/or an anticipated maximum network usage based on the applications 1123 currently running on the endpoint 1100 and/or anticipated to run on the endpoint 1100. The processor 1110 may determine the anticipated data usage based on current network usage, current applications 1123 that are running, and the pattern data 1133. Anticipated data usage metrics may be communicated, for example, over the secure channel 1292. Anticipated data usage metrics may be communicated, for example, as part of a heartbeat security status report, or separate from the heartbeat security status report, for example, as part of a network usage status report.

In some implementations, the processor 1110 of the endpoint 1100 may communicate information about the applications 1123 that are running on the endpoint 1100, when a routine is expected to be executed and/or when a routine is expected to cease to be executed. The processor 1510 of the firewall 1500 may analyze this information and the patterns of network usage of the applications 1123 to cause the firewall routine 1520 to determine anticipated network usage. The processor 1110 of the endpoint 1100 may predict application usage based on other application usage patterns for the endpoint. The processor 1110 of the endpoint 1100 may provide information about anticipated volume of network traffic based on past patterns of executing that routine, for example, as stored in the pattern data 1133.

In response to receipt of such indications, the processor 1510 of the firewall 1500 may be caused to derive one or more network configuration changes to be made, for example, to maximize QoS of the network based on the overall anticipated network usage. For example, the firewall 1500 may direct WAPs to change frequency or speed settings. The firewall 1500 may direct endpoints 1100 to connect to other WAPs 1300 to distribute network traffic more effectively.

In some implementations, the processor 1510 of the firewall 1500 may relay indications of expected network usage and/or the operation, commencement of execution and/or expected cessation of execution of routines on the endpoint 1100 to the WAP 1300. In response to receipt of such indications, the processor 1310 of the WAP 1300 may be caused by the wireless routine 1329 to derive one or more setting changes to be made to adjust the bandwidth available through the wireless link 1290 to accommodate the volume of network traffic that is indicated as expected. Again, such a derived setting change may be of a type that is able to be effected entirely at the WAP 1300, or may be of a type that must be effected at least at the endpoint 1100 such that the secure channels 1492 and 1292 must be used to convey a command to the security routine 1120 to do so.

In some implementations, observations of patterns of network usage may be detected and indications thereof directly stored by the endpoint 1100, the WAP 1300 and/or the firewall 1500. By way of example, the processor 1310 of the WAP 1300 may be caused to monitor and store indications of amounts of network use by multiple endpoints 1100 at various times of day and/or days of a week. Thus, if the depicted endpoint 1100 is observed to have a pattern of exchanging a particularly high volume of network traffic through the depicted wireless link 1290 starting at a similar time each weekday and/or ending at another similar time each weekday, then indications of that pattern may be stored in the pattern data 1333. The processor 1310 may then be caused by the wireless routine 1329 to recurringly refer to those indications of that pattern, and in response to the approach of a time at which that particularly high volume of exchange of network traffic is expected to commence, the processor 1310 may be caused to access the wireless interface 1309w to preemptively effect a setting change. In some implementations, the processor 1310 of the WAP 1300 may be caused to transmit a request to the firewall 1500 via the secure channel 1492 for a command to be transmitted via the secure channel 1292 to the security routine 1120 to preemptively effect a setting change. The setting change may have been derived, for example, by the processor 1310 under the control of the wireless routine 1329 to increase the available bandwidth (and therefore, the QOS) of the wireless link 1290 in anticipation of the particularly high volume of network traffic to be exchanged. Then, after the particularly high volume of exchanged network traffic ceases and/or upon arrival of the time at which the particularly high volume of exchange network traffic has usually ceased, the processor 1310 may access the wireless interface 1309w to undo the earlier setting change, and/or may transmit a request via the secure channel 1492 to transmit a command to the security routine 1120 via the secure channel 1292 to undo the earlier setting change.

Figure 8A:
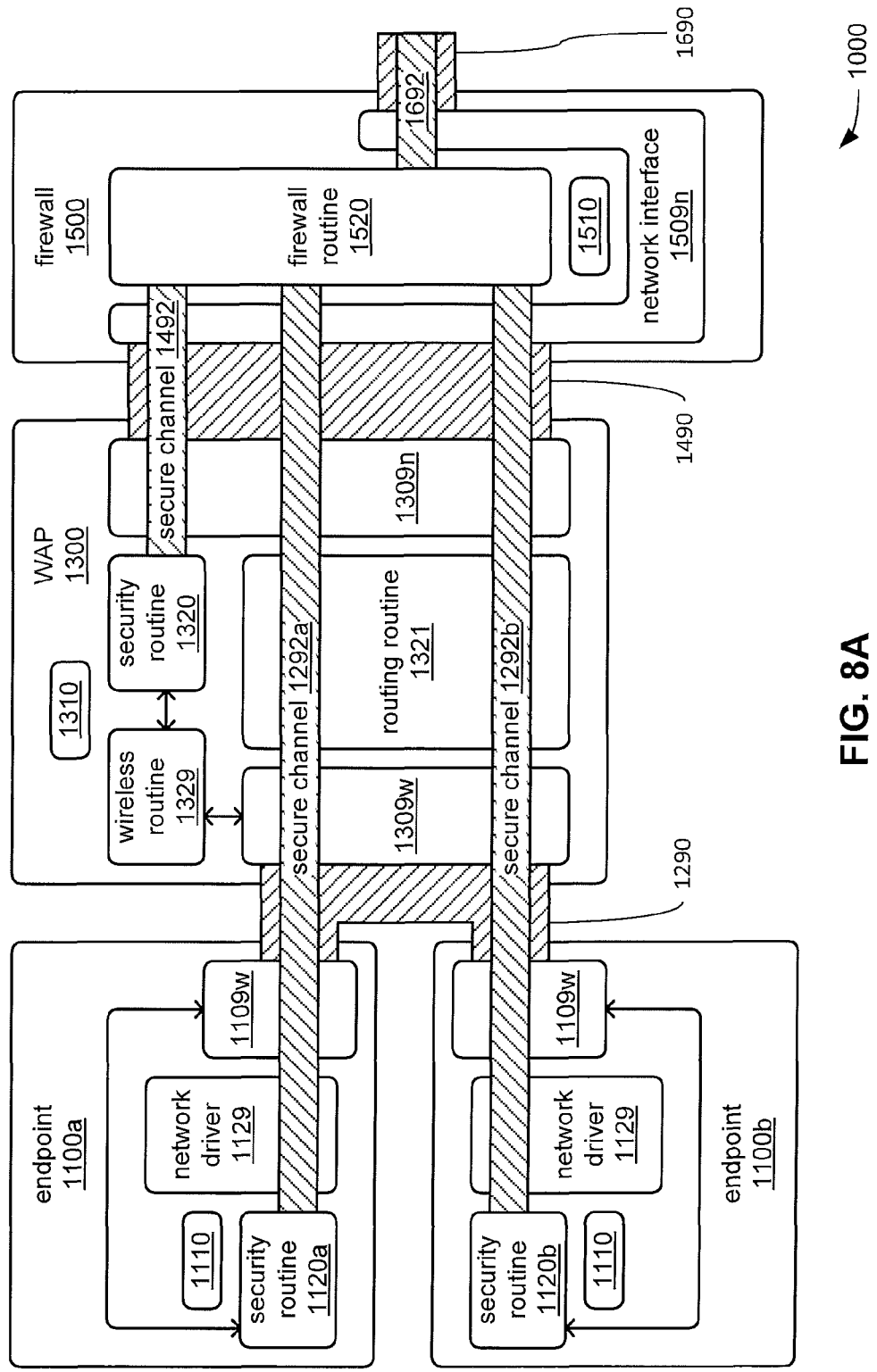
FIGS. 8A and 8B each illustrates an example implementation of coordination within a networking system to change characteristics of multiple wireless links according to at least some implementations.

FIG. 8A illustrates, by example, use of one or more secure channels in an example networking system 1000 to exchange communications associated with network performance for more than one endpoint 1100a, 1100b. Again, the depicted network elements are intended as a simple example, and there may be any number of endpoints 1100, WAPs 1300, and firewalls 1500. There may be one or more than one internal network 1490. There may be one or more than one wireless link 1290. The two endpoints 1100a, 1100b are depicted as communicating over the same wireless link 1290, which may be an 802.11 wireless network (e.g., one or more of the 802.11g, 802.11n, 802.11ac standards promulgated by IEEE).

In this example, a setting change is prompted by an anticipated or a detected network performance issue, for example, based on actual usage or based on stored indications of a recurring pattern. In such situations, coordination among at least the two endpoints 1100a, 1100b and the WAP 1300 and/or the firewall 1500 may be desired. This may be due to the at least two endpoints 1100a, 1100b sharing the same wireless network, and so setting changes that affect the wireless link 1290 affect both endpoints 1100a, 1100b.

In this example, a setting change that affects the wireless link 1290 by which the endpoints 1100a, 1100b are coupled to the WAP 1300 may need to be coordinated between the endpoints 1100a, 1100b. Where both setting changes are able to be effected entirely at the WAP 1300, then the processor 1310 may be caused by the wireless routine 1329 to access the wireless interface 1309w to so effect both setting changes. However, where a setting change cannot be made entirely at the WAP 1300, or where the setting change may affect the user(s) of one or both of the endpoints 1100a, 1100b, and coordination would minimize or make the impact on the user(s) negligible, then the processor 1310 may be caused by the wireless routine 1329 to transmit a request to the firewall 1500 through the secure channel 1492 to transmit commands to both of the security routines 1120a and 1120b within the endpoints 1100a and 1100b, respectively, via corresponding ones of the secure channels 1292a and 1292b to effect setting change(s) that affect the wireless link 1290. In response, whichever one(s) of the security routines 1120a and 1120b receive such a command may cause their respective processor 1110 to access their respective wireless interface 1109w within corresponding ones of the endpoints 1100a and 1100b to affect the specified setting change.

In some implementations, it may be the processor 1310 of the WAP 1300 that derives the setting changes to be made that are associated with the wireless link 1290. However, in other implementations, it may be that the processor 1510 of the firewall 1500 to which the WAP 1300 is coupled via an intermediate network 1490, or it may be the processor 1710 of the supervisor 1700 (referring additionally to FIG. 5B) that derives the setting changes. It may be deemed desirable for either processor 1510 of the firewall 1500 or the processor 1710 of the supervisor 1700 to derive such setting changes in implementations of the networking system 1000 in which commands to effect coordinated setting changes may need to be transmitted to instances of the security routine 1120 present within multiple endpoints 1100 that are coupled to different WAPs 1300 and/or to different firewalls 1500.

Figure 8B:
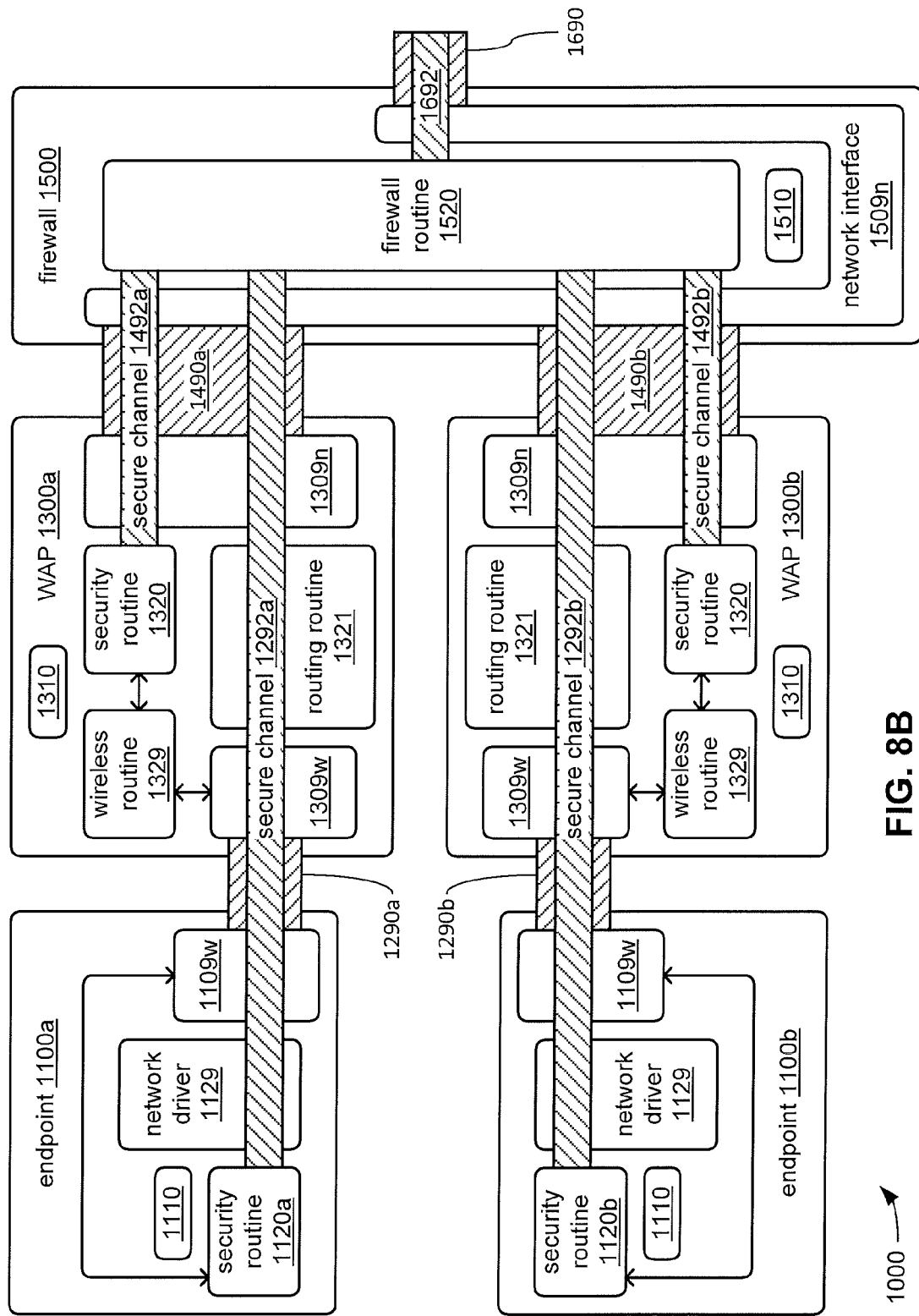

FIG. 8B depicts such an exchange of communications associated with two different wireless networks 1290a and 1290b that are each established with a different WAP 1300a and 1300b, respectively. Each of the endpoints 1100a and 1100b are coupled by corresponding ones of the wireless links 1290a and 1290b to corresponding ones of the WAPs 1300a and 1300b. In this example, the proximity of the endpoints 1100a and 1100b, and/or of the WAPs 1300a and 1300b may be close enough that a change that affects the wireless link 1290a may affect the performance of the wireless link 1290b. In response to both of the WAPs 1300a and 1300b being coupled to the same firewall 1500, it may be the processor 1510 that is caused by the firewall routine 1520 to derive corresponding setting changes to be effected by corresponding ones of the security routines 1120a and 1120b. The processor 1510 may then be caused to transmit separate commands to each of the security routines 1120a and 1120b via corresponding ones of the secure channels 1292a and 1292b to each effect one of the corresponding setting changes to each change a characteristic of a corresponding one of the wireless links 1290a and 1290b.

For example, where the WAP 1300a and the WAP 1300b are both operating on the same frequency, both the endpoints 1100a, 1100b may both report a characteristic such as a number of dropped packets that meets a threshold, which indicates poor performance. In this example, both endpoints 1100a, 1100b may report that both WAPs 1300a, 1300b are visible with a signal strength that indicates that the WAPs 1300a, 1300b, or the endpoints 1100a, 1100b that are connected to them may be interfering with each other. As a result, the firewall 1500 may direct the endpoint 1100a and the WAP 1300a to change frequency, and/or direct the endpoint 1100b and the WAP 1300b to change frequency. The firewall 1500 may direct the endpoints 1100a, 1100b and the WAPs 1300a, 1300b to reduce their broadcast power.

The firewall may direct one of the endpoints 1100a, 1100b, to connect to the other WAP. The firewall 1500 may direct one of the endpoints 1100a, 1100b and/or the WAPs 1300a, 1300b to change other operating parameters, such as transmission speed. Following these commands, the firewall may observe the network performance to determine whether any further changes are needed.

Figure 9A:
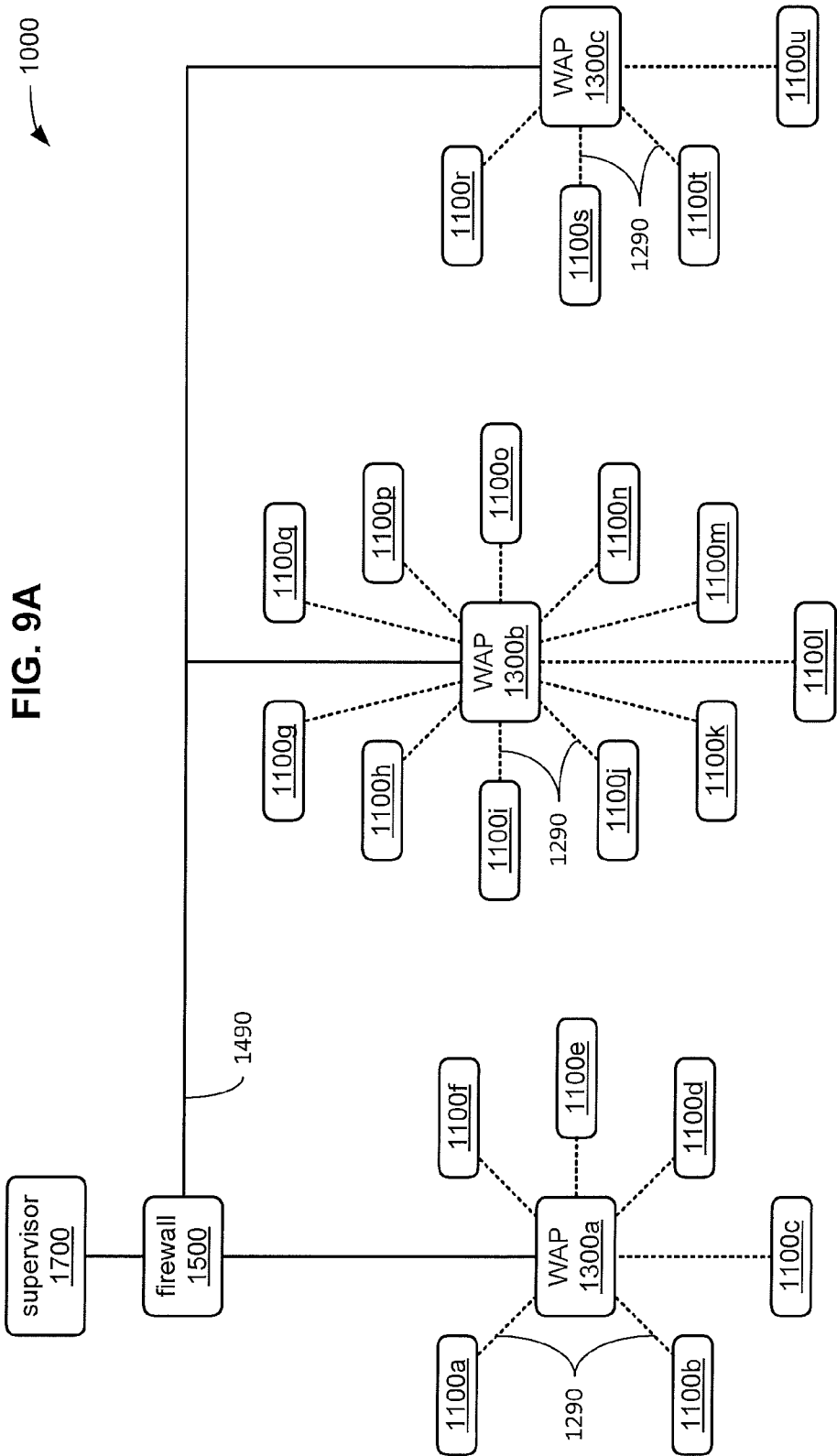
FIGS. 9A and 9B, together, illustrate an example of coordination of changes in wireless links between WAPs and endpoints according to at least some implementations.

FIG. 9A illustrates an example implementation of a network system 1000 at a site in which there are three WAPs 1300 (designated with the reference numbers 1300a, 1300b and 1300c), and a number of endpoints 1100 (designated with the reference numbers 1100a through 1100u). The depicted quantities of endpoints 1100 and WAPs 1300 are illustrative, and it should be understood that the quantity, type, and configuration of the endpoints 1100 and WAPs 1300 may vary by implementation. As depicted, the WAPs 1300a-c may be connected through an intermediate network 1490 to a firewall 1500. The depicted intermediate network 1490 may provide each of the WAPs 1300a-c with a direct or indirect connection (depicted with solid lines) via wired connections that may each include one or more intermediate devices to the firewall 1500. The firewall 1500 may have, or may directly store and/or may otherwise have access to, a database of information describing various capabilities of one or more of the WAPs 1300a-c, and/or of one or more of the endpoints 1100a-u, including and not limited to, the wireless networking capabilities as determined by installed hardware and software.

The firewall 1500 may directly store and/or may otherwise have access to a database of information describing the physical locations of one or more of the WAPs 1300a-c, and/or of one or more of the endpoints 1100a-u. For example, locations of one or more of the endpoints 1100a-u that have fixed locations (e.g., desktop computers, kiosk stations, etc.) may be included in such a database. Alternatively or additionally, locations of one or more of the endpoints 1100a-u (whether fixed, or not) may be determined by triangulation based on signal strengths detected by two or more of the WAPs 1300a-c, through the use of near field communications, other location information, or some combination thereof.

Each of the WAPs 1300a-c may establish a respective secure communication channel (e.g., a separate instance of the secure channel 1492), with the firewall 1500. With such secure communication channels established, the WAPs 1300a-c may each communicate security-related information over a corresponding one of those secure channels to the firewall 1500. The communication of security-related information may take place, for example, on a schedule, from time-to-time, or upon request. For example, the security-related information may include a security health status report of one or more of the WAPs 1300a-c, and may include alerts related to actual or suspected attacks, and suspicious behavior of one or more of the endpoints 1100a-u, users, processes, and applications.

The dotted lines each represent a wireless link 1290 established between one of the endpoints 1100a-u and one of the WAPs 1300a-c. For example, in a conventional environment, one of the endpoints 1100a-u may use a list of network names (e.g., SSID) or manual configuration to identify one of the WAPs 1300a-c to connect to, and connect to the one of the WAPs 1300a-c that is able provide, for example, the greatest signal strength or channel bandwidth.

As a demonstrative example, one of the endpoints 1100a, may establish a connection to one of the WAPs 1300a by joining a wireless network provided by the WAP 1300a. This may include associating the endpoint 1100a with the WAP 1300a, an exchange of authentication credentials (e.g., WEP, WPA, or WPA2 password), and assignment of a logical port (e.g., association ID) along with communication of supported data rates to the 1100a in accordance with a protocol (e.g., one of the 802.11 series protocols promulgated by IEEE). As a result, a wireless link 1290 may be formed between the WAP 1300a and the endpoint 1100a by which data may be exchanged therebetween and/or through which the endpoint 1100a may be able to communicate with the firewall 1500.

By way of example, once a wireless link 1290 is established between the endpoint 1100a and the WAP 1300a, the endpoint 1100a and the firewall 1500 may cooperate to establish a secure channel (e.g., an instance of the secure channel 1292) therebetween through the wireless link 1290, the WAP 1300a and the intermediate network 1490. With the secure channel established, the endpoint 1100a may communicate security-related information over the secure channel to the firewall 1500. The communication of security-related information may take place, for example, on a schedule, from time-to-time, or upon request. For example, the security-related information may include a security health status report of the endpoint, and may include alerts related to actual or suspected attacks, and suspicious behavior of users, processes, and applications.

In some implementations, on a schedule, from-time-to-time, or upon request, the endpoint 1100a may report network performance status over the secure channel. Network communication status may be reported as alongside the security-related information such that both the wireless communication status and security-related information share the secure channel. For example, a single combined report may include security health status and network performance status. Alternatively or additionally, network performance status may be reported separately from the security-related information. For example, a report may include only one or other of the security health status and network communication status. In some implementations, a network device (e.g., a WAP 1300, a firewall 1500, a supervisor 1700, etc.) may query the endpoint 1100a using the secure channel for information about its network performance status.

The network communication status may include information about wired or wireless networks (e.g., Wi-Fi networks based on one or more of the IEEE 802.11 series of standards, Bluetooth networks based on the Bluetooth specification promulgated by the Bluetooth Special Interest Group of Kirkland, WA, USA). Network communication status may include current network usage and performance and anticipated network usage and performance.

With respect to wireless networks, the network performance status may include any suitable information about one or characteristics of the wireless link established between the endpoint 1100a and the WAP 1300a. For example, the endpoint 1100a may report one or more of signal strength, channel, transmission rates, interface statistics, error counters, device settings and configuration parameters, wireless devices or WAPs 1300a-c that are visible or available and information about them (e.g., signal strength, channel). The endpoint 1100a may report its own network usage, which may include detail of network usage by applications or processes executed within the endpoint 1100a. In some implementations, a report of wireless communication status may be made in response to a query over the secure channel. For example, a network device such as the firewall 1500 may request a report, periodic reports, or specific information.

In some implementations, the WAP 1300*a* may periodically, from time to time, or upon request, report wireless communication status over a secure channel established between the WAP 1300*a* and the firewall 1500. The wireless communication status may be communicated as part of or separately from a security health status report.

For example, the WAP 1300*a* may report on which of the endpoints 1100*a-u* are in communication with the WAP 1300*a* through a wireless link 1290 with the WAP 1300*a*, as well as information about characteristics of one or more of those wireless links 1290. Examples of information about the wireless links 1290 may include any or all of signal strength, transmission rate, interface statistics, error counters, device settings and configuration parameters, wireless devices or WAPs 1300*a-c* that are visible or available bandwidth usage, QoS requirements, channel/bandwidth capability, channel(s) in use, transmission rate, or any other suitable information about the WAP 1300*a* or the ones of the endpoints 1100*a-u* that may be in communication with the WAP 1300*a* via one of the wireless links 1290. For example, the WAP 1300*a* may report information about one or both of the other WAPs 1300*b-c* that it may receive in beacon frames transmitted by one or both of the WAPs 1300*b-c*, including evaluations of the signal strength of the beacon frames received from one or both of the WAPs 1300*b-c*.

From information received over secure channels from one or more of the endpoints 1100*a-u* and one or more of the WAPs 1300*a-c*, a model of the current configuration of wireless networks at the site (e.g., of the networking system 1000) may be developed. From the model, potential or actual QOS issues may be identified. Such QOS issues may include, for example, congestion, a quantity of endpoints 1100 participating in wireless networking provided by each of the WAPs 1300*a-c*, a quantity of endpoints 1100 with a high degree of network utilization, etc. In some implementations, a model may include times of day and anticipated usage based on historical information. In some implementations, a model may include usage models associated with specific endpoints 1100*a-u*, users, or applications/processes running on the endpoints 1100*a-u*. Portions of the model may be determined on the endpoint 1100*a-u* and communicated to the firewall 1500. For example, anticipated network usage based on the applications may be determined on each endpoint 1100*a-u*.

Using the model, changes to the configuration of one or more of the wireless links 1290 and the endpoints 1100*a-u* of the networking system 1000 may be derived. For example, proposed network configurations of one or more of the endpoints 1100*a-u* and/or one or more of the WAPs 1300*a-c*, associated channels for such communication, wireless link parameters, etc. may be derived that may maximize the overall perceived or actual performance of the wireless links 1290 within the networking system 1000. For example, the firewall 1500 may send an instruction over secure channels to one or more of the WAPs 1300*a-c* and/or one or more of the endpoints 1100*a-u* to coordinate network configuration changes, including more specifically, in this example, changes to one or more characteristics of one or more of the wireless links 1290.

As depicted in FIG. 9A, endpoints 1100*a-f* are coupled by wireless links 1290 to the WAP 1300*a*; endpoints 1100*g-q* are coupled by wireless links 1290 to the WAP 1300*b*; and endpoints 1100*r-u* are coupled by wireless links 1290 to WAP 1300*c*. In this example, WAP 1300*b*, and/or one or more of the endpoints 1100*g-q* that are coupled to the WAP 1300*b* may report information to the firewall 1500 that may be indicative of congestion. It may be that many of endpoints 1100*g-q* that are coupled to the WAP 1300*b* also report that they are able to connect with one or the other of the WAPs 1300*a* and 1300*c* with sufficient (or in some cases, better) signal strength. It may also be that the firewall 1500 has previously received indications that at least some of the endpoints 1100*g-q* that are coupled to the WAP 1300*b* are capable of connecting to one or the other of the WAPs 1300*a* and 1300*c* based on their wireless networking hardware and software. Such information may be stored in a database of information associated with each of the endpoints 1100*a-u* and/or may be retrieved by the firewall 1500 from each of the endpoints 1100*a-u*. It may be that the firewall 1500 has received indications of current and/or anticipated network usage of the endpoints 1100*a-u*. Based on such information, the firewall 1500, the supervisor 1700, or another device (not depicted), may derive one or more changes to be made to the network configuration of the networking system 1000 (e.g., changes to one or more of the wireless links 1290) to improve overall performance.

Figure 9B:
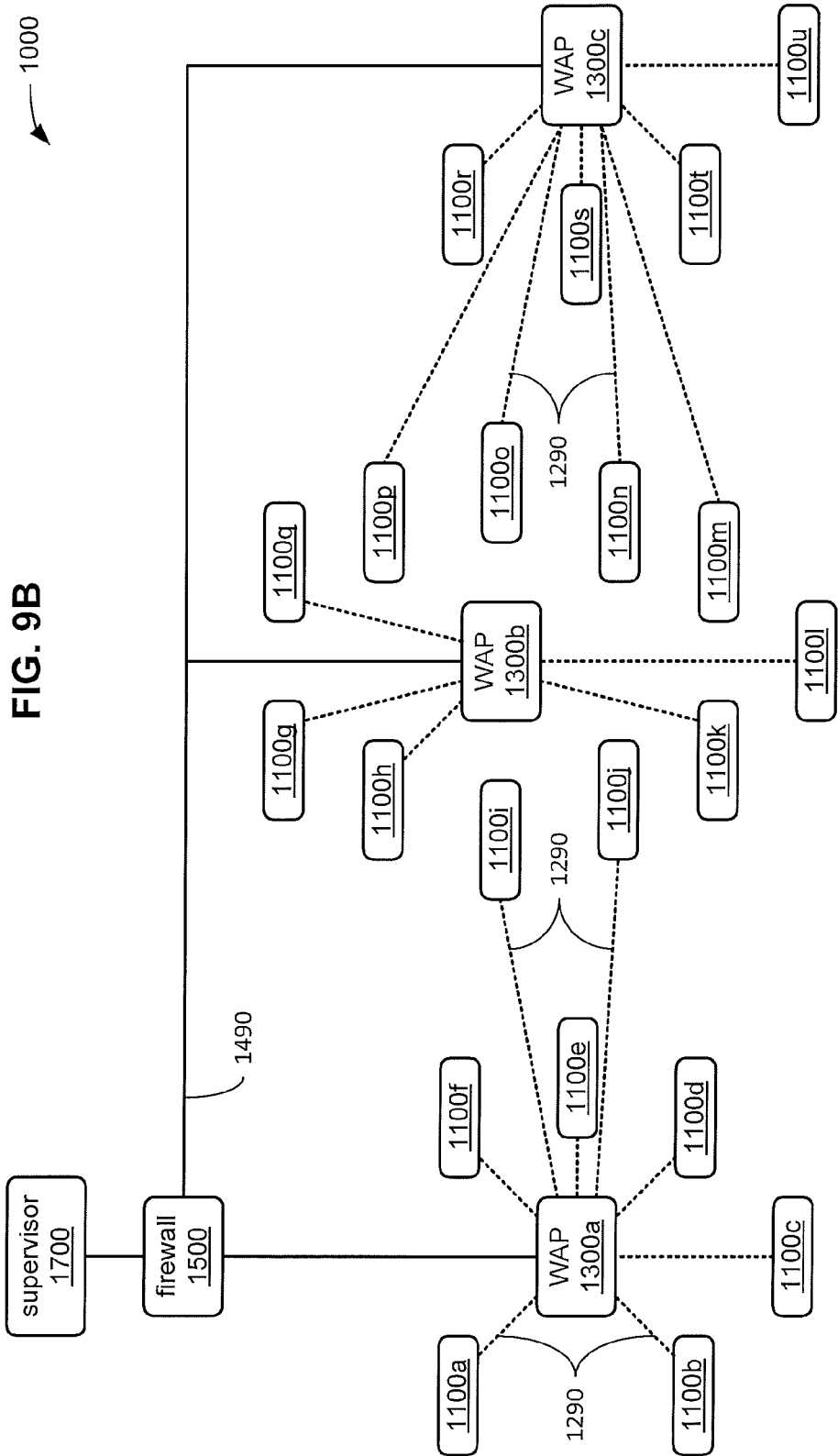

Such proposed changes may include switching one or more of the endpoints 1100*g-q* from being coupled to the WAP 1300*b* to being coupled to one or the other of the WAPs 1300*a* and 1300*b*. More specifically, as depicted in FIG. 9B, the endpoints 1100*i-j* may be directed to end their respective wireless links 1290 with the WAP 1300*b*, and to establish new wireless links 1290 with the WAP 1300*a*. Also, the endpoints 1100*m-p* may be directed to end their respective wireless links 1290 with the WAP 1300*b*, and to establish new wireless links 1290 with the WAP 1300*c*. As a result, and as depicted in FIG. 9B, the quantity of endpoints coupled by wireless links 1290 to the WAP 1300*b* is reduced, thereby alleviating the congestion.

The firewall 1500 may transmit such commands to each of the endpoints 1100*i-j* and 1100*m-p* through secure connections established between the firewall 1500 and each of these endpoints 1100*i-j* and 1100*m-p* through intermediate network 1490, the WAP 1300*b* and corresponding ones of the wireless links 1290 that were already established with the WAP 1300*b*. Each of such commands may include connection information for use in establishing the new wireless links 1290 with a corresponding one of the WAPs 1300*a* and 1300*c*. Each of such commands may specify a time to switch to being coupled to a corresponding one of the WAPs 1300*a* and 1300*c*, where the each such specified time may be selected to minimize disruption to a user of one or more of the endpoints 1100*i-j* and/or 1100*m-p*. Alternatively or additionally, the firewall 1500 may transmit commands to one or more of the WAPs 1300*a-c* to effect such changes in the wireless links associated with the endpoints 1100*i-j* and 1100*m-p*.

In some implementations, changes to the network configuration of the networking system 1000 may be determined based on one or more of WAP capacity, endpoint network usage, relative signal strength, balancing capacity, which of WAPs 1300*a-c* are wirelessly accessible to each of the endpoints 1100*a-u*, networking protocol/channel compatibility, and other information. In some implementations, changes to the network configuration may be determined based on historical network usage at the site. In some implementations, changes to the network configuration may be determined based on historical network usage of one or more of the endpoints 1100*a-u*. In some implementations, changes to the network configuration may be determined based on historical network usage of one or more of the users of one or more of the endpoints 1100*a-u*.

In some implementations, couplings by individual wireless links 1290 of each of the endpoints 1100*a-u* may be distributed among the WAPs 1300*a-c* based on historical, current and/or anticipated network capacity usage. For example, users, endpoints, or processes that regularly have a large number of video conferences may require greater network capacity than other users. For example, users that often download large files may use more network capacity.

In some implementations, the firewall 1500 may direct one or more of the endpoints 1100*a-u* and/or one or more of the WAPs 1300*a-c* to use a particular channel or communication rate. For example, the firewall 1500 may determine that certain ones of the endpoints 1100*a-u* and at least one of the WAPs 1300*a-c* are capable of using a higher communication rate, a channel with a higher frequency carrier signal that enables a higher communication rate (e.g., a 5 GHz channel), and/or a combination of channels that enables a higher communication rate. The ones of the endpoints 1100*a-u* that are so capable may be directed to establish their wireless links 1290 with at least one of the WAPs 1300 that is also so capable, while others of the endpoints 1100*a-u* that are not so capable may be directed to establish their wireless links 1290 with another of the WAPs 1300*a-c*.

In some implementations, the firewall 1500 and/or the supervisor 1700 may direct one or more of the endpoints 1100*a-u* to establish their wireless links 1290 with a particular one of the WAPs 1300*a-c* or to change which one of the WAPs 1300*a-c* to which each is coupled via a wireless link 1290 in response to receiving an indication of a security event. For example, if one of the WAPs 1300*a-c* is suspected of having been compromised or is determined to have been compromised, then one or more of the endpoints 1100*a-c* may be directed to use another of the WAPs 1300*a-c*. For example, if one of the WAPs 1300*a-c* indicates in a security report transmitted to the firewall 1500 and/or the supervisor 1700 that its security health may be compromised, the firewall 1500 and/or the supervisor 1700 may direct one or more of the endpoints 1100*a-u* to switch to another of the WAPs 1300*a-c*. For example, if one of the endpoints 1100*a-u* coupled to one of the WAPs 1300*a-c* indicates in a security report transmitted to the firewall 1500 and/or the supervisor 1700 that its security health may be compromised, the firewall 1500 and/or the supervisor 1700 may direct one or more of the other endpoints 1100*a-u* that are also coupled to the same one of the WAPs 1300*a-c* to switch to another of the WAPs 1300*a-c*. Moving those other ones of the endpoints 1100*a-u* to other(s) of the WAPs 1300*a-c* may assist in containing a security risk that may be posed by that one of the endpoints 1100*a-u* having been compromised by isolating that one of the endpoints 1100*a-u* to that one of the WAPs 1300*a-c*. Moving the those other ones of the endpoints 1100*a-u* to other(s) of the WAPs 1300*a-c* may also enable an administrator of the networking system 1000 to more easily limit network traffic to and from that one of the endpoints 1100*a-u*.

Referring back to FIGS. 5A-C, 6A-C, 7 and 8A-B, each of the processors 1110, 1310, 1510 and 1710 may include any of a wide variety of commercially available processors. Further, one or more of these processors may include multiple processors, a multi-threaded processor, a multi-core processor (whether the multiple cores coexist on the same or separate dies), and/or a multi-processor architecture of some other variety by which multiple physically separate processors are linked.

Each of the storages 1111, 1311, 1511 and 1711 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

Each of the interfaces 1109*w*, 1309*w*, 1309*n*, 1509*n* and 1709*n* may employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processors (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ac, 802.11b, 802.11g, 802.11n, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figures 10, 11:
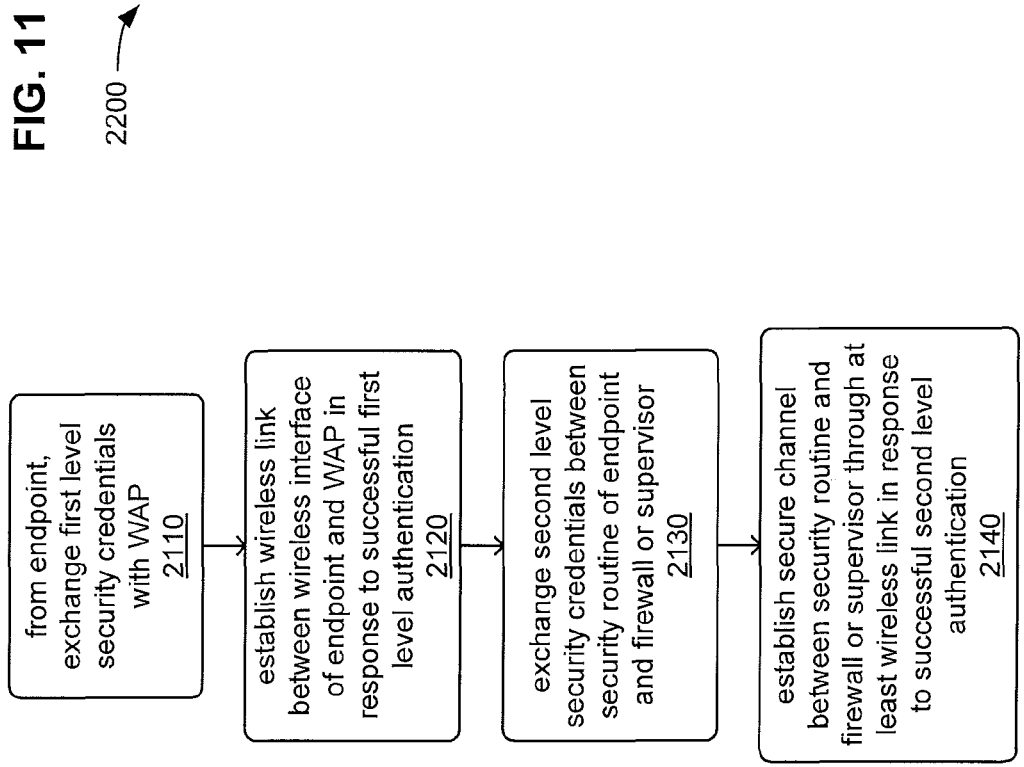
FIG. 10 illustrates a flow diagram according to at least some implementations.
FIG. 11 illustrates a flow diagram according to at least some implementations.

FIG. 10 illustrates a flow diagram of an example implementation of preparations for communications through a networking system. The logic flow 2100 may be representative of some or all of the operations executed by implementations of one or more devices described herein. More specifically, the logic flow 2100 may illustrate operations performed by the processor 1110 in executing at least the security routine 1120, and/or performed by other components of an implementation of one of the endpoints 1100.

At 2110, a processor of an endpoint in a networking system (e.g., the processor 1110 of one of the endpoints 1100 in the networking system 1000) may exchange a first level of security credentials with a WAP (e.g., one of the WAPs 1300). At 2120, the processor cooperates with the WAP to establish a wireless link therewith (e.g., one of the wireless links 1290) in response to a successful first level of authentication of the WAP. As previously discussed, the formation of one of the wireless links 1290 with one of the WAPs 1300 may be conditioned on a successful authentication of that WAP 1300.

At 2130, the processor may be caused by its execution of a security routine within the endpoint (e.g., an instance of the security routine 1120 within one of the endpoints 1100) to exchange a second level of security credentials with either a firewall or a supervisor (e.g., one of the firewalls 1500 or a server that serves as the supervisor 1700). As previously discussed, in implementations of the networking system 1000 in which neither one of the firewalls 1500 nor the supervisor 1700 is integrated with a WAP 1300, then the security routine 1120 executed within an endpoint coupled to that WAP 1300 via a wireless link 1290 may exchange security credentials with one of the firewalls 1500 or the supervisor 1700 through that WAP 1300.

At 2140, the processor cooperates with the firewall or supervisor with which it exchanged the second level security credentials to establish a secure channel therewith (e.g., one of the secure channels 1292) through at least the wireless link in response to a successful second level of authentication of that firewall or supervisor. As previously discussed, where security credentials are exchanged through one of the WAPs 1300 with either one of the firewalls 1500 or the supervisor 1700, and there is successful authentication, then the resulting secure channel 1292 formed therewith may extend through that WAP 1300.

FIG. 11 illustrates a flow diagram of an example implementation of preparations for communications through a networking system. The logic flow 2200 may be representative of some or all of the operations executed by implementations of one or more devices described herein. More specifically, the logic flow 2200 may illustrate operations performed by the processor 1310 in executing at least the wireless routine 1329, and/or performed by other components of an implementation of one of the WAPs 1300.

At 2210, a processor of a WAP in a networking system (e.g., the processor 1310 of one of the WAPs 1300 in the networking system 1000) may exchange a first level of security credentials with an endpoint (e.g., one of the endpoints 1100). At 2220, the processor cooperates with the endpoint to establish a wireless link therewith (e.g., one of the wireless links 1290) in response to a successful first level of authentication of the endpoint. As previously discussed, the formation of one of the wireless links 1290 with one of the endpoints 1100 may be conditioned on a successful authentication of that endpoint 1100.

At 2230, the processor may route, through the WAP, an exchange of a second level of security credentials with a security routine executed within the endpoint (e.g., an instance of the security routine 1120). Again, in implementations of the networking system 1000 in which neither one of the firewalls 1500 nor the supervisor 1700 is integrated with a WAP 1300, then the security routine 1120 executed within an endpoint coupled to that WAP 1300 via a wireless link 1290 may exchange security credentials with one of the firewalls 1500 or the supervisor 1700 through that WAP 1300.

At 2140, the processor may route, through the WAP, a secure channel established with the security routine (e.g., one of the secure channels 1292) in response to a successful second level of authentication of that security routine. As previously discussed, where security credentials are exchanged through one of the WAPs 1300 between an instance of the security routine 1120 and either one of the firewalls 1500 or the supervisor 1700, and there is successful authentication, then the resulting secure channel 1292 formed therebetween may extend through that WAP 1300.

Figure 12:
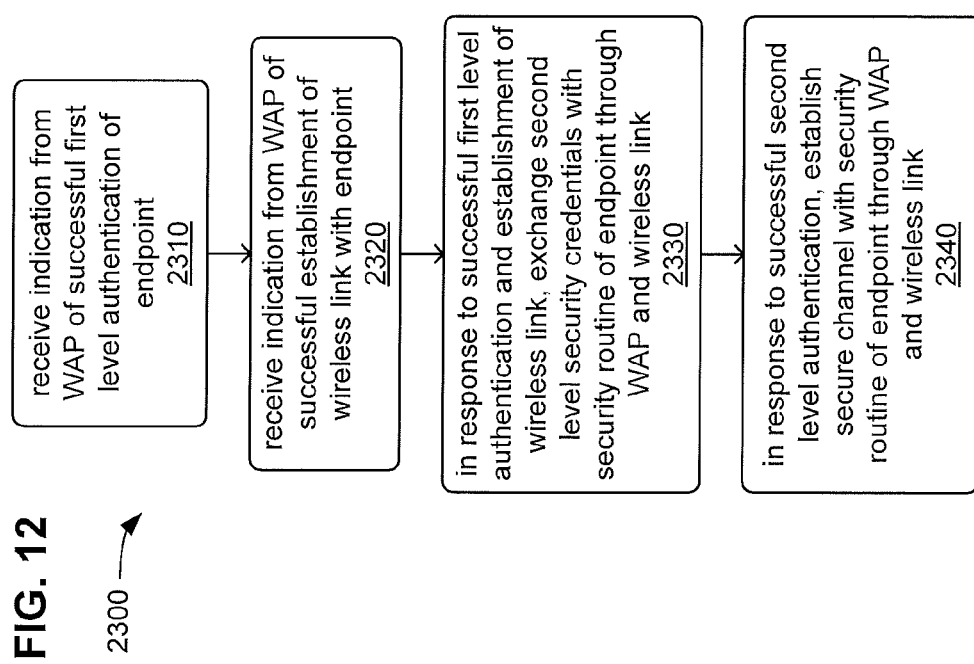
FIG. 12 illustrates a flow diagram according to at least some implementations.

FIG. 12 illustrates a flow diagram of an example implementation of preparations for communications through a networking system. The logic flow 2300 may be representative of some or all of the operations executed by implementations of one or more devices described herein. More specifically, the logic flow 2300 may illustrate operations performed by either the processor 1510 or 1710 in executing at least the firewall routine 1520 or at least the supervisory routine 1720, and/or performed by other components of an implementation of one of the firewalls 1500 or of the supervisor 1700, respectively.

At 2310, a processor of a firewall or of a server that serves as a supervisor in a networking system (e.g., the processor 1510 of one of the firewalls 1500 or the processor 1710 of the supervisor 1700 in the networking system 1000) may receive an indication from a WAP in the networking system (e.g., one of the WAPs 1300) of a successful first level of authentication of an endpoint (e.g., one of the endpoints 1100). At 2320, the processor may then receive, from that WAP, an indication of the successful establishment of a wireless link between that WAP and that endpoint (e.g., one of the wireless links 1290). As previously discussed, the formation of one of the wireless links 1290 between one of the endpoints 1100 and one of the WAPs 1300 may be conditioned on a successful authentication of at least one of those two devices by the other.

At 2330, in response to the successful first level authentication and establishment of the wireless link, the processor may exchange, through the WAP, a second level of security credentials with a security routine executed within the endpoint (e.g., an instance of the security routine 1120). Again, in implementations of the networking system 1000 in which neither one of the firewalls 1500 nor the supervisor 1700 is integrated with a WAP 1300, then the security routine 1120 executed within an endpoint coupled to that WAP 1300 via a wireless link 1290 may exchange security credentials with one of the firewalls 1500 or the supervisor 1700 through that WAP 1300.

At 2340, in response to a successful second level authentication of the security routine executed within the endpoint, the processor may establish a secure channel with that security routine through the WAP (e.g., one of the secure channels 1292). As previously discussed, where security credentials are exchanged through one of the WAPs 1300 between an instance of the security routine 1120 and either one of the firewalls 1500 or the supervisor 1700, and there is successful authentication, then the resulting secure channel 1292 formed therebetween may extend through that WAP 1300.

Figure 13:
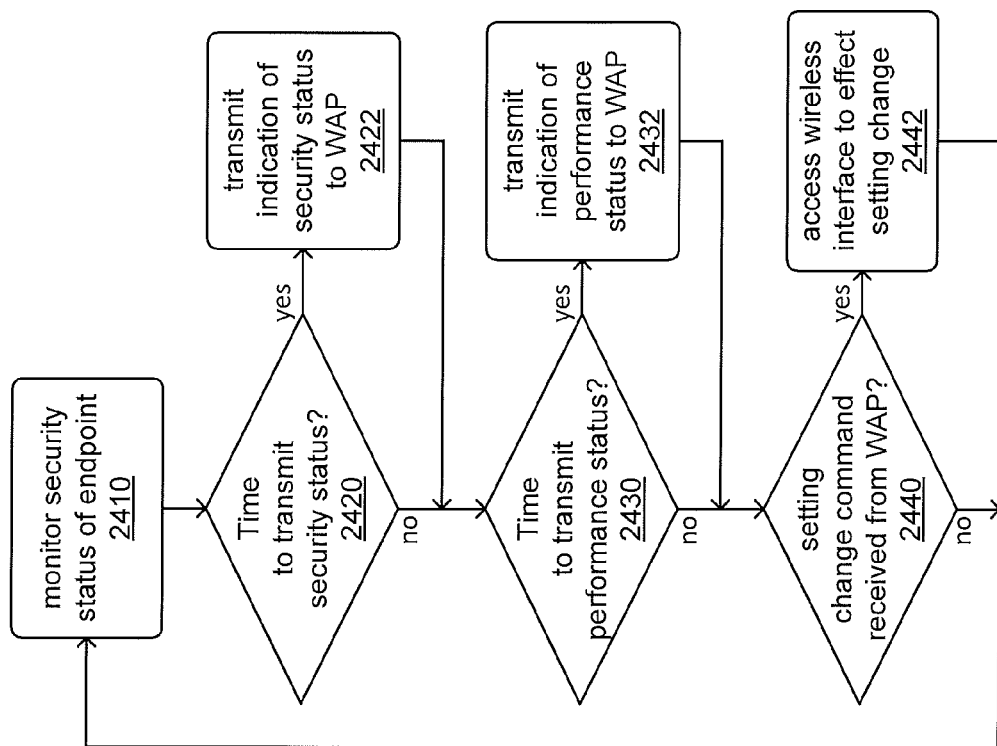
FIG. 13 illustrates a flow diagram according to at least some implementations.

FIG. 13 illustrates a flow diagram of an example implementation of performance of communications through a networking system. The logic flow 2400 may be representative of some or all of the operations executed by implementations of one or more devices described herein. More specifically, the logic flow 2400 may illustrate operations performed by the processor 1110 in executing at least the security routine 1120, and/or performed by other components of an implementation of one of the endpoints 1100.

At 2410, a processor of an endpoint in a networking system (e.g., the processor 1110 of one of the endpoints 1100 in the networking system 1000) may monitor the security status of the endpoint. As previously discussed, the monitoring of the security status of one of the endpoints 1100 may entail analyzing routines stored and/or executed within that endpoint for signatures and/or patterns of behavior associated with a piece of malware. As also previously discussed, such analysis of executable routines is just one of many techniques that may be applied to the monitoring of the security status of a device, as will be familiar to those skilled in the art.

At 2420, the processor may check whether it is time to transmit an indication of the security status of the endpoint. As previously discussed, the processor 1110 of one of the endpoints 1100 may be caused by an instance of the security routine 1120 to recurringly transmit indications of the security status of that endpoint 1100 to one of the firewalls 1500 on a recurring basis that may be based on a recurring interval of time. As a result, such recurring transmissions may serve as a form of security "heartbeat" transmission. If, at 2420, it is time to transmit an indication of the security status, then the processor may do so at 2422.

At 2430, the processor may check whether it is time to transmit an indication of the network performance status of the endpoint. As previously discussed, the processor 1110 of one of the endpoints 1100 may be caused by an instance of the security routine 1120 to recurringly transmit indications of the network performance status of that endpoint 1100 to one of the firewalls 1500 on a recurring basis that may be based on a recurring interval of time. As a result, such recurring transmissions may serve as a form of network performance "heartbeat" transmission. If, at 2430, it is time to transmit an indication of the network performance status, then the processor may do so at 2432.

At 2440, the processor may check whether a command to affect a setting change associated with network performance has been received via a secure channel established through that wireless link. As previously discussed, a command to affect a setting change of a characteristic of one of the wireless links 1290 may be transmitted to the instance of the security routine 1120 executed within the endpoint 1100 coupled to one end of that wireless link at the request of the WAP coupled to the other end of that wireless link for any of a variety of reasons. Such reasons may include a detected reduction in QOS of the wireless link, or making a preemptive change to the QOS of the wireless link in anticipation of upcoming network traffic therethrough. The command may include any changes necessary to improve wired or wireless network performance. The network performance may be the communication network between the endpoint and a WAP (e.g., Wi-Fi network) or may be another communication network (e.g., Bluetooth, near field communication), or may be a wired network.

If, at 2440, such a command has been received, then at 2442, the processor may access the appropriate communications interface of the endpoint to affect the setting change associated with network performance that is specified in the command. As previously discussed, an instance of the security routine 1120 executed within one of the endpoints 1100 may so access the wireless interface 1109w thereof to affect such a commanded setting change in a manner that bypasses one or more other routines that would normally access the wireless interface 1109w, such as the network driver 1129.

Figure 14:
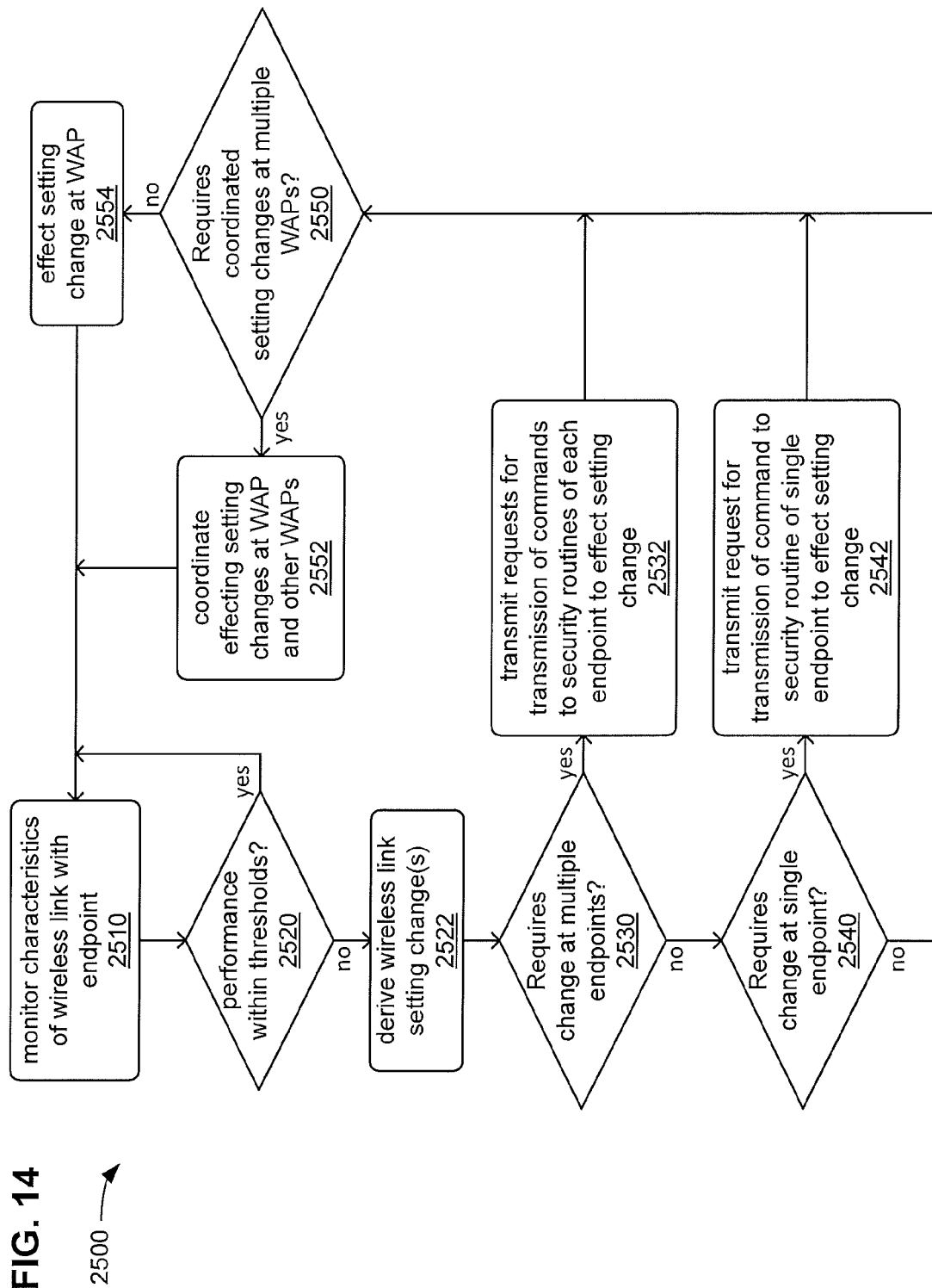
FIG. 14 illustrates a flow diagram according to at least some implementations.

FIG. 14 illustrates a flow diagram of an example implementation of performance of communications through a networking system. The logic flow 2500 may be representative of some or all of the operations executed by implementations of one or more devices described herein. More specifically, the logic flow 2500 may illustrate operations performed by the processor 1310 in executing at least the wireless routine 1329, and/or performed by other components of an implementation of one of the WAPs 1300.

At 2510, a processor of a WAP in a networking system (e.g., the processor 1310 of one of the WAPs 1300 in the networking system 1000) may monitor the QOS of a wireless link established between the WAP and an endpoint (e.g., one of the wireless links 1290 established with one of the endpoints 1100). Other information may be monitored as well, including without limitation the WAP itself, the endpoints connected to the WAP, other WAPs and devices connected to other WAPs, and WAPs and endpoints connected to other firewalls.

At 2520, the processor may check whether the overall network performance is within predetermined thresholds. More precisely, and as previously discussed, there may be minimum and/or maximum values for various characteristics of one of the wireless links 1290 that are defined by various network performance thresholds. As long as the characteristics of the overall network and/or each network, wireless link 1290, WAP, endpoints, etc. do not violate any of such minimum or maximum values, then the network performance may be deemed to be acceptable. Otherwise, if one of the characteristics violates one or more of the corresponding minimum and/or maximum values, then one or more aspects of the network may be deemed to have fallen outside one or more of the thresholds.

If, at 2520, the network performance is within the predetermined thresholds, then the processor may return to monitoring the network performance. However, if one or more aspects of the network performance (e.g., performance at one or more wireless links) has fallen outside a threshold at 2520, then the processor may derive a setting change affecting the network so as to bring the network performance (e.g., performance at one or more wireless links) back within the predetermined thresholds.

At 2530, the processor may check whether effecting the derived setting change requires setting changes at multiple endpoints. If so, then at 2532, the processor may transmit requests to a firewall device or a server that serves as a supervisor of the networking system (e.g., one of the firewall devices 1500 or the supervisor 1700) for that firewall or supervisor to transmit commands to the security routines of those multiple endpoints to effect setting changes that affect the wireless links by which each is coupled to a WAP of the networking system. Likewise, if other devices are involved in the changes, e.g., WAPs, routers, gateways, firewalls, etc., they will be directed to make the changes.

However, if effecting the derived setting change does not require setting changes at multiple endpoints at 2530, then the processor may check at 2540 whether the derived setting change requires a setting change at the single endpoint associated with the change. If so, then at 2542, the processor may transmit a request to the firewall device or the supervisor for that firewall or supervisor to transmit a command to the security routine of the single endpoint to affect the setting change.

Regardless of whether effecting the derived setting change required setting changes at multiple endpoints, at the single endpoint, or not at any endpoint, at 2550, the processor may check whether effecting the derived setting change requires coordinated setting changes at multiple WAPs. If not, then the processor may affect the derived setting change at the WAP at 2554, before returning to monitoring the network performance.

However, if coordinated setting changes are required at multiple WAPs, then at 2552, the processor may coordinate its effecting of the derived setting change with the effecting of corresponding setting change(s) at the other WAP(s). As previously discussed, such coordination with one or more other WAPs may require communication through at least one firewall device and/or through the supervisor, depending on the relative locations of the WAPs to be coordinated within the topology of the networking system.

Figure 15:
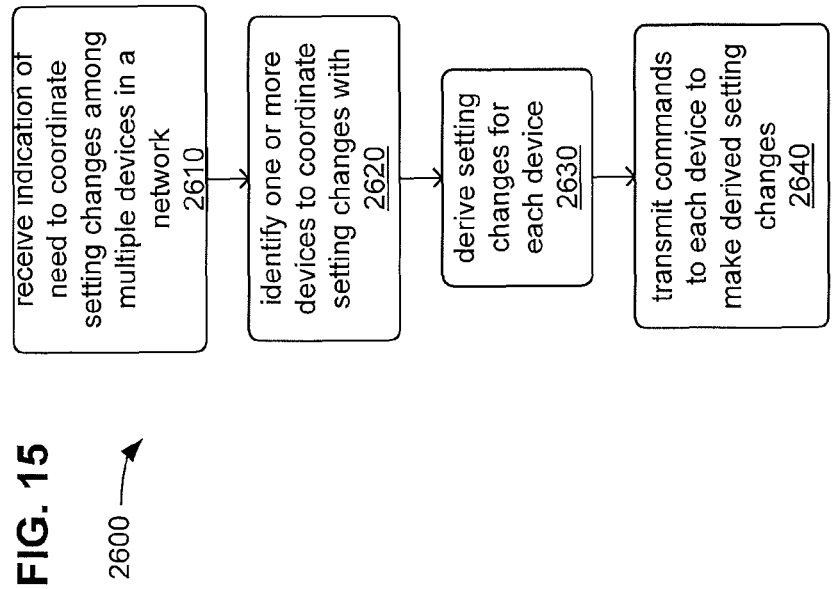
FIG. 15 illustrates a flow diagram according to at least some implementations.

FIG. 15 illustrates a flow diagram of an example implementation of preparations for communications through a networking system. The logic flow 2600 may be representative of some or all of the operations executed by implementations of one or more devices described herein. More specifically, the logic flow 2600 may illustrate operations performed by either the processor 1510 or 1710 in executing at least the firewall routine 1520 or at least the supervisory routine 1720, and/or performed by other components of an implementation of one of the firewalls 1500 or of the supervisor 1700, respectively.

At 2610, a processor of a firewall or of a server that serves as a supervisor in a networking system (e.g., the processor 1510 of one of the firewalls 1500 or the processor 1710 of the supervisor 1700 in the networking system 1000) may receive an indication in the networking system (e.g., one of the WAPs 1300) of a need to coordinate setting changes affecting multiple network elements (e.g., multiple ones of the wireless links 1290, endpoints 1100, WAPs 1300, etc.). As previously discussed, the received indication may specify the setting change needing to be made for particular wireless link that may be reason why coordinated setting changes are required that involve one or more other WAPs.

At 2620, the processor may then identify the one or more other devices with which setting changes are to be coordinated. At 2630, the processor may derive the setting change(s) for the one or more other devices. As previously discussed, one or more of the firewalls 1500 and/or the supervisor 1700 may store a map of the topology of devices of the networking system 1000 and/or a map of relative physical locations of the wireless devices (e.g., WAPs 1300 and/or endpoints) of the networking system 1000 to enable derivation of setting changes to be coordinated among at least a subset of the WAPs.

At 2640, the processor may then transmit commands to the network devices from which the indication of the need to coordinate was originally received and to the one or more other network devices to affect the derived setting changes.

Figure 16:
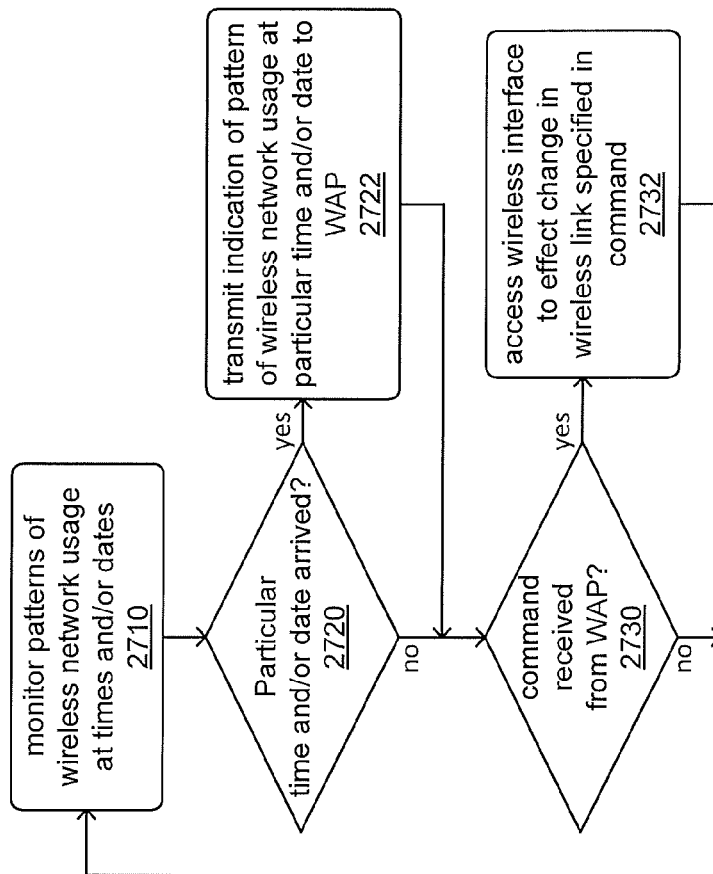
FIG. 16 illustrates a flow diagram according to at least some implementations.

FIG. 16 illustrates a flow diagram of an example implementation of performance of communications through a networking system. The logic flow 2700 may be representative of some or all of the operations executed by implementations of one or more devices described herein. More specifically, the logic flow 2700 may illustrate operations performed by the processor 1110 in executing at least the security routine 1120, and/or performed by other components of an implementation of one of the endpoints 1100.

At 2710, a processor of an endpoint in a networking system (e.g., the processor 1110 of one of the endpoints 1100 in the networking system 1000) may monitor the patterns of network usage and/or network/error statistics associated with one or more routines executed within the endpoint. More specifically, the processor may monitor and store indications of patterns of volumes of network traffic exchanged by various routines (e.g., one or more of the applications 1123) through the network (e.g., one of the wireless links 1290) at various times of day and/or days of a week.

At 2720, the processor may check whether a particular time of day and/or day of a week has arrived that may be associated with a particular volume of exchange of network traffic by a particular executable routine. If so, then at 2722, the processor may transmit an indication of an expected pattern of volume of network usage (e.g., volume of exchange of network traffic through one or more elements of the network) at the particular time and/or date to a WAP of the networking system (e.g., one of the WAPs 1300).

At 2730, the processor may check whether a command to affect a setting change associated with the network performance has been received via a secure channel. If, at 2730, such a command has been received, then at 2732, the processor may access the appropriate network interface of the endpoint to affect the setting change associated with change that is specified in the command.

Figure 17:
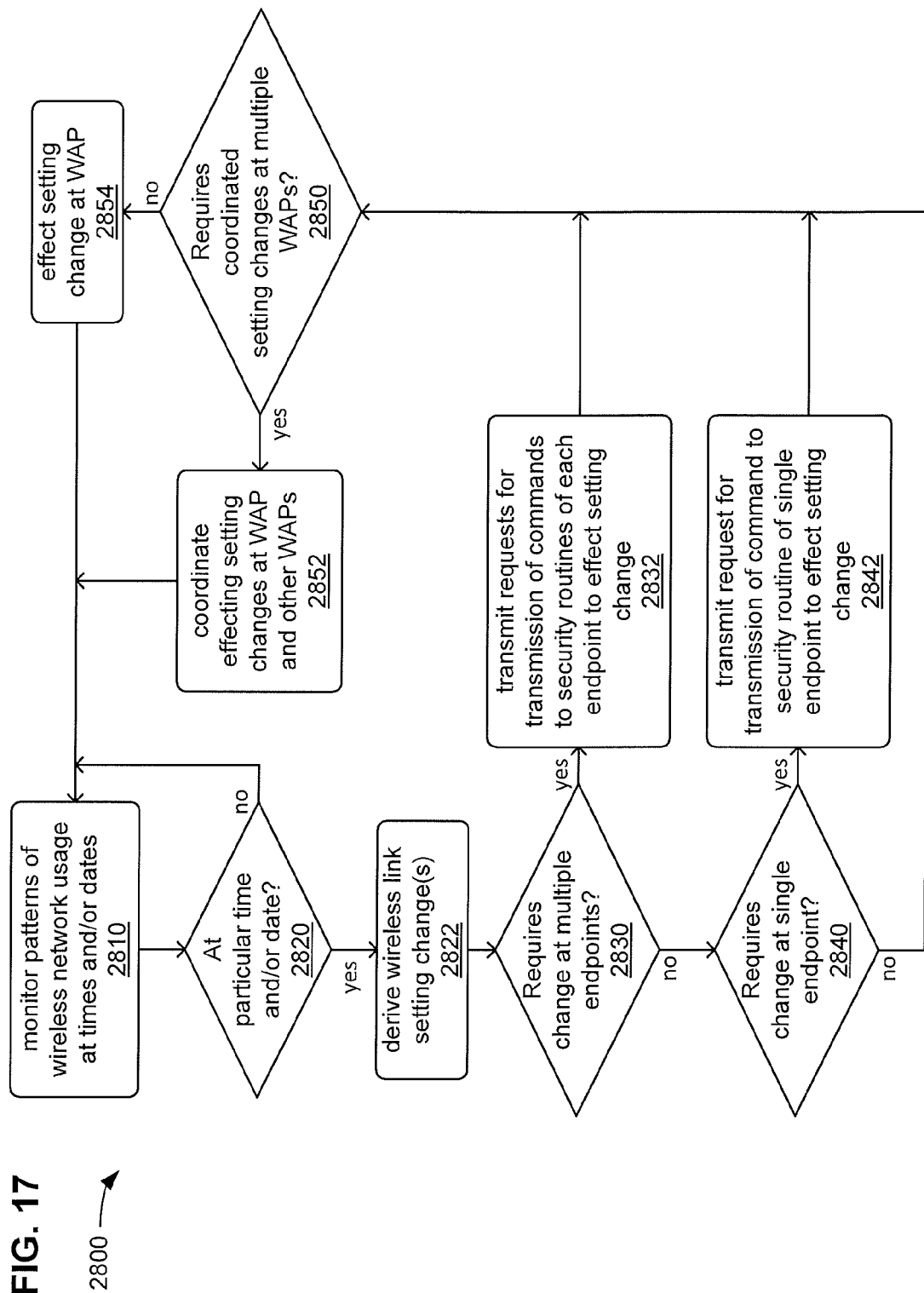
FIG. 17 illustrates a flow diagram according to at least some implementations.

FIG. 17 illustrates a flow diagram of an example implementation of performance of communications through a networking system. The logic flow 2800 may be representative of some or all of the operations executed by implementations of one or more devices described herein. More specifically, the logic flow 2800 may illustrate operations performed by the processor 1310 in executing at least the wireless routine 1329, and/or performed by other components of an implementation of one of the WAPs 1300.

At 2810, a processor of a WAP in a networking system (e.g., the processor 1310 of one of the WAPs 1300 in the networking system 1000) may monitor patterns of usage of a wireless link established between the WAP and an endpoint (e.g., one of the wireless links 1292 established with one of the endpoints 1100). At 2820, the processor may check whether a particular time of day and/or day of a week has arrived that may be associated with a particular volume of exchange of network traffic through the wireless link. If not, then the processor may return to monitoring the QOS of the wireless link at 2510. However, if such a particular time and/or date has arrived, then the processor may derive a setting change affecting the wireless link at 2822 so as to bring the QOS of the wireless link back within QOS thresholds.

At 2830, the processor may check whether effecting the derived setting change requires setting changes at multiple endpoints. If so, then at 2832, the processor may transmit requests to a firewall device or a server that serves as a supervisor of the networking system (e.g., one of the firewall devices 1500 or the supervisor 1700) for that firewall or supervisor to transmit commands to the security routines of those multiple endpoints to effect setting changes that affect the wireless links by which each is coupled to a WAP of the networking system.

However, if effecting the derived setting change does not require setting changes at multiple endpoints at 2830, then the processor may check at 2840 whether the derived setting change requires a setting change at the single endpoint associated with the wireless link for which the QOS has fallen outside one or more QOS thresholds. If so, then at 2842, the processor may transmit a request to the firewall device or the supervisor for that firewall or supervisor to transmit a command to the security routine of the single endpoint to affect the setting change.

Regardless of whether effecting the derived setting change required setting changes at multiple endpoints, at the single endpoint, or not at any endpoint, at 2850, the processor may check whether effecting the derived setting change requires coordinated setting changes at multiple WAPs. If not, then the processor may affect the derived setting change at the WAP at 2854, before returning to monitoring the QOS of the wireless link at 2810.

However, if coordinated setting changes are required at multiple WAPs, then at 2852, the processor may coordinate its effecting of the derived setting change with the effecting of corresponding setting change(s) at the other WAP(s). As previously discussed, such coordination with one or more other WAPs may require communication through at least one firewall device and/or through the supervisor, depending on the relative locations of the WAPs to be coordinated within the topology of the networking system.

In this specification, references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. Ranges of values are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the invention and does not pose a limitation on the scope of the embodiments or the claims. It also should be understood that terms such as "first," "second," "third," "above," "below," and the like, are words of convenience and are not to be construed as implying a chronological order or otherwise limiting any corresponding element unless expressly stated otherwise.

What is claimed is:

1. A computer program product comprising computer executable code embodied in a non-transitory computer readable medium that, when executing on an endpoint of an enterprise network, performs the steps of:
    configuring a secure communication channel from the endpoint to a threat management facility for the enterprise network, the secure communication channel including a secure wireless link from the endpoint to a wireless access point and a secure tunnel from the wireless access point to the threat management facility, such that communication originating on the endpoint is securely routahle to the threat management facility through the wireless access point and communication originating on the threat management facility is securely routable through the wireless access point to the endpoint;
    communicating information about network usage for the endpoint, from the endpoint to the threat management facility, through the secure wireless link and the secure tunnel;
    receiving a command at the wireless access point from a supervisor process of the threat management facility through the secure tunnel and the secure wireless link to reconfigure at least one network setting of the secure wireless link between the endpoint and the wireless access point, to improve quality of service for wireless devices within the enterprise network; and
    reconfiguring, by the wireless access point, the at least one network setting, of the secure wireless link between the endpoint and the wireless access point, in response to the command based on the information about network usage communicated from the endpoint to the threat management facility.

2. The computer program product of claim 1, wherein communicating the information about network usage for the endpoint includes communicating the information about network usage over a secure channel that connects a routine of the endpoint to the supervisor process over the secure wireless link.

3. The computer program product of claim 2, wherein receiving the command at the wireless access point from the supervisor process is responsive to communicating the information about network usage for the endpoint to the threat management facility.

4. The computer program product of claim 2, wherein reconfiguring the at least one network setting includes accessing, from the wireless access point, a wireless interface of the wireless access point to effect a change of the at least one network setting.

5. The computer program product of claim 1, wherein reconfiguring the at least one network setting includes changing a setting of a wireless interface of the wireless access point for the secure wireless link.

6. The computer program product of claim 1, wherein the information about network usage for the endpoint includes at least one of an observed average amount of data usage by an application, an indication of maximum data usage in a predetermined time period, anticipated data usage based on current network usage, current applications that are running on the endpoint, and pattern data.

7. The computer program product of claim 1, further including configuring a secure channel from the endpoint over the secure wireless link, through the wireless access point, and to the supervisor process of the threat management facility.

8. The computer program product of claim 1, wherein the at least one network setting comprises at least one of a frequency of the secure wireless link, an encoding of network traffic over the secure wireless link, a signal strength of transmission by the endpoint over the secure wireless link, or a protocol timing of the secure wireless link.

9. A system comprising:
    an endpoint associated with an enterprise network;
    a supervisor configured to coordinate characteristics of wireless links for a plurality of wireless access points associated with the enterprise network and to manage security for the enterprise network;
    a wireless access point of the plurality of wireless access points, the wireless access point providing a secure wireless link to the endpoint so as to route communication through the wireless access point between the endpoint and the supervisor;

a process executing on the endpoint, the process configured to transmit information about network usage for the endpoint to the supervisor through the secure wireless link to the wireless access point; and
a process executing on the wireless access point, the process configured to respond to a command, based on the information about network usage transmitted by the endpoint to the supervisor, received through the secure wireless link by reconfiguring a network setting of the secure wireless link between the endpoint and the wireless access point.

10. The system of claim 9, wherein the wireless access point extends a secure channel from the supervisor to the process executing on the endpoint through the secure wireless link.

11. The system of claim 9, wherein the supervisor is further configured to respond to the information about network usage for the endpoint from the process on the endpoint by issuing the command to the process executing on the wireless access point.

12. The system of claim 9, wherein the process executing on the endpoint transmits the information about network usage for the endpoint to the supervisor through the secure wireless link.

13. The system of claim 9, wherein reconfiguring a network setting of the secure wireless link includes changing a setting of a wireless interface of the wireless access point for the secure wireless link.

14. The system of claim 9, wherein the process executing on the endpoint is further configured to monitor the network usage of the endpoint.

15. The system of claim 9, wherein the network setting of the secure wireless link includes at least one of a frequency of the secure wireless link, an encoding of network traffic over the secure wireless link, a signal strength of transmission by the endpoint over the secure wireless link, or a protocol timing of the secure wireless link.

16. A method for managing an endpoint of an enterprise network, the method comprising:
routing information about network usage for the endpoint to a threat management facility through a secure link through a wireless access point, the secure link including a secure wireless link securely connecting the endpoint to the wireless access point and the secure link further including a secure channel securely connecting the wireless access point to the threat management facility;
receiving, by the wireless access point, a command from a supervisor process of the threat management facility through the secure link to reconfigure at least one network setting of the secure wireless link; and
reconfiguring, by the wireless access point, the at least one network setting of the secure wireless link connecting the endpoint to the wireless access point in response to the command based on the information about network usage routed from the endpoint to the threat management facility through the secure link.

17. The method of claim 16, wherein the supervisor process is a process executing on the threat management facility, and wherein routing the information about network usage includes routing the information about network usage over a secure channel that connects the endpoint to the supervisor process through the secure wireless link.

18. The method of claim 16, wherein receiving the command from the supervisor process is responsive to routing the information about network usage for the endpoint to the threat management facility.

19. The method of claim 16, wherein reconfiguring the at least one network setting includes accessing a configuration of a wireless interface of the wireless access point to change the at least one network setting.

20. The method of claim 16, wherein the at least one network setting includes at least one of a frequency of the secure wireless link, an encoding of network traffic over the secure wireless link, a signal strength of transmission by the endpoint over the secure wireless link, or a protocol timing of the secure wireless link.

21. A method for supervising wireless network communications for an enterprise network using a supervisor process executing on a threat management facility for the enterprise network, the method comprising:
receiving information about network usage from an endpoint at a supervisor, the information received through a secure tunnel between the endpoint and the supervisor, the secure tunnel including a secure wireless link between the endpoint and a wireless access point and a secure channel between the wireless access point and the supervisor;
identifying a change in network settings for the wireless access point to improve quality of service for the endpoint; and
transmitting a command, based on the information about network usage from the endpoint, to make the change in network settings for the secure wireless link between the endpoint and the wireless access point, from the supervisor to the wireless access point through the secure wireless link.

22. A method for operating a wireless access point in an enterprise network, the method comprising:
establishing a secure wireless link with an endpoint of an enterprise network;
establishing a secure channel with a supervisor for the enterprise network;
receiving information about network usage from the endpoint through the secure wireless link;
monitoring a quality of service of the secure wireless link;
transmitting one or more characteristics of the quality of service of the secure wireless link to the supervisor;
routing the information about network usage received from the endpoint through the wireless access point to the supervisor in a secure tunnel including the secure wireless link with the endpoint and the secure channel with the supervisor; and
transmitting a command, based on the information about network usage received from the endpoint, to make a change to a network setting of the wireless access point, the command being transmitted through the secure wireless link to a process executing on the wireless access point.

23. The method of claim 22, further comprising determining the command by monitoring a characteristic of the secure wireless link and deriving the change based on the characteristic falling outside a performance threshold for the secure wireless link.

24. The method of claim 23, wherein the performance threshold is a quality of service threshold.

25. The method of claim 23, wherein the performance threshold is a signal characteristic including at least one of a carrier frequency, an amplitude, a signal-to-noise ratio, an aspect of a shape of a waveform, a bandwidth, a separation between frequencies employed by different channels, a frequency shift, a shift in a waveform, a malformed transition in a waveform, a synchronization characteristic, a dropped portion of a protocol, a data error rate, and a dropped packet rate.

26. The method of claim 22, further comprising receiving the command from the supervisor through the secure channel.

\* \* \* \* \*